(12) United States Patent
Presgraves et al.

(10) Patent No.: US 8,954,369 B1
(45) Date of Patent: Feb. 10, 2015

(54) METHOD TO BUILD, ANALYZE AND MANAGE A SAFETY INSTRUMENTED MODEL IN SOFTWARE OF A SAFETY INSTRUMENTED SYSTEM ARCHITECTURE FOR SAFETY INSTRUMENTED SYSTEMS IN A FACILITY

(71) Applicant: Applied Engineering Solutions, Inc., Greenville, SC (US)

(72) Inventors: Carolyn Crosby Presgraves, Anderson, SC (US); Michael Dennis Scott, Anchorage, AK (US); Taylor William Schuler, Greer, SC (US); Eric Christopher Van Beek, Simpsonville, SC (US); David William Adkins, Simpsonville, SC (US); William Davis Creel, Greer, SC (US)

(73) Assignee: Applied Engineering Solutions, Inc., Greenville, SC (US)

( * ) Notice: Subject to any disclaimer, the term of this patent is extended or adjusted under 35 U.S.C. 154(b) by 0 days.

(21) Appl. No.: 14/267,061

(22) Filed: May 1, 2014

Related U.S. Application Data

(63) Continuation-in-part of application No. 13/966,241, filed on Aug. 13, 2013, now Pat. No. 8,732,105, which is a continuation-in-part of application No. 13/251,051, filed on Sep. 30, 2011, now Pat. No. 8,521,676.

(60) Provisional application No. 61/388,423, filed on Sep. 30, 2010, provisional application No. 61/388,437, filed on Sep. 30, 2010.

(51) Int. Cl.
*G06F 17/00* (2006.01)
*G06N 5/02* (2006.01)
*G06N 5/04* (2006.01)
*G05B 23/02* (2006.01)

(52) U.S. Cl.
CPC .............. *G06N 5/04* (2013.01); *G05B 23/0283* (2013.01)
USPC ............................................... 706/46; 700/79

(58) Field of Classification Search
None
See application file for complete search history.

(56) References Cited

U.S. PATENT DOCUMENTS

| | | | |
|---|---|---|---|
| 7,813,820 B2 | 10/2010 | Opem et al. | |
| 8,538,558 B1 | 9/2013 | Sabapathy et al. | |
| 2005/0027379 A1 | 2/2005 | Dyk et al. | |
| 2006/0053166 A1* | 3/2006 | Steward et al. ............. | 707/104.1 |
| 2009/0012631 A1 | 1/2009 | Fuller | |
| 2010/0004761 A1 | 1/2010 | Flanders et al. | |
| 2010/0306852 A1* | 12/2010 | Adar .............................. | 726/25 |

(Continued)

OTHER PUBLICATIONS

Timms, C. et al. "Software Tools for the Lifecycle Suport of Safety Instrumented Systems". TUV International Symposium 2006. pp. 1-14, 2006.

(Continued)

*Primary Examiner* — Jeffrey A Gaffin
*Assistant Examiner* — Benjamin Buss
(74) *Attorney, Agent, or Firm* — Buskop Law Group, PC; Wendy Buskop

(57) ABSTRACT

A method to build, manage and analyze a gap analysis model in software of safety instrumented system architecture for a safety instrumented systems in a facility. The safety instrumented system architecture has at least one instrumented protective function and the non-transitory computer instructions use a real world software model in support of process safety lifecycle management.

6 Claims, 40 Drawing Sheets

(56) References Cited

U.S. PATENT DOCUMENTS

| | | |
|---|---|---|
| 2011/0173045 A1* | 7/2011 | Jaine ............................ 705/7.28 |
| 2011/0282710 A1* | 11/2011 | Akkiraju et al. .............. 705/301 |
| 2012/0035750 A1 | 2/2012 | Edel |
| 2012/0101953 A1 | 4/2012 | James et al. |
| 2013/0138227 A1 | 5/2013 | Gohr et al. |

OTHER PUBLICATIONS

Fonseca, J.A. et al. "CMMI RAMS Extension Based on CENELEC Railway Standard". SAFECOMP 2005, LNCS 3688, pp. 1-12, 2005.

Dowell III, A.M. "Layer of protection analysis for determining safety integrity level", ISA Transactions, vol. 37, 1998, pp. 155-165.

* cited by examiner

FIGURE 1A

| | |
|---|---|
| CONNECTING A PROCESSOR TO A DATA STORAGE AND A NETWORK TO COMMUNICATE WITH AT LEAST ONE CLIENT DEVICE, WHEREIN THE CLIENT DEVICE HAS A CLIENT DEVICE PROCESSOR AND CLIENT DEVICE DATA STORAGE, AND INPUT AND OUTPUT PORTS | 1001 |
| USING COMPUTER INSTRUCTIONS TO PROVIDE A LOCATION TREE FOR EACH COMPONENT IN THE MODEL, EACH IPF, EACH ASSEMBLY, EACH ASSEMBLY GROUP AND COMBINATIONS THEREOF | 1002 |
| USING COMPUTER INSTRUCTIONS TO PROVIDE A PAGE IDENTIFIER IN THE SIS MODEL, TO DISPLAY THE MODULE OF THE SIS MODEL THAT A USER IS WITHIN AT ANY TIME ON DEMAND OR AT A PRESET TIME INTERVAL, WHICH WILL PROVIDE A HIERARCHY OF MODULES ASSOCIATED WITH THE USER LOCATION | 1003 |
| USING COMPUTER INSTRUCTIONS TO FORM A COMPONENT LIBRARY FOR A FACILITY FOR A PLURALITY OF COMPONENTS CONSISTING OF A COMPONENT IDENTIFIER, TAG NAME, COMPONENT TYPE AND EQUIPMENT TYPE | 1004 |
| USING COMPUTER INSTRUCTIONS TO PERMIT A USER TO EDIT OR REPLACE IN ANY ONE OF THE LIBRARIES, BY USING AN EDIT BUTTON IN THE LIBRARIES FOR ANY ONE COMPONENT, ASSEMBLY, VOTING INSTRUCTIONS FOR AN ASSEMBLY, ASSEMBLY GROUP, AN INSTRUMENTED PROTECTIVE FUNCTION OR COMBINATIONS THEREOF | 1005 |
| USING COMPUTER INSTRUCTIONS TO PROVIDE AN ACTUATOR TO APPLY A TAG TO ASSETS OF THE FACILITY | 1006 |
| USING COMPUTER INSTRUCTIONS TO ENABLE USERS TO ENTER A SPECIFIC COMPONENT FOR USE IN AN INSTRUMENTED PROTECTIVE FUNCTION DURING DESIGN PHASE OF A PROJECT | 1007 |
| USING COMPUTER INSTRUCTIONS TO IMPORT DATA FOR AN EXISTING FACILITY ASSET MANAGEMENT SYSTEM TO POPULATE A COMPONENT LIBRARY IN THE DATA STORAGE | 1008 |
| USING COMPUTER INSTRUCTIONS TO CREATE A REPORT IDENTIFYING DEVIATIONS BETWEEN THE FACILITY ASSET MANAGEMENT SYSTEM OF THE FACILITY AND THE IMPORTED DATA IN THE DATA STORAGE | 1009 |
| USING COMPUTER INSTRUCTIONS TO GENERATE A REPORT SHOWING IMPACT OF BYPASSING ON A RISK GAP BEING OPENED BY PLACING EQUIPMENT IN BYPASS | 1010 |
| USING COMPUTER INSTRUCTIONS TO ASSIGN A TAG NAME TO AT LEAST ONE COMPONENT IDENTIFIER WHILE ASSIGNING THE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS FOR A FACILITY IN REAL TIME | 1011 |
| USING COMPUTER INSTRUCTIONS TO DETERMINE FUNCTIONAL RELATIONSHIPS BETWEEN ASSEMBLY GROUPS AND ASSEMBLIES, AND CREATE A TAG BASED SOFTWARE MODEL WHICH CAN HAVE TAGS AND VOTING INSTRUCTIONS TO BE USED BETWEEN ASSEMBLY GROUPS AND ASSEMBLIES | 1012 |
| USING COMPUTER INSTRUCTIONS TO FORM AN ASSEMBLY LIBRARY FOR THE FACILITY WITH EACH ASSEMBLY HAVING ASSEMBLY IDENTIFIER; A NAME, ASSEMBLY TYPE, A LOCATION, AND A TEST INTERVAL SPECIFICATION | 1013 |

| | |
|---|---|
| USING COMPUTER INSTRUCTIONS TO FORM AN ASSEMBLY-COMPONENT RELATIONSHIP TABLE, WHEREIN THE COMPONENT LIBRARY AND THE ASSEMBLY LIBRARY ENABLE THE ASSEMBLY-COMPONENT RELATIONSHIP TABLE TO DEPICT A RELATIONSHIP BETWEEN ONE OF THE ASSEMBLIES AND AT LEAST ONE COMPONENT USING THE COMPONENT IDENTIFIER, THE ASSEMBLY IDENTIFIER AND A PURPOSE FOR EACH COMPONENT CONNECTED TO AN ASSEMBLY IDENTIFIER | 1014 |
| USING COMPUTER INSTRUCTIONS TO INCLUDE A LOGIC SOLVER AS A COMPONENT OF THE INSTRUMENTED PROTECTIVE FUNCTIONS TO EXECUTE THE VOTING INSTRUCTIONS TO CARRY OUT THE FUNCTIONS OF THE INSTRUMENTED PROTECTIVE FUNCTIONS AND TO CARRY OUT INSTRUCTIONS TO PERMIT A USER TO EDIT OR REPLACE ANY LOGIC SOLVER | 1015 |
| USING COMPUTER INSTRUCTIONS TO MATCH THE ASSET IDENTIFIER FROM THE COMPONENT LIBRARY FOR A FACILITY TO COMPONENTS USED IN A FACILITY ASSET MANAGEMENT SYSTEM, AND TO MATCH COMPONENTS USED IN A FACILITY MAINTENANCE MANAGEMENT SYSTEM, AND COMBINATIONS THEREOF; WHEREIN THE MATCHING OF COMPONENTS MATCHES: FAILURE RATES IN THE SAFETY INTEGRITY LEVEL CALCULATIONS COMPARED TO ACTUAL FAILURE RATES RECORDED BY THE FACILITY ASSET MANAGEMENT SYSTEM OR A FACILITY MAINTENANCE MANAGEMENT SYSTEM; TEST INTERVALS IN THE SAFETY INTEGRITY LEVEL CALCULATIONS COMPARED TO ACTUAL TEST INTERVALS RECORDED BY THE FACILITY ASSET MANAGEMENT SYSTEM OR THE FACILITY MAINTENANCE MANAGEMENT SYSTEM; OR TRIP POINTS OF PARAMETERS FOR EACH ASSEMBLY COMPARED TO TRIP POINTS RECORDED BY THE FACILITY ASSET MANAGEMENT SYSTEM OR THE MAINTENANCE MANAGEMENT SYSTEM | 1016 |
| USING COMPUTER INSTRUCTIONS TO FURTHER USE THE RELATIONSHIP TABLES TO MATCH COMPONENTS FROM THE COMPONENT LIBRARY FOR A FACILITY TO COMPONENTS IN A FACILITY HISTORIAN USING THE ASSET IDENTIFIER FROM THE COMPONENT LIBRARY AND RECORDING THE MATCHED COMPONENTS, WHEREIN THE MATCHING OF COMPONENTS ADDITIONALLY VALIDATES A MEAN TIME TO REPAIR IN THE SAFETY INTEGRITY LEVEL CALCULATION AS COMPARED WITH ACTUAL UNAVAILABILITY TIME CALCULATED BY THE FACILITY HISTORIAN | 1017 |
| USING COMPUTER INSTRUCTIONS IN THE DATA STORAGE TO FORM AN ASSEMBLY GROUP LIBRARY FOR THE FACILITY USING AN ASSEMBLY GROUP IDENTIFIER, VOTING INSTRUCTIONS, AND GROUP TYPES | 1018 |
| USING COMPUTER INSTRUCTIONS TO FORM, STORE AND USE A DOCUMENT LIBRARY | 1019 |
| USING COMPUTER INSTRUCTIONS TO FORM AN ASSEMBLY GROUP - ASSEMBLY RELATIONSHIP TABLE, WHEREIN THE ASSEMBLY GROUP LIBRARY AND THE ASSEMBLY LIBRARY ENABLE THE ASSEMBLY GROUP - ASSEMBLY RELATIONSHIP TABLE TO DEPICT A RELATIONSHIP BETWEEN AT LEAST ONE ASSEMBLY GROUP AND AT LEAST ONE ASSEMBLY AND TO PROVIDE A PARAMETER FOR EACH ASSEMBLY USING AN ASSEMBLY GROUP IDENTIFIER, AN ASSEMBLY IDENTIFIER, AN ASSEMBLY PARAMETER IDENTIFIER, AND AN ASSEMBLY PARAMETER VALUE | 1020 |
| USING COMPUTER INSTRUCTIONS TO PERMIT A USER TO CHANGE THE RELATIONSHIP OF A COMPONENT TO A FUNCTION IN AN ASSEMBLY COMPONENT RELATIONSHIP TABLE USING AN EDIT BUTTON AND TO GENERATE A SAFETY REQUIREMENTS SPECIFICATION FOR THE SIS AND USING COMPUTER INSTRUCTIONS ALLOWING A USER TO EDIT THE SAFETY REQUIREMENTS SPECIFICATION FOR THE SIS | 1021 |
| USING COMPUTER INSTRUCTIONS TO FORM AN INSTRUMENTED PROTECTIVE FUNCTION LIBRARY FOR THE FACILITY HAVING INSTRUMENTED PROTECTIVE FUNCTION IDENTIFIER, AN INSTRUMENTED PROTECTIVE FUNCTION NAME; AN INPUT GROUP VOTING; AND AN OUTPUT GROUP VOTING | 1022 |

USING COMPUTER INSTRUCTIONS TO FORM AN INSTRUMENTED PROTECTIVE FUNCTION - ASSEMBLY GROUP RELATIONSHIP TABLE WHEREIN THE INSTRUMENTED PROTECTIVE FUNCTION LIBRARY AND THE ASSEMBLY GROUPS LIBRARY ENABLE THE INSTRUMENTED PROTECTIVE FUNCTION - ASSEMBLY GROUP RELATIONSHIP TABLE TO DEPICT A RELATIONSHIP BETWEEN AT LEAST ONE INSTRUMENTED PROTECTIVE FUNCTION AND AT LEAST ONE ASSEMBLY GROUP, FORMING A SAFETY INSTRUMENTED SYSTEM (SIS) WITH AT LEAST ONE INSTRUMENTED PROTECTIVE FUNCTION CREATING A REAL WORLD MODEL OF THE INSTRUMENTED PROTECTIVE FUNCTION (IPF) USING AN INSTRUMENTED PROTECTIVE FUNCTION IDENTIFIER, AN ASSEMBLY GROUP IDENTIFIER, AND A RELATIONSHIP IDENTIFIER — 1023

USING COMPUTER INSTRUCTIONS TO ASSIGN AT LEAST ONE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS FOR A FACILITY IN REAL TIME — 1024

USING COMPUTER INSTRUCTIONS TO UPDATE ALL INSTANCES OF A COMPONENT, AN ASSEMBLY, AN ASSEMBLY GROUP, AN INSTRUMENTED PROTECTIVE FUNCTION, OR COMBINATIONS THEREOF SIMULTANEOUSLY AS THE UPDATE IS INPUTTED INTO THE MODEL — 1025

USING COMPUTER INSTRUCTIONS TO EXECUTE SAFETY INTEGRITY LEVEL CALCULATIONS USING: A LOGIC SOLVER WITH A LOGIC SOLVER LIBRARY WHEREIN THE LOGIC SOLVER LIBRARY COMPRISES A LOGIC SOLVER IDENTIFIER, A LOGIC SOLVER LOCATION, A NAME AND A TESTING INTERVAL; A SAFETY INTEGRITY LEVEL CALCULATION ENGINE; A PLURALITY OF COMPONENTS EACH HAVING A TAG NAME WITH VOTING INSTRUCTIONS; FUNCTIONAL SPECIFICATIONS FOR EACH IPF; PHYSICAL SPECIFICATIONS FOR EACH IPF; USER ENTERED ASSUMPTIONS FOR EACH IPF; AND WHEREIN THE SIL CALCULATIONS IDENTIFIES AND VERIFIES THAT THE SIL CALCULATIONS ARE MET SIMULTANEOUSLY FOR EACH IPF PROVIDING AN AVERAGE PROBABILITY OF FAILURE ON DEMAND FOR THE IPF; AND ARCHITECTURAL CONSTRAINT REQUIREMENTS FOR THE IPF — 1026

USING COMPUTER INSTRUCTIONS TO COMPARE IN REAL TIME ACTUAL SAFETY INTEGRITY LEVELS ACHIEVED AT THE FACILITY DETERMINED BY THE COMPUTER GENERATED SAFETY INSTRUMENTED MODEL TO USER SPECIFIED SAFETY INTEGRITY LEVELS AND IDENTIFY GAPS BETWEEN AN ACTUAL SAFETY INTEGRITY LEVELS AND USER SPECIFIED SAFETY INTEGRATION LEVELS FOR THE FACILITY — 1027

USING COMPUTER INSTRUCTIONS TO FORM, STORE AND USE A LIBRARY OF PUBLICATIONS WHICH IS VIEWABLE FOR COMPLIANCE — 1028

USING COMPUTER INSTRUCTIONS TO USE THE RELATIONSHIP TABLES TO FORM A CAUSE AND EFFECT REPORT FOR A USER FOR EACH IPF — 1029

USING COMPUTER INSTRUCTIONS TO INSTRUCT THE PROCESSOR TO SELECT A TEST PLAN TEMPLATE FROM THE PLURALITY OF TEST PLAN TEMPLATES USING FUNCTIONAL SPECIFICATIONS, PHYSICAL SPECIFICATIONS AND A MEMBER OF THE GROUP CONSISTING OF: AN ASSEMBLY, AN ASSEMBLY GROUP, AN INSTRUMENTED PROTECTIVE FUNCTION, OR COMBINATIONS THEREOF AND GENERATING FUNCTIONAL TEST PLANS FOR A MEMBER OF THE GROUP CONSISTING OF: AN ASSEMBLY, AN ASSEMBLY GROUP, AN INSTRUMENTED PROTECTIVE FUNCTION, AND COMBINATIONS THEREOF; USING AT LEAST ONE OF A PLURALITY OF TEST PLAN TEMPLATES STORED IN THE DATA STORAGE — 1030

| | |
|---|---|
| USING COMPUTER INSTRUCTIONS TO GENERATE A SAFETY REQUIREMENTS SPECIFICATION FOR THE SIS AND USING COMPUTER INSTRUCTIONS ALLOWING A USER TO EDIT THE SAFETY REQUIREMENTS SPECIFICATION FOR THE SIS | 1031 |
| USING COMPUTER INSTRUCTIONS TO CONNECT DATA OF THE PROCESS HAZARD ANALYSIS AND LAYERS OF PROTECTION ANALYSIS TO THE SAFETY INTEGRITY LEVEL CALCULATIONS | 1032 |
| USING COMPUTER INSTRUCTIONS TO ANALYZE THE SAFETY INTEGRITY LEVEL CALCULATIONS AND AUTOMATICALLY IDENTIFY OPTIMUM PROOF TEST INTERVALS TO MEET THE SAFETY INTEGRITY LEVEL CALCULATIONS | 1033 |
| USING COMPUTER INSTRUCTIONS TO ENABLE SEARCHING FOR A SPECIFIC COMPONENT BY TAG NAME TO SUPPORT PROCESS HAZARD ANALYSIS AND LAYERS OF PROTECTION ANALYSIS | 1034 |
| USING COMPUTER INSTRUCTIONS TO ALLOW CALCULATIONS THAT ALLOW USERS TO COMPARE AT LEAST TWO POSSIBLE ARCHITECTURES FOR A SAFETY INSTRUMENTED FUNCTION | 1035 |
| USING COMPUTER INSTRUCTIONS TO ALLOW USERS TO CREATE COPIES OF A FIRST POSSIBLE ARCHITECTURE AND MAKE MODIFICATIONS OF THE FIRST POSSIBLE ARCHITECTURE | 1036 |
| USING COMPUTER INSTRUCTIONS TO ALLOW USERS TO CHANGE THE ARCHITECTURE CURRENTLY MARKED | 1037 |
| USING COMPUTER INSTRUCTIONS TO ENABLE EDITING OF CAUSE AND EFFECT DOCUMENTS, AND ALLOW THE USERS TO ADD CAUSE AND EFFECT DOCUMENTS NOT USED IN THE SAFETY INTEGRITY LEVEL CALCULATIONS | 1038 |
| USING COMPUTER INSTRUCTIONS TO CREATE PROTECTIONS LAYERS NOT USED IN LAYERS OF PROTECTION ANALYSIS OR THE SAFETY INTEGRITY LEVEL CALCULATIONS | 1039 |
| USING COMPUTER INSTRUCTIONS TO ENTER EFFECTS AS ADDITIONAL ACTIONS INTO THE FORMED COMPUTER GENERATED SAFETY INSTRUMENTED MODEL | 1040 |
| USING COMPUTER INSTRUCTIONS TO GENERATE FACILITY ACCEPTANCE TESTS USING A SOFTWARE MODEL OF PHYSICAL AND FUNCTIONAL SPECIFICATIONS | 1041 |
| USING COMPUTER INSTRUCTIONS TO GENERATE TEST PLANS FOR EACH SAFETY INSTRUMENTED FUNCTION OF THE INSTRUMENTED PROTECTIVE FUNCTION | 1042 |
| USING COMPUTER INSTRUCTIONS TO SUPPORT MANAGEMENT OF CHANGE (MOC) FOR DATA RECORDS IN THE SYSTEM BY SUPPORTING "MASTER" RECORDS, BEING UNTOUCHED WHILE "PROJECT" COPIES OF THE DATA RECORDS CAN BE EDITED AND MANIPULATED BY USERS, WHICH OPERATION CAN BE ALSO KNOWN AS "SANDBOX" | 1043 |
| USING COMPUTER INSTRUCTIONS TO CHECK EACH EDITED RECORD, MARK EACH RECORD AS CHECKED, APPROVED, AND THEN MOVE THE CHECKED AND APPROVED RECORD TO "MASTER" RECORDS | 1044 |
| USING COMPUTER INSTRUCTIONS TO SUPPORT REVISION TRACKING AND IMPACT REPORTING ON PROPOSED CHANGES | 1045 |
| USING COMPUTER INSTRUCTIONS TO ALLOW USERS TO ENTER PROPOSED CHANGES AND VIEW IMPACT REPORTS PRIOR TO APPROVING CHANGES | 1046 |

COMPONENT LIBRARY 316

| COMPONENT_ID 304 | TAGNAME 320 | COMPONENT TYPE 322 | EQUIPMENT TYPE 324 | NAME 335 | PROCESS DESCRIPTION 337 | ASSET ID 339 | RECONCILING ID 341 |
|---|---|---|---|---|---|---|---|
| 1 | PT-120 | INPUT | PRESSURE TRANSMITTER | PT-120 | SEPARATOR 1 PRESSURE | 1111331 | 778b392 |
| 2 | PS-120 | INPUT | PRESSURE SWITCH | PS-120 | SEPARATOR 1 PRESSURE | 1111332 | 779c461 |
| 3 | PT-122 | INPUT | PRESSURE TRANSMITTER | PT-122 | SEPARATOR 2 PRESSURE | 1111445 | 778b393 |
| 4 | PS-122 | INPUT | PRESSURE SWITCH | PS-122 | SEPARATOR 2 PRESSURE | 1111446 | 779d743 |
| 5 | SIS-100 | LOGIC SOLVER | INDUSTRIAL PLC | SIS-100 | SEPARATOR CONTROL | 1111447 | 780b456 |
| 6 | SDY-120 | OUTPUT | 3 WAY SOLENOID | SDY-120 | SEPARATOR 1 OUTLET VALVE | 1111551 | 785c357 |
| 7 | SDV-120 | OUTPUT | BALL VALVE | SDV-120 | SEPARATOR 1 OUTLET VALVE | 1111552 | 786b393 |
| 8 | SDY-122 | OUTPUT | 3 WAY SOLENOID | SDY-122 | SEPARATOR 2 OUTLET VALVE | 1111771 | 785d358 |
| 9 | SDV-122 | OUTPUT | BALL VALVE | SDV-122 | SEPARATOR 2 OUTLET VALVE | 1111772 | 786d394 |

FIGURE 2B

ASSEMBLY LIBRARY 308

| ASSEMBLY IDENTIFIER 302 | NAME 312 | ASSEMBLY TYPE 314 | PROCESS DESCRIPTION 323 | LOCATION 325 | CALCULATED PFD 327 | OVERRIDE 329 | DOCUMENT IDENTIFIER 331 | OVERT FAULT STATUS 333 | TESTING INTERVAL 349 |
|---|---|---|---|---|---|---|---|---|---|
| 10 | PS-120 | INPUT | SEPARATOR 1 PRESSURE | 10 | .0001 | FALSE | 113 | ZERO | 1 DAY |
| 20 | PS-122 | INPUT | SEPARATOR 2 PRESSURE | 10 | .001 | FALSE | 114 | ZERO | 1 HOUR |
| 30 | SDV-120 | OUTPUT | SEPARATOR 1 OUTLET VALVE | 10 | .0001 | FALSE | 115 | CLOSED | 2 HOUR |
| 40 | SDV-122 | OUTPUT | SEPARATOR 2 OUTLET VALVE | 10 | .001 | FALSE | 117 | CLOSED | 10 MINUTES |

FIGURE 2C

LOGIC SOLVER LIBRARY 309

| LOGIC SOLVER_ID 311 | LOGIC SOLVER LOCATION 313 | NAME 315 | DESCRIPTION 317 | PFD 319 | TESTING INTERVAL 321 |
|---|---|---|---|---|---|
| 1151 | 10 | CPL-1132 | COMPRESSOR 1 CONTROL PANEL | .000001 | 36 |
| 1152 | 10 | CPL-113 | COMPRESSOR 2 CONTROL PANEL | .000001 | 36 |
| 101 | 10 | SIS-17 | SEPARATOR 1 SAFETY PANEL | .000001 | 12 |
| 102 | 10 | SIS-18 | SEPARATOR 2 SAFETY PANEL | .000001 | 12 |

FIGURE 2D

ASSEMBLY - COMPONENT RELATIONSHIP TABLE 300

| ASSEMBLY_ID 302 | COMPONENT_ID 304 | PURPOSE 306 | LOGIC SOLVER 307 |
|---|---|---|---|
| 10 | 1 | SENSOR | NULL |
| 10 | 2 | INTERFACE | 101 |
| 20 | 3 | SENSOR | NULL |
| 20 | 4 | INTERFACE | 102 |
| 30 | 6 | INTERFACE | 101 |
| 30 | 7 | FINAL ELEMENT | NULL |
| 40 | 8 | INTERFACE | |
| 40 | 9 | FINAL ELEMENT | |

FIGURE 2E

ASSEMBLY GROUP LIBRARY 342

| ASSEMBLY GROUP_ID 344 | NAME 346 | VOTING INSTRUCTION 348 | TEST INTERVAL 349 | CALCULATED ASSEMBLY GROUP FAILURE 351 | DOCUMENT ID 331 | GROUP TYPE 360 |
|---|---|---|---|---|---|---|
| 100 | TEST SEPARATOR PRESSURE | 2oo2 | 12 | .0001 | 114 | INPUT |
| 200 | TEST SEPARATOR INLET | 1oo2 | 12 | .001 | 115 | OUTPUT |

FIGURE 2F

ASSEMBLY GROUP - ASSEMBLY RELATIONSHIP TABLE 332

| ASSEMBLY GROUP_ID 344 | ASSEMBLY_ID 302 | ASSEMBLY PARAMETER_ID 352 | ASSEMBLY PARAMETER VALUE 356 | ASSEMBLY PARAMETER UNIT 358 |
|---|---|---|---|---|
| 100 | 10 | 11 | 150 | PSIG |
| 100 | 20 | 12 | 150 | PSIG |
| 200 | 30 | 13 | DEN | |
| 200 | 40 | 14 | DEN | |

FIGURE 3A

INSTRUMENTED PROTECTIVE FUNCTION (IPF) LIBRARY 372

| IPF_ID 374 | NAME 376 | INPUT GROUP VOTING 378 | OUTPUT GROUP VOTING 380 | DOCUMENT ID 331 | CALCULATED IPF PROBABILITY OF FAILURE 381 | ACTUATOR TO PERMIT OVERRIDE 383 | ACHIEVED RISK FACTOR 385 |
|---|---|---|---|---|---|---|---|
| 1000 | TEST SEPARATOR HIGH PRESSURE INTERLOCK | 1oo1 | 1oo1 | 113 | .0048 | FALSE | |
| 1010 | TEST SEPARATOR HIGH LEVEL INTERLOCK | 1oo2 | 1oo2 | 114 | .00067 | FALSE | |
| 1020 | GLYCOL HEATER HIGH TEMP SHUTDOWN | 1oo2 | 1oo2 | 115 | .0035 | FALSE | |
| 1030 | GLYCOL HEATER LOSS OF FLAME INTERLOCK | 1oo4 | 1oo2 | 117 | .0008 | TRUE | |

FIGURE 3B

INSTRUMENTED PROTECTIVE FUNCTION (IPF) - ASSEMBLY GROUP RELATIONSHIP TABLE 362

| IPF_ID 374 | ASSEMBLY GROUP_ID 344 | RELATIONSHIP_ID 375 | ADDITIONAL ACTION 386 |
|---|---|---|---|
| 1000 | 100 | 10001 | FALSE |
| 1000 | 200 | 10001 | FALSE |
| 1010 | 500 | 10001 | TRUE |
| 1010 | 510 | 10002 | TRUE |
| 1010 | 520 | 10003 | FALSE |
| 1010 | 530 | 10004 | TRUE |
| 1020 | 550 | 10004 | TRUE |
| 1020 | 551 | 10004 | FALSE |
| 1020 | 552 | 10005 | FALSE |

FIGURE 3C

DOCUMENT LIBRARY 299

| DOCUMENT_ID 331 | DOCUMENT TYPE 353 | DOCUMENT NAME 355 | DOCUMENT DESCRIPTION 357 |
|---|---|---|---|
| 114 | CAUSE AND EFFECT | SEPARATOR 1 CAUSE AND EFFECT | INLET SEPARATOR 1 CAUSE AND EFFECT |
| 115 | CAUSE AND EFFECT | SEPARATOR 2 CAUSE AND EFFECT | INLET SEPARATOR 2 CAUSE AND EFFECT |
| 116 | CAUSE AND EFFECT | COMPRESSOR 1 CAUSE AND EFFECT | COMPRESSOR 1 CAUSE AND EFFECT |
| 117 | CAUSE AND EFFECT | COMPRESSOR 2 CAUSE AND EFFECT | COMPRESSOR 2 CAUSE AND EFFECT |

FIGURE 3D

LIBRARY OF PUBLICATIONS 301

| STATUTES 290 | INDUSTRY STANDARDS 291 | NATIONAL REGULATIONS 292 | BUSINESS OWNER SPECIFIC POLICIES 293 |
|---|---|---|---|
| 35 USC 101 | IEC - 69205 | 37 CFR 25.1 | DO NOT USE HITACHI VALUES |

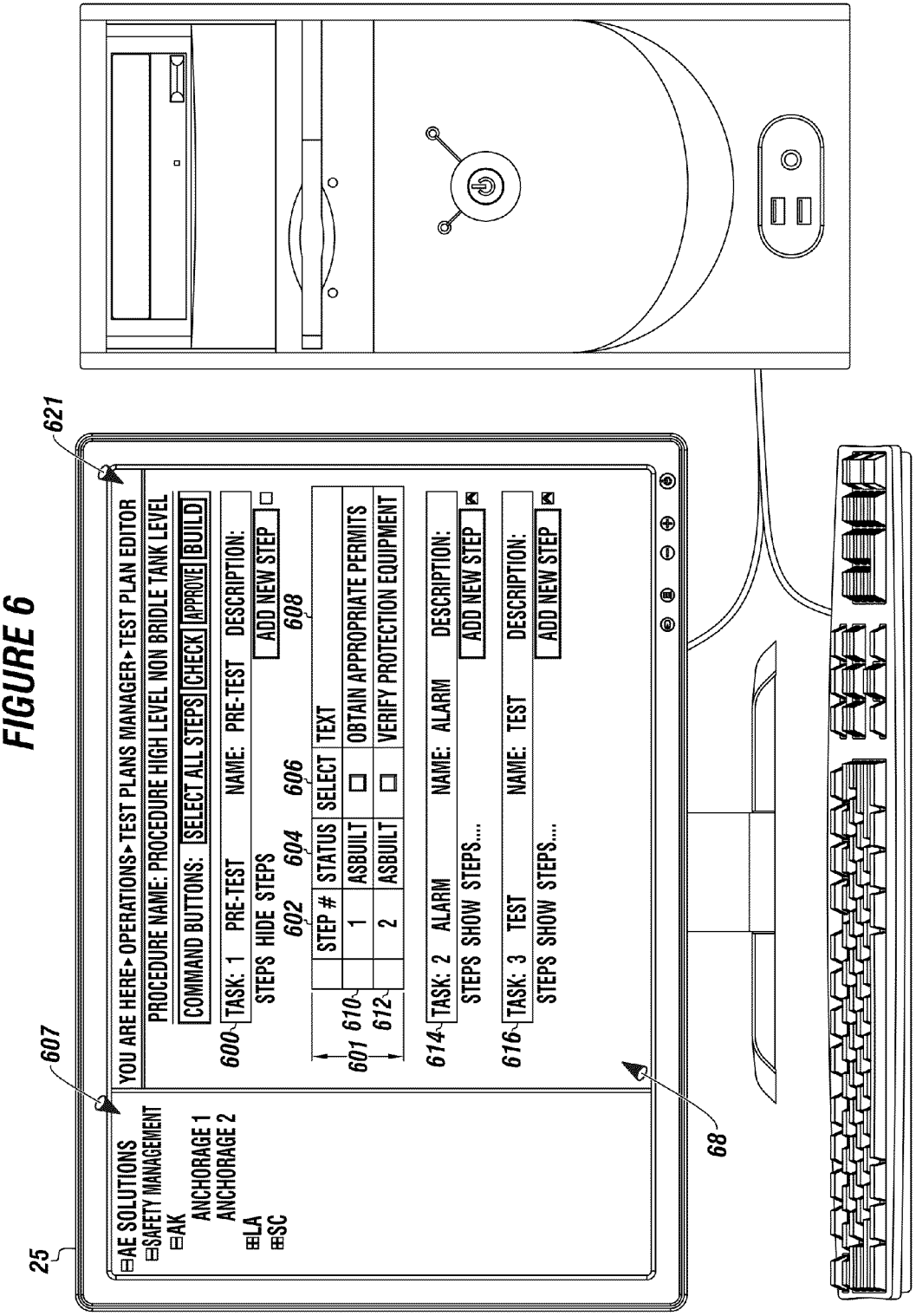

FIGURE 7A

| (logo) | Assembly Test Plan for LS-182 | |
|---|---|---|
| | 721 | 724 |

720 — Facility | Assembly Name | Test Plan Name

| Facility | Assembly Name | Test Plan Name |
|---|---|---|
| AE Solutions-Safety Lifecycle Management-North America-AK-Anchorage Facility1(Anchorage Office Facility1) | LS-182 | Procedure_High Level Non Bridle Tank Level |
| Module | | |
| Anchorage Facility1 | | |

726 — Process Description

| Test Separator High Level |
|---|

728

| Test Plan Status | Approved By | Approval Date | Comp Tag Name | Comp Name | Fail Mode |
|---|---|---|---|---|---|
| ASBUILT | None | 7/4/2010 12:00 AM | LS-182 | LS-182 | |

730 — Work Requirements

731

| Required Permits | Policy & Specifications | Personnel | Tools & Instruments |
|---|---|---|---|
| Defeated Safety Device Log | Safety Handbook | Control Room Op | Field Radios |
| | Failure Classification Specification | I&T | Test Pressure Gauge |
| | | | Process Pressure Gauges (2) |

732 — Drawings and Documents for Reference

| DRAWINGS | | DOCUMENTS | |
|---|---|---|---|
| Drawing Type | Drawing No | Document Type | Document No |
| P&ID | MI-0005-001 | C&E | CE_GEN1_54 |
| MI-0005-001 | | Module 71 | |

734 — Assembly Parameters/Threshold Limits

| Parameter Type | Value | Lower Limit | Upper Limit | Units | Approach | Logic Action | As Found |
|---|---|---|---|---|---|---|---|
| LSHH | 48 | 45 | 51 | IN | Inc | | |

| Type Effect | Type Alarm | Alarm Name | Alarm Tag | Alarm Point | As Left |
|---|---|---|---|---|---|
| Trip | | | | | |

736 — Comments about assembly LS-182:

| Test Separator High Level |
|---|

738 — Test Results

If the device passes the test, place a check in the box under PASS below. If the device fails the test, place a check in the box under FAIL SAFE or FAIL DANGEROUS below, and record the classification code for the failure in Fail Code box . See the Failure Classification Specification document in the Policies and Specifications of the Test Requirements section above for the defined fail codes.

Parameter Type     PASS     FAIL SAFE     FAIL DANGEROUS     FAIL CODE                      Field Notes:

| | LSHH | ☐ | ☐ | ☐ | | |
|---|---|---|---|---|---|---|
| | Alarm | | | | | |
| | | ☐ | ☐ | ☐ | | |

740

| TEST PERSONNEL SIGN-OFF | | | TEST PROCEDURE APPROVAL | | |
|---|---|---|---|---|---|
| Department | Test Person | Test Date | Department | Verifing Person | Verifi Date |
| I&T | I&T | mm/dd/yyyy | Operations | Control Room Op | mm/dd/yyyy |
| | | | | | |

Detail Information and Steps to Execute

| Task (700) | Step (702) | Staff (704) | √ (706) | Work Method Steps (708) |
|---|---|---|---|---|
| | | | | Procedure_High Level Non Bridle Tank Level - Work Methods for Testing: LS-182 |
| 1 | | | | PRE-TEST - (714) (716) |
| | 1 | | ☐ | Obtain the appropriate permits for the testing and provide the proper notifications to operating personnel regarding the testing, any special requirements, and subsequent alarms that may be generated. |
| | 2 | | ☐ | Verify that any special safety procedures associated with testing or the actions required during testing have been identified and are being followed. |
| | 3 | | ☐ | Verify any required personal protection equipment (PPE) required for the testing is available and in good condition. |
| 3 | | | | TEST - |
| | 1 | | ☐ | Coordinate and communicate with operations to install the bypasses (software, hardware switches, jumpers, etc.,) listed in the Trip Prevention Details in the document section if required in order to prevent process upset upon trip. |
| | 2 | | ☐ | Record the method used to verify the state change below. (IT) Verification Method: LS-182 |

710, 712, 718, 750

| Tester Comments - Additional Steps (742) | Observed Deficiencies and Corrective Actions (744) |
|---|---|
| | |
| | |
| | |

Figures 8A, 8B:
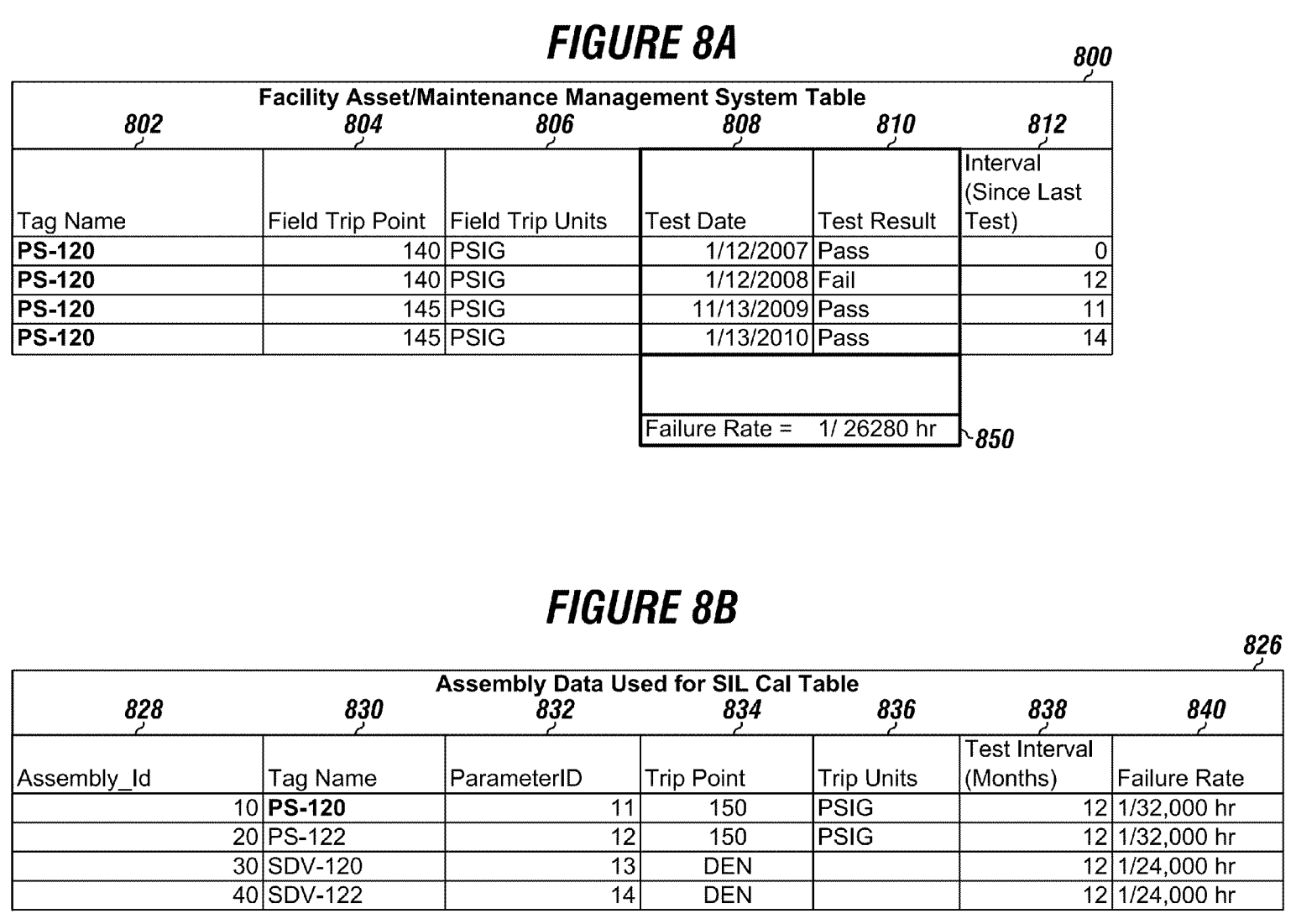

Facility Asset/Maintenance Management System Table ~800

| Tag Name | Field Trip Point | Field Trip Units | Test Date | Test Result | Interval (Since Last Test) |
|---|---|---|---|---|---|
| PS-120 | 140 | PSIG | 1/12/2007 | Pass | 0 |
| PS-120 | 140 | PSIG | 1/12/2008 | Fail | 12 |
| PS-120 | 145 | PSIG | 11/13/2009 | Pass | 11 |
| PS-120 | 145 | PSIG | 1/13/2010 | Pass | 14 |

Failure Rate = 1/ 26280 hr   ~850

Assembly Data Used for SIL Cal Table ~826

| Assembly_Id | Tag Name | ParameterID | Trip Point | Trip Units | Test Interval (Months) | Failure Rate |
|---|---|---|---|---|---|---|
| 10 | PS-120 | 11 | 150 | PSIG | 12 | 1/32,000 hr |
| 20 | PS-122 | 12 | 150 | PSIG | 12 | 1/32,000 hr |
| 30 | SDV-120 | 13 | DEN | | 12 | 1/24,000 hr |
| 40 | SDV-122 | 14 | DEN | | 12 | 1/24,000 hr |

828, 830, 832, 834, 836, 838, 840

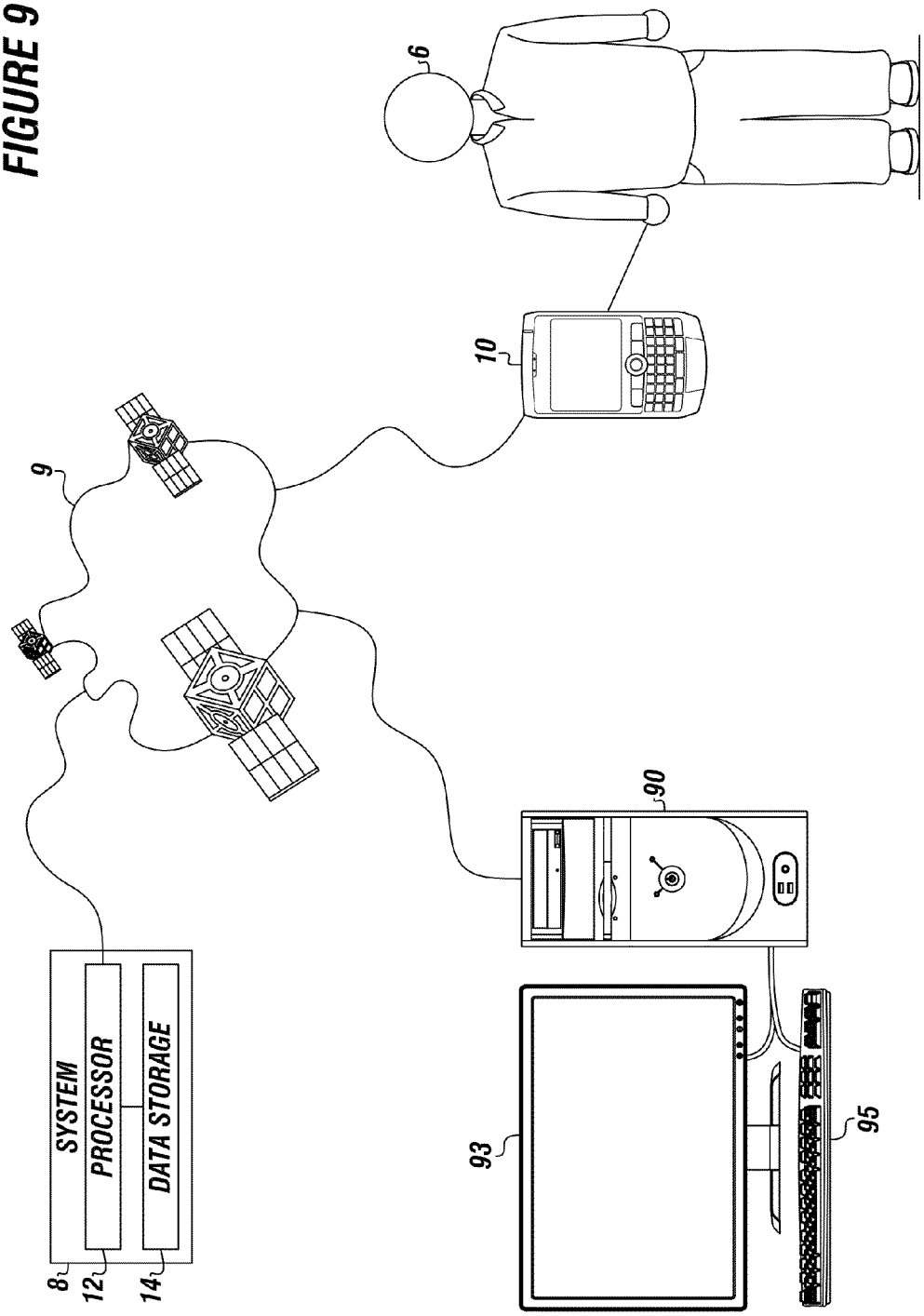

FIGURE 10A

| | |
|---|---|
| DATA STORAGE | 14 |
| COMPUTER INSTRUCTIONS FOR FORMING A COMPONENT LIBRARY | 16 |
| COMPUTER INSTRUCTIONS FOR FORMING AN ASSEMBLY LIBRARY | 18 |
| COMPUTER INSTRUCTIONS FOR FORMING AN ASSEMBLY-COMPONENT RELATIONSHIP TABLE | 22 |
| COMPUTER INSTRUCTIONS FOR FORMING AN ASSEMBLY GROUP LIBRARY | 26 |
| COMPUTER INSTRUCTIONS FOR FORMING AN ASSEMBLY GROUP - ASSEMBLY RELATIONSHIP TABLE | 30 |
| COMPUTER INSTRUCTIONS FOR FORMING, STORING AND USING THE DOCUMENT LIBRARY | 31 |
| COMPUTER INSTRUCTIONS FOR FORMING A LIBRARY OF INSTRUMENTED PROTECTIVE FUNCTIONS (IPF) | 32 |
| COMPUTER INSTRUCTIONS TO FORM, STORE AND USE A LIBRARY OF PUBLICATIONS | 33 |
| COMPUTER INSTRUCTIONS FOR FORMING AN INSTRUMENTED PROTECTIVE FUNCTION (IPF) - ASSEMBLY GROUP RELATIONSHIP TABLE | 34 |
| COMPUTER INSTRUCTIONS FOR ANALYZING FUNCTIONAL RELATIONSHIPS BETWEEN ASSEMBLY GROUPS AND ASSEMBLIES | 35 |
| COMPUTER INSTRUCTIONS FOR CREATING A TAG BASED MODEL WITH TAGS AND VOTING INSTRUCTIONS | 36 |
| COMPUTER INSTRUCTIONS IN THE DATA STORAGE TO ASSIGN AT LEAST ONE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS (IPF) FOR A FACILITY IN REAL TIME | 37 |
| COMPUTER INSTRUCTIONS TO PROVIDE AN ACTUATOR TO APPLY A TAG TO ASSETS OF THE FACILITY | 39 |
| COMPUTER INSTRUCTIONS FOR ADDING A FUNCTIONAL SPECIFICATION OF THE INSTRUMENTED PROTECTIVE FUNCTION (IPF) FOR THE FACILITY IN REAL TIME, WHEREIN REAL TIME CAN BE A UNIT OF TIME THAT CAN BE LESS THAN 14 CALENDAR DAYS | 42 |
| COMPUTER INSTRUCTIONS FOR EXECUTING SIL CALCULATIONS THAT USE PHYSICAL SPECIFICATIONS, VOTING INSTRUCTIONS, AND TEST INTERVAL SPECIFICATIONS TO DETERMINE AN AVERAGE PROBABILITY OF FAILURE ON DEMAND FOR EACH INSTRUMENTED PROTECTIVE FUNCTION (IPF) | 46 |
| COMPUTER INSTRUCTIONS TO COMPARE IN REAL TIME ACTUAL SAFETY INTEGRITY LEVELS ACHIEVED AT THE FACILITY DETERMINED BY THE COMPUTER GENERATED SAFETY INSTRUMENTED MODEL TO USER SPECIFIED SAFETY INTEGRITY LEVELS AND IDENTIFY GAPS BETWEEN AN ACTUAL SAFETY INTEGRITY LEVELS AND USER SPECIFIED SAFETY INTEGRATION LEVELS FOR THE FACILITY | 47 |

FIGURE 10B

| | |
|---|---|
| FUNCTIONAL SPECIFICATION | 49 |
| PHYSICAL SPECIFICATIONS | 50 |
| COMPUTER INSTRUCTIONS TO PRESENT A LOGIC SOLVER AS A COMPONENT OF THE INSTRUMENTED PROTECTIVE FUNCTIONS TO EXECUTE THE VOTING INSTRUCTIONS TO CARRY OUT THE FUNCTIONS OF THE INSTRUMENTED PROTECTIVE FUNCTIONS AND TO CARRY OUT INSTRUCTIONS TO PERMIT A USER TO EDIT OR REPLACE ANY LOGIC SOLVER | 55 |
| COMPUTER INSTRUCTIONS FOR PERMITTING A USER TO CHANGE ANY ONE COMPONENT OR THE VOTING INSTRUCTIONS | 56 |
| COMPUTER INSTRUCTIONS THAT PROVIDE A CONNECTION TO TAG BASED ASSETS OF THE FACILITY | 58 |
| LOGIC SOLVER | 307 |
| COMPUTER INSTRUCTIONS FOR FORMING A CAUSE AND EFFECT REPORT USING THE RELATIONSHIP TABLES | 62 |
| TEST PLAN TEMPLATES | 68 |
| COMPUTER INSTRUCTIONS FOR INSTRUCTING THE PROCESSOR TO SELECT A TEST PLAN TEMPLATE BASED ON VOTING INSTRUCTIONS, AND USE PHYSICAL SPECIFICATIONS TO CREATE THE FUNCTIONAL TEST PLAN FOR AN ASSEMBLY, AN ASSEMBLY GROUP, AN IPF, OR COMBINATIONS THEREOF | 74 |
| COMPUTER INSTRUCTIONS TO GENERATE FUNCTIONAL TEST PLANS USING TEST PLAN TEMPLATES | 75 |
| COMPUTER INSTRUCTIONS TO USE THE RELATIONSHIP TABLES TO MATCH COMPONENTS TO COMPONENTS USED IN A FACILITY ASSET MANAGEMENT SYSTEM, COMPONENTS USED IN A FACILITY MAINTENANCE MANAGEMENT SYSTEM, AND COMBINATIONS THEREOF | 76 |
| COMPUTER INSTRUCTIONS FOR USING THE RELATIONSHIP TABLES TO UPDATE FROM THE FACILITY HISTORIAN OF A FACILITY | 91 |
| COMPUTER INSTRUCTIONS TO UPDATE ALL THE COMPONENT INFORMATION IN THE VARIOUS LIBRARIES SIMULTANEOUSLY | 94 |
| DOCUMENT LIBRARY | 299 |
| ASSEMBLY - COMPONENT RELATIONSHIP TABLE | 300 |
| LIBRARY OF PUBLICATIONS | 301 |
| ASSEMBLY LIBRARY | 308 |
| LOGIC SOLVER LIBRARY | 309 |
| COMPONENT LIBRARY | 316 |
| ASSEMBLY GROUP - ASSEMBLY RELATIONSHIP TABLE | 332 |
| ASSEMBLY GROUP LIBRARY | 342 |

(14)

| | |
|---|---|
| INSTRUMENTED PROTECTIVE FUNCTION (IPF)–ASSEMBLY GROUP RELATIONSHIP TABLE | 362 |
| INSTRUMENTED PROTECTIVE FUNCTION (IPF) LIBRARY | 372 |
| SAFETY INTEGRITY LEVEL (SIL) CALCULATIONS ENGINE | 379 |
| USER ENTERED ASSUMPTIONS FOR EACH IPF | 382 |
| USER SPECIFIED SAFETY INTEGRITY LEVELS | 384 |
| LOCATION TREE | 607 |
| COMPUTER INSTRUCTIONS TO PROVIDE A PAGE IDENTIFIER IN THE SIS MODEL, TO DISPLAY THE MODULE OF THE SIS MODEL THAT A USER IS WITHIN AT ANY TIME, WHICH WILL PROVIDE A HIERARCHY OF MODULES ASSOCIATED WITH THE USER LOCATION | 619 |
| COMPUTER INSTRUCTIONS FOR PROVIDING THE LOCATION TREE FOR EACH COMPONENT IN THE MODEL, EACH IPF, EACH ASSEMBLY, EACH ASSEMBLY GROUP AND COMBINATIONS THEREOF | 620 |
| COMPUTER INSTRUCTIONS FOR PERMITTING A USER TO EDIT OR REPLACE A COMPONENT, ASSEMBLY, VOTING INSTRUCTIONS FOR AN ASSEMBLY, ASSEMBLY GROUP, AN INSTRUMENTED PROTECTIVE FUNCTION OR COMBINATIONS THEREOF | 622 |
| COMPUTER INSTRUCTIONS TO PERMIT A USER TO EDIT OR REPLACE IN ANY ONE OF THE LIBRARIES, BY USING AN EDIT BUTTON IN THE LIBRARIES AND EDIT ANY ONE COMPONENT, ASSEMBLY, VOTING INSTRUCTIONS FOR AN ASSEMBLY, ASSEMBLY GROUP, AN INSTRUMENTED PROTECTIVE FUNCTION OR COMBINATIONS THEREOF | 623 |
| COMPUTER INSTRUCTIONS TO PERMIT A USER TO CHANGE THE RELATIONSHIP OF A COMPONENT TO A FUNCTION IN AN ASSEMBLY COMPONENT RELATIONSHIP TABLE USING AN EDIT BUTTON AND TO GENERATE A SAFETY REQUIREMENTS SPECIFICATION FOR THE SIS AND USING COMPUTER INSTRUCTIONS ALLOWING A USER TO EDIT THE SAFETY REQUIREMENTS SPECIFICATION FOR THE SIS | 624 |
| COMPUTER INSTRUCTIONS FOR GENERATING A SAFETY REQUIREMENTS SPECIFICATION FOR THE SIS | 627 |
| COMPUTER INSTRUCTIONS FOR ALLOWING A USER TO EDIT THE SAFETY REQUIREMENTS SPECIFICATION FOR THE SIS | 629 |
| COMPUTER INSTRUCTIONS TO SUPPORT MANAGEMENT OF CHANGE (MOC) FOR DATA RECORDS IN THE SYSTEM BY SUPPORTING "MASTER" RECORDS BEING UNTOUCHED WHILE "PROJECT" COPIES OF THE DATA RECORDS CAN BE EDITED AND MANIPULATED BY USERS, WHICH OPERATION CAN BE ALSO KNOWN AS "SANDBOX" | 631 |
| COMPUTER INSTRUCTIONS FOR PERMITTING A USER TO CHECK EACH EDITED RECORD, MARK EACH RECORD AS CHECKED, APPROVED, AND THEN MOVE THE CHECKED AND APPROVED RECORD TO "MASTER" RECORDS BY A QUALIFIED USER | 649 |

| | |
|---|---|
| DATA STORAGE | 14 |
| DOCUMENT LIBRARY | 299 |
| DOCUMENT | 298a |
| DOCUMENT | 298b |
| DOCUMENT | 298c |
| ASSEMBLY LIBRARY | 308 |
| ASSEMBLY | 19a |
| ASSEMBLY | 19b |
| ASSEMBLY | 19c |
| TEST INTERVAL SPECIFICATION | 21a |
| TEST INTERVAL SPECIFICATION | 21b |
| TEST INTERVAL SPECIFICATION | 21c |
| LOGIC SOLVER LIBRARY | 309 |
| LOGIC SOLVER | 307a |
| LOGIC SOLVER | 307b |
| LOGIC SOLVER | 307c |
| COMPONENT LIBRARY | 316 |
| COMPONENT | 17a |
| COMPONENT | 17b |
| COMPONENT | 17c |
| ASSEMBLY GROUP LIBRARY | 342 |
| ASSEMBLY GROUP | 13a |
| ASSEMBLY GROUP | 13b |
| ASSEMBLY GROUP | 13c |
| INSTRUMENTED PROTECTIVE FUNCTION (IPF) LIBRARY | 372 |
| INSTRUMENTED PROTECTIVE FUNCTIONS (IPFS) | 38a |
| INSTRUMENTED PROTECTIVE FUNCTIONS (IPFS) | 38b |
| INSTRUMENTED PROTECTIVE FUNCTIONS (IPFS) | 38c |
| INSTRUMENTED PROTECTIVE LAYER (IPF) IDENTIFIER | 374 |
| NAME OF AN INSTRUMENTED PROTECTIVE FUNCTION (IPF) | 376 |
| INPUT GROUP VOTING INSTRUCTION | 378 |
| OUTPUT GROUP VOTING INSTRUCTION | 380 |
| CALCULATED INSTRUMENTED PROTECTIVE FUNCTION PROBABILITY OF FAILURE ON DEMAND | 381 |
| ACTUATOR TO PERMIT OVERRIDE | 383 |
| INSTRUMENTED PROTECTIVE FUNCTION ACHIEVED RISK REDUCTION FACTOR | 385 |

FIGURE 11B

| | |
|---|---|
| ACHIEVED RISK REDUCTION FACTOR | 14 / 372 / 2412 |
| REAL WORLD MODEL OF INSTRUMENTED PROTECTIVE FUNCTIONS FOR A FACILITY | 2413 |
| TYPE OF WORK LIBRARY | 2000 |
| WORK NAMES | 2001 |
| WORK NAME IDENTIFIER | 2004 |
| IMPACT IDENTIFIER | 2006 |
| ACCOUNTABILITY LIBRARY | 2010 |
| SINGLE POINTS OF ACCOUNTABILITY | 2012 |
| WORK NAME IDENTIFIER | 2004 |
| SINGLE POINT OF ACCOUNTABILITY NAME | 2014 |
| STAKEHOLDER LIBRARY | 2020 |
| TYPES OF STAKEHOLDER | 1802 |
| STAKEHOLDER NAMES | 2022 |
| STAKEHOLDER DESCRIPTIONS | 2024 |
| ACTION LIBRARY | 2031 |
| ACTION NAMES | 2032 |
| ACTION NUMBER | 2038 |
| PROJECT NAMES | 2034 |
| LOCATION NAMES | 325 |
| WORK NAME IDENTIFIER | 2004 |
| STAKEHOLDER NAME | 2022 |
| PERCENT COMPLETE VALUE | 2036 |
| COMPUTER INSTRUCTIONS TO CREATE GAP ASSIGNMENT REPORTS | 3034 |
| GAP ASSIGNMENT SUMMARY REPORT | 2051 |
| GAP ASSIGNMENT BY CATEGORY REPORT | 2150 |
| GAP ASSIGNMENT BY ACTION REPORT | 2250 |
| ACTION PLAN DETAIL REPORT | 2350 |
| COMPUTER INSTRUCTIONS TO CONNECT DATA OF A PROCESS HAZARD ANALYSIS AND LAYERS OF PROTECTION ANALYSIS TO A SAFETY INTEGRITY LEVEL CALCULATIONS FOR THE FACILITY WITH THE GAP ASSIGNMENT MODEL | 3036 |
| COMPUTER INSTRUCTIONS TO SUPPORT ANALYSIS OF PROTECTION LAYERS TO BE APPLIED TO REDUCE PROBABILITY OF A HAZARDOUS EVENT OCCURRING FOR THE FACILITY WITH THE GAP ASSIGNMENT MODEL | 3038 |

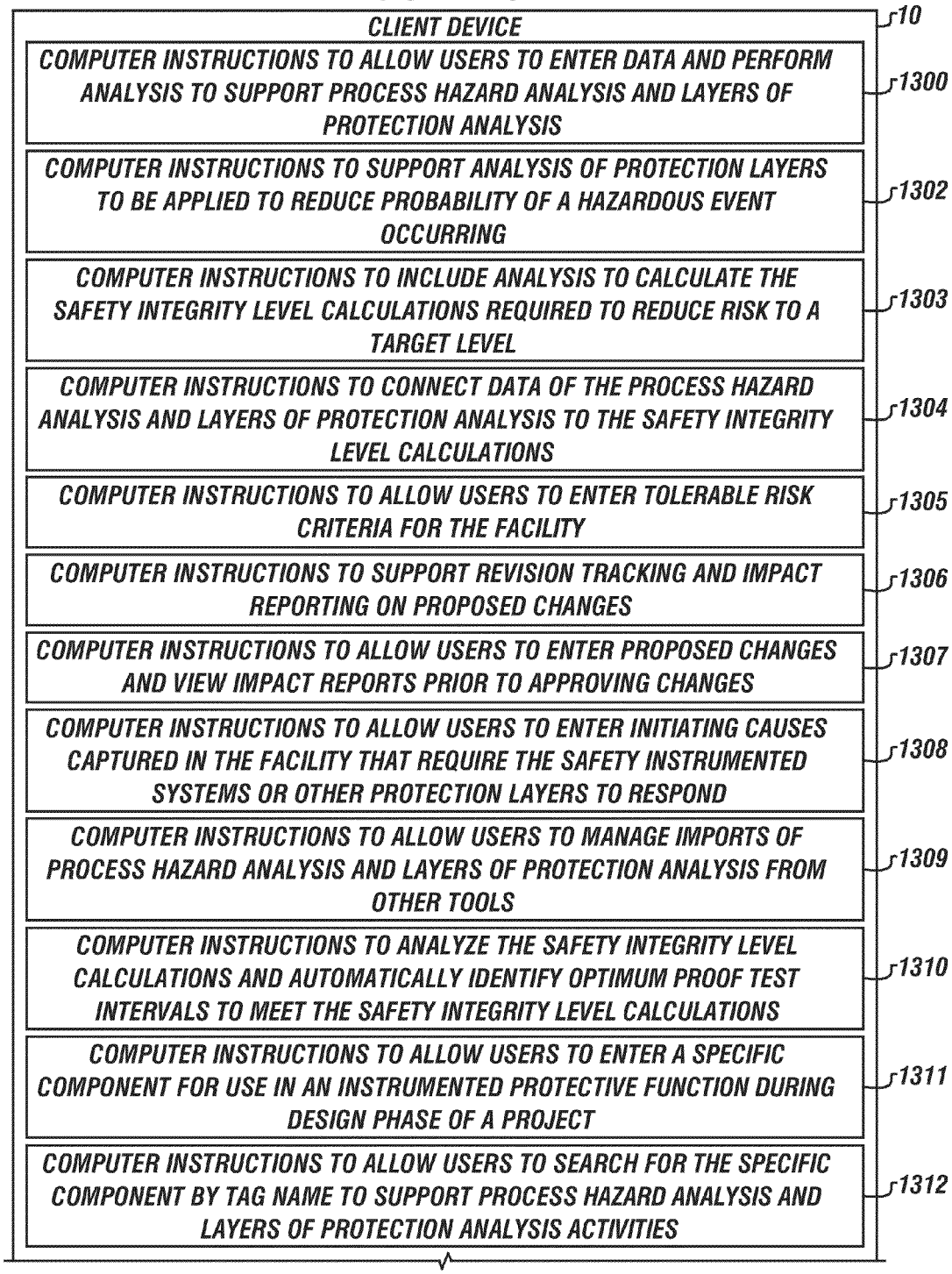

| | |
|---|---|
| COMPUTER INSTRUCTIONS TO GENERATE FACILITY ACCEPTANCE TESTS USING A SOFTWARE MODEL OF PHYSICAL AND FUNCTIONAL SPECIFICATIONS | 1326 |
| SOFTWARE MODEL OF PHYSICAL AND FUNCTIONAL SPECIFICATIONS | 1327 |
| COMPUTER INSTRUCTIONS TO GENERATE SITE ACCEPTANCE TESTS USING THE SOFTWARE MODEL OF PHYSICAL AND FUNCTIONAL SPECIFICATIONS | 1328 |
| COMPUTER INSTRUCTIONS TO GENERATE FUNCTIONAL TEST PLANS FOR EACH SAFETY INSTRUMENTED FUNCTION OF THE INSTRUMENTED PROTECTIVE FUNCTION | 1329 |
| COMPUTER INSTRUCTIONS TO GENERATE A CRITICAL ALARM LIST INCLUDING RISK RANKING OF HAZARDS TO WHICH ALARMS APPLY | 1330 |
| COMPUTER INSTRUCTIONS TO GENERATE A REPORT OF TEST PERFORMANCE FOR CRITICAL ALARMS | 1331 |
| COMPUTER INSTRUCTIONS TO GENERATE A REPORT SHOWING IMPACT OF BYPASSING ON A RISK GAP BEING OPENED BY PLACING EQUIPMENT IN BYPASS | 1332 |
| COMPUTER INSTRUCTIONS TO CATEGORIZE FAILURES FROM FAILURE RATE ANALYSIS AND PROVIDE STATISTICALLY ANALYZED FAILURE RATES TO BE USED IN SAFETY INTEGRITY LEVEL CALCULATIONS | 1333 |
| COMPUTER INSTRUCTIONS TO ALLOW USERS TO SELECT WHICH SET OF RELIABILITY DATA THEY WANT TO USE | 1334 |
| RELIABILITY LIBRARY | 1335 |
| COMPUTER INSTRUCTIONS AND SYSTEM ARCHITECTURE TO SUPPORT MANAGEMENT OF CHANGE (MOC) OF DATA RECORDS | 1336 |
| COMPUTER INSTRUCTIONS THAT PERMIT A USER TO CHANGE ANY ONE COMPONENT, ONE ASSEMBLY, ONE ASSEMBLY GROUP, OR COMBINATIONS THEREOF OR THE VOTING INSTRUCTIONS OF A TAG BASED SOFTWARE MODEL | 1338 |
| COMPUTER INSTRUCTIONS THAT PROVIDE A CONNECTION TO TAG BASED ASSETS OF THE FACILITY THAT ALLOWS TRANSFER OF DATA FROM TAG BASED ASSETS TO THE DATA STORAGE ASSOCIATED WITH THE PROCESSOR | 1340 |
| COMPUTER INSTRUCTIONS TO ASSIGN A TAG NAME TO AT LEAST ONE COMPONENT IDENTIFIER WHILE ASSIGNING THE VOTING INSTRUCTION TO AT LEAST ONE ASSEMBLY IDENTIFIER AND AT LEAST ONE ASSEMBLY GROUP IDENTIFIER, CREATING THE COMPUTER GENERATED SAFETY INSTRUMENTED MODEL WITH A FUNCTIONAL SPECIFICATION AND A PHYSICAL SPECIFICATION FOR ALL OF THE INSTRUMENTED PROTECTIVE FUNCTIONS (IPF) FOR A FACILITY IN REAL TIME | 1341 |
| COMPUTER INSTRUCTIONS TO USE RELATIONSHIP TABLES AND LIBRARIES TO FORM A CAUSE AND EFFECT REPORT | 1342 |

METHOD TO BUILD, ANALYZE AND MANAGE A SAFETY INSTRUMENTED MODEL IN SOFTWARE OF A SAFETY INSTRUMENTED SYSTEM ARCHITECTURE FOR SAFETY INSTRUMENTED SYSTEMS IN A FACILITY

CROSS REFERENCE TO RELATED APPLICATIONS

The present application is a Continuation in Part of co-pending U.S. patent application Ser. No. 13/966,241, filed on Aug. 13, 2013, entitled METHOD TO BUILD, ANALYZE AND MANAGE A REAL WORLD MODEL IN SOFTWARE OF A SAFETY INSTRUMENTED SYSTEM ARCHITECTURE FOR SAFETY INSTRUMENTED SYSTEMS IN A FACILITY," which is a Continuation in Part of U.S. patent application Ser. No. 13/251,051, filed on Sep. 30, 2011, entitled "SYSTEM TO BUILD, ANALYZE AND MANAGE A REAL WORLD MODEL IN SOFTWARE OF A SAFETY INSTRUMENTED SYSTEMS IN A FACILITY," issued as U.S. Pat. No. 8,521,676 on Aug. 27, 2013, which claims priority to U.S. Provisional Patent Application Ser. No. 61/388,423 and U.S. Provisional Patent Application Ser. No. 61/388,437, which were both filed on Sep. 30, 2010. These references are incorporated herein in their entirety.

FIELD

The present embodiments generally relate to a method to generate, manage, analyze, or combinations thereof, a real world model in software of a safety instrumented system (SIS) architecture for safety instrumented systems in a facility.

BACKGROUND

A need exists for a method that can target risk reduction requirements versus achieved results from safety integrity level (SIL) calculations for a facility having a hazard and risk assessment and an associated layer of protective analysis (LOPA).

A further need exists for a method that compares test intervals assumed in safety integrity level (SIL) calculations to actual test completions being recorded.

Another need exists for a method which can compare device failure rates assumed in safety integrity level (SIL) calculations versus actual failure rates recorded.

A need exists for a method that provides a downtime estimate for repair on devices, software, or processes, or even an entire facility in safety integrity level (SIL) calculations and compares that downtime estimate to actual availability with actual time in a bypass situation.

A need exists for a method that identifies demand sources and causes named in at least a layer of protective analysis (LOPA), and compares the identified demand sources to actual demands as recorded.

A need exists for a method that identifies safety instrumented system (SIS) lifecycle phases required for projects versus phases of completed projects on a real time dashboard for multiuser viewing.

The present embodiments meet these needs.

BRIEF DESCRIPTION OF THE DRAWINGS

The detailed description will be better understood in conjunction with the accompanying drawings as follows:

FIGS. 1A-1E depict a sequence of steps to create the real world model used to make the gap assignment model.

FIG. 2A depicts the component library according to one or more embodiments.

FIG. 2B shows the assembly library according to one or more embodiments.

FIG. 2C shows the logic solver library according to one or more embodiments.

FIG. 2D depicts the assembly—component relationship table according to the method.

FIG. 2E depicts the assembly group library according to one or more embodiments.

FIG. 2F depicts the assembly group—assembly relationship table according to one or more embodiments.

FIG. 3A shows the instrumented protective function (IPF) library according to one or more embodiments.

FIG. 3B shows the instrumented protective function (IPF)—assembly group relationship table according to one or more embodiments.

FIG. 3C shows a document library according to one or more embodiments.

FIG. 3D shows the library of publications according to one or more embodiments.

FIG. 6 is a view of a test plan template with a location tree according to one or more embodiments.

FIGS. 7A and 7B are an example of a test plan template that has been modified to a functional test plan.

FIG. 8A shows the facility asset/maintenance management system table according to one or more embodiments.

FIG. 8B shows the assembly data used for a safety integrity level (SIL) calculations table according to one or more embodiments.

FIG. 9 depicts an overview of equipment and network usable with the computer instructions to generate the gap assignment model using a real world model of a safety instrumented system (SIS) architecture for SIS in a facility.

FIGS. 10A-10C depict details of the data storage and computer instructions contained therein for implementing the method.

FIGS. 11A-11E depict details of the data storage and computer instructions contained therein for implementing the method.

FIGS. 13A-13C depict the client device, which can include various additional computer instructions usable with the executive dashboard.

FIG. 18 depicts a display of a stakeholder library used in the gap assignment model according to one or more embodiments.

FIG. 19 depicts a display of an action library used in the gap assignment model according to one or more embodiments.

FIG. 23 depicts a display of an action plan detail report usable with the gap assignment model according to one or more embodiments.

Figure 1E:
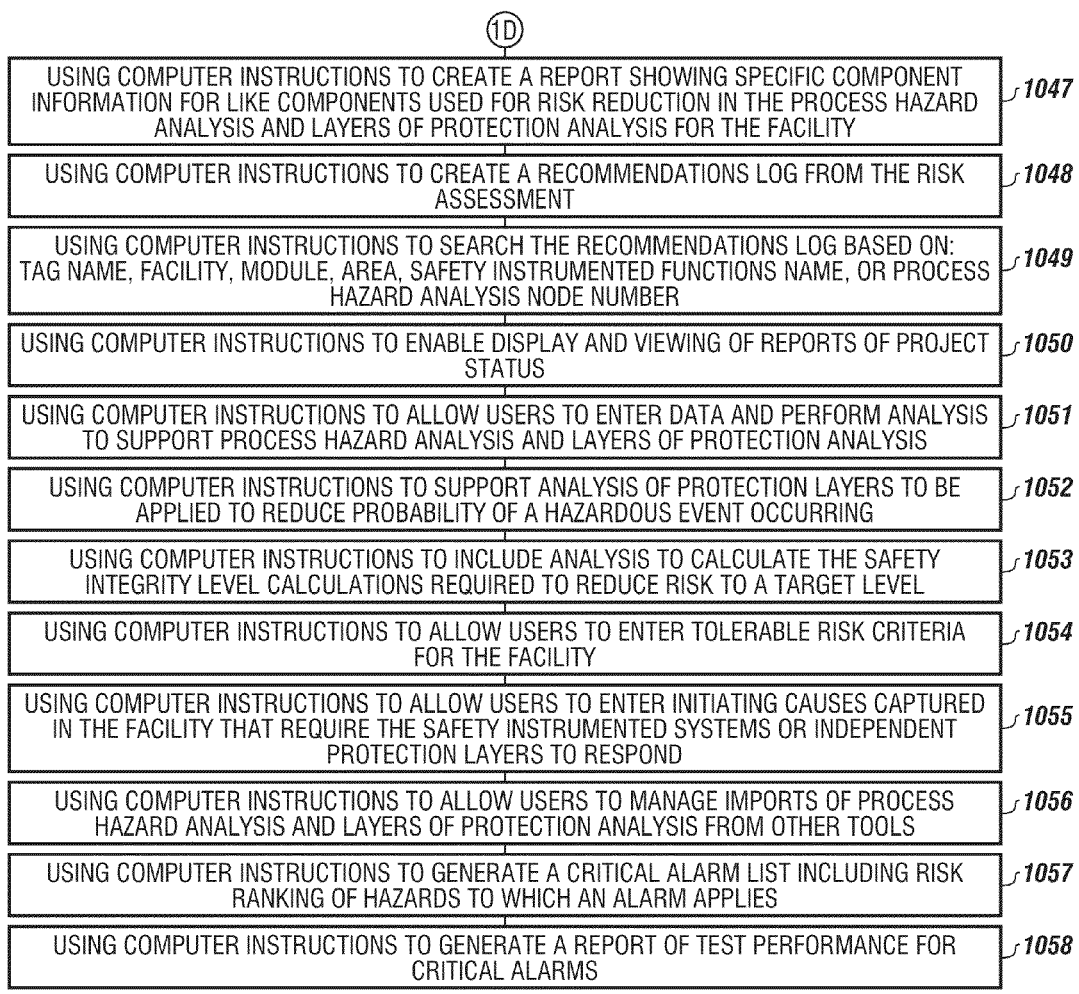

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments relate to a method for computer generating a gap assignment model for managing and tracking gap closure activities for a safety instrumented system of a facility.

The gap assignment model has at least one action plan name.

The gap assignment model uses a real world model of an instrumented protective function.

The method for computer generating a gap assignment model involves connecting a processor to a data storage and a network to communicate with at least one client device.

The method uses non-transitory computer instructions in the data storage to form a type of work library for a facility, where the type of work library has work names. Each work name includes a work name identifier and an impact identifier.

The method uses non-transitory computer instructions in the data storage to form an accountability library. The accountability library has a plurality of single points of accountability. Each single point of accountability includes a work name identifier and a single point of accountability name.

The method uses non-transitory computer instructions in the data storage forming a stakeholder library for a facility. The stakeholder library has a plurality of stakeholder names and stakeholder descriptions.

The method uses non-transitory computer instructions in the data storage to form an action library for a facility.

The action library has a plurality of action names. Each action name has an action number. The action library has a plurality of project names with each of the action names in the action library being connected to at least one project name. The action library includes location names. One of the location names is connected to at least one action name.

The action library has a work name identifier for each of the action names. The action library includes a stakeholder name for each action name. The action library has a percent complete value for each action name.

The method further uses non-transitory computer instructions in the data storage to form a library of instrumented protective function for a facility.

The library of instrumented protective functions has an instrumented protective function identifier; a name of an instrumented protective function (IPF); an achieved risk reduction factor; and a real world model of instrumented protective functions for a facility.

The method uses non-transitory computer instructions in the data storage to form a layer of protection analysis with target risk reduction factor.

The method uses non-transitory computer instructions in the data storage to form an action plan library. The action plan library has action plan names.

The action plan library has non-transitory computer instructions to retrieve target risk reduction factors from the layer of protection analysis and non-transitory computer instructions to retrieve achieved risk reduction factors from the instrumented protective function library.

The action plan library has non-transitory computer instructions to calculate a gap between a retrieved target risk reduction factor and a retrieved achieved risk reduction factor. The action plan library contains non-transitory computer instructions to match at least one action name from the action library with one of the action plan names.

The action plan library contains non-transitory computer instructions to enter and connect a proposed risk reduction factor for each action name that is connected to an action plan name to reduce the gap between a retrieved target risk reduction factors and a retrieved achieved risk reduction factor.

The method uses non-transitory computer instructions in the data storage to simulate solutions to close a gap in safety or a gap in environment between the retrieved target risk reduction factor and the retrieved achieved risk reduction factor and display a hypothetical percent of risk reduced by each solution.

The method further uses non-transitory computer instructions in the data storage to calculate a relative risk reduction factor for each action connected to an action plan, and using the real world model with the instrumented protective function and the instrumented protective function identifier to form a gap assignment model for a facility having at least one instrumented protective function.

The method also uses non-transitory computer instructions in the data storage to identify an action state for each action connected to an action plan created in the gap assignment model; and uses non-transitory computer instructions in the data storage to calculate a work in progress risk reduction factor for an action plan with actions that have been marked as work in progress.

As a last step of the method, non-transitory computer instructions in the data storage are used to calculate a remaining risk reduction factor for an action plan with actions that have been marked as work in progress. In embodiments, the method further uses non-transitory computer instructions in the data storage to create gap assignment reports.

Some of the gap assignment reports, which can be transmitted for viewing on the client devices, can be a gap assignment summary report, a gap assignment by category report, a gap assignment by action report; and an action plan detail report.

In embodiments, the method has in the instrumented protective function (IPF) library: a protective layer identifier, an instrumented protective function name, a calculated instrumented protective function probability of failure on demand, and an instrumented protective function achieved risk reduction factor.

In embodiments, the method uses non-transitory computer instructions in the data storage to connect data of a process hazard analysis and layers of protection analysis to a safety integrity level calculations for the facility with the gap assignment model.

In embodiments, the method uses non-transitory computer instructions in the data storage to support analysis of protection layers to be applied to reduce probability of a hazardous event occurring for the facility with the gap assignment model.

In embodiments, the method uses non-transitory computer instructions in the data storage to calculate the safety integrity level calculations required to reduce risk to a target level for a facility with the gap analysis model.

The method helps prevent explosions in a facility by making measurements for safety device that can be used to predict the possibility of loss of containment of dangerous, volatile, and explosive and otherwise hazardous and toxic materials on a hazard by hazard basis.

The method provides a comparison of target risk reduction requirements to achieved results from safety integrity level (SIL) calculations for a facility having a hazard and risk assessment and an associated layer of protective analysis (LOPA).

The method helps prevent environmental spills by predicting when particular devices will become defective.

The method compares test intervals assumed in safety integrity level (SIL) calculations to actual test completions being recorded at a facility.

The method enables facilities to be safer for humans to work in and breathe in because the method can predict when emissions are more likely to occur or excursions that would be disastrously harmful to neighboring farms, children, and localities nearby the facility.

The method can compare device failure rates assumed in safety integrity level (SIL) calculations versus actual failure rates recorded at a facility.

The method helps prevent the loss of life or injury because the method identifies which protective layers prevent multiple permanent injuries and which protective layers prevent loss of life.

The method provides a downtime estimate for repair of devices, software, processes, or even an entire facility in safety integrity level (SIL) calculations and compares that downtime estimate to actual availability with actual time in a bypass situation.

Had this method been in place on the BP rig in the Gulf of Mexico which caused one of the largest disasters in United States history, the method could have significantly helped in identifying the blow out preventer defect due to its faulty maintenance schedule.

The method can have both (1) alerted rig operators in real time to faulty maintenance, and (2) provided documentation in real time, practically instantaneously, that the rig was late with its preventive maintenance which would have been very helpful to prevent proceeding under the faulty maintenance situation and thereby saving the 11 human lives lost and prevented spilling the millions of gallons of oil into the Gulf of Mexico.

The unique method identifies demand sources and causes named in at least a layer of protective analysis (LOPA), and compares the identified demand sources to actual demands as recorded regarding at least a portion of a facility.

The method identifies safety instrumented system (SIS) lifecycle phases required for projects versus phases of completed projects on a real time dashboard for multiuser viewing.

The present embodiments generally relate to a method to computer generate, manage, and analyze, a software model of a safety instrumented system (SIS) architecture for safety instrument systems (SIS) in a facility, such as a low oxygen shut down interlock architecture for a burner management system in a refinery.

The safety instrumented system architecture for a safety instrumented system in a facility can include at least one instrumented protective function (IPF) such as a high stack temperature interlock.

For the purpose of this application the term "instrumented protective function" (IPF) means, an instrumented protective function or other protective layer, for a component, an assembly, an assembly group or combination thereof, such as operator alarm, safety relief valve, or a basic process control interlock.

The term "average probability of failure on demand" as used herein can refer to an average probability for either: an assembly probability of failure on demand 327 as calculated by a SIL calculation engine; a probability of failure on demand (PFD) for the logic solver, calculated assembly group failure on demand, calculated instrumented protective function probability of failure on demand, or combinations thereof.

The term "average probability of failure on demand" can refer to the probability or likelihood that the safety function, which can be a connected series of equipment or individual components of the safety function will fail to perform intended functions at the time a hazardous event occurs.

The term "functional specification" for all of the instrumented protective functions for the facility in real time refers to the logic used by the safety instrumented system (SIS) to describe the behavior required from the SIS. The functional specifications define expected changes in output states of the components used in the SIS based on current input component status.

The term "physical specification" for all of the instrumented protective functions for the facility in real time refers to the architecture of the safety instrumented system (SIS) which includes equipment redundancy, equipment types, and installation details.

The term "facility" in this application can refer to a chemical plant, a refinery or another type of manufacturing facility, transport vehicles, or moveable equipment that are connected or related thereto.

The term "real time" as used herein, can refer to a unit of time that can be from 1 day to 30 days, for example, 7 calendar days in order to make a new evaluation or new safety integrity level SIL calculation as required by the method.

The term "component" and "instrument" can be used interchangeably in this application.

The term "assembly" refers to one or more connected components or instruments.

The term "assembly group" refers to one or more connected assemblies.

The term "test plan" refers to one or more plans to verify that the instrumented protective functions (IPF) are performing as expected. Embodiments of the present invention can include using multiple test plans in combination to incorporate multiple IPFs to test an entire safety instrumented system (SIS).

The term "type of work library" refers to the descriptions of the project work that may be involved.

The term "accountability library" refers to the progression of a project to the status of closed.

The term "stakeholder library" refers to a group or team that has ownership of one or more projects.

The term "action library" refers to a portion of the overall difference between the target and achieved assigned to the project.

The term "gap assignment summary report" refers to a report that provides a high-level snapshot of the overall progress of gap closure.

The term "gap assignment by category report" refers to a report that breaks down the percentages of work by: stakeholder, single point of accountability, and types of work.

The term "gap assignment by action report" refers to a report that provides a list of action plans and shows the percentages of impact of each action plan defined at the location level.

The term "action plan detail report" refers to a report that provides a list of action plans and shows the percentages off of each action plan defined at the location level.

The term "action plan library" refers to a library that allows users to create and manage action plans associated with an Xref and IPF. Each action on a plan represents an item that will in some way close part of the target associated with the Xref.

The term "safety integrity level" (SIL) refers to a discrete level, one out of four for specifying the safety integrity requirements of a safety instrumented function to be allocated to the safety integrated system. Safety integrity level 1 (SIL) 1 has the lowest level of safety integrity; safety integrity level 4 (SIL) 4 has the highest. See, for example, the definition used in the International Electrotechnical Commission standard known as "IEC" Number 61511-1 from 2002 provides clear definitions of an SIL.

The term "architectural constraint requirements" refers to the redundancy of equipment required to achieve a desired safety integrity level (SIL). Additional redundancy may be required to reach a higher safety integrity levels and maintain instrumented protective function (IPF) architectural constraint requirement for a safety instrumented system SIS.

The term "facility historian" as used herein includes computer software and/or hardware system(s) that is connected to a logic solver (for example the basic process control system that provides continuous control of the facility equipment) that provide continuous collection of potentially large volumes of data and combine advanced data storage and compression techniques to capture and store time-series information in real time that help management evaluate a facility's process operating conditions and make performance decisions.

The method to computer generate a real world model in software can be in support of process safety lifecycle management.

Process safety lifecycle management can be a management process for monitoring and studying the integrity of pieces of equipment, procedures and processes, functions, and software that can be designed for use in a facility and to predict when these items need to be repaired, replaced, cleaned or upgraded or some similar activity to ensure they keep working in their optimum condition and most desirably according to their design specifications.

The method uses a processor and connected data storage. The processor can be a laptop or server with a processor. The processor with connected data storage can connect to a client device, which can also have processors and connected data storage to allow processing of the information from remote locations and viewing of information from remote locations.

The data storage can be an integral data storage, a jump drive capable of holding gigabytes, or a data storage at another location, remote to the location of the processor.

The method uses various non-transitory computer instructions in computer readable media in a series of steps to create a real world mathematical model for enabling compliance with various OSHA, EPA and other regulations at a facility or a production unit and for input from users connected via a network, wherein the users can be computers.

The term "an instrumented protective functions (IPF) library" refers to a library containing IPF identifier, a name, an input group voting, an output group voting, a document identifier, a calculated instrumented protective function probability of failure and an actuator to permit override.

Turning now to the Figures, FIGS. 1A-1E depicts the steps of the method.

The method can include connecting a processor to a data storage and a network to communicate with at least one client device, wherein the client device has a client device processor and client device data storage, and input and output ports, as shown in step 1001.

An embodiment of the method can include using computer instructions to provide a location tree for each component in the model, each IPF, each assembly, each assembly group and combinations thereof, as shown in step 1002.

An embodiment of the method can include using computer instructions to provide a page identifier in the SIS model, to display the module of the SIS model that a user is within at any time on demand or at a preset time interval, which will provide a hierarchy of modules associated with the user location, as shown in step 1003.

In embodiments of the test plan template this can be noted in the "you are here" indicator.

The method can include using computer instructions to form a component library for a facility for a plurality of components consisting of a component identifier, tag name, component type and equipment type, as shown in step 1004.

An embodiment of the method can include using computer instructions to permit a user to edit or replace in any one of the libraries, by using an edit button in the libraries for any one component, assembly, voting instructions for an assembly, assembly group, an instrumented protective function or combinations thereof, as shown in step 1005.

In an embodiment, the method can include using computer instructions to provide an actuator to apply a tag to assets of the facility, as shown in step 1006.

In an embodiment, the method can include using computer instructions to enable users to enter a specific component for use in an instrumented protective function during design phase of a project, as shown in step 1007.

In an embodiment, the method can include using computer instructions to import data for an existing facility asset management system to populate a component library in the data storage, as shown in step 1008.

In an embodiment, the method can include using computer instructions to create a report identifying deviations between the facility asset management system of the facility and the imported data in the data storage, as shown in step 1009.

In an embodiment, the method can include using computer instructions to generate a report showing impact of bypassing on a risk gap being opened by placing equipment in bypass, as shown in step 1010.

In an embodiment, the method can include using computer instructions to assign a tag name to at least one component identifier while assigning the voting instruction to at least one assembly identifier and at least one assembly group identifier, creating the computer generated safety instrumented model with a functional specification and a physical specification for all of the instrumented protective functions for a facility in real time, as shown in step 1011.

In an embodiment, the method can include using computer instructions to determine functional relationships between assembly groups and assemblies, and create a tag based software model which can have tags and voting instructions to be used between assembly groups and assemblies, as shown in step 1012.

The method can include using computer instructions to form an assembly library for the facility with each assembly having assembly identifier; a name, assembly type, a location, and a test interval specification, as shown in step 1013.

The method can include using computer instructions to form an assembly —component relationship table, wherein the component library and the assembly library enable the assembly—component relationship table to depict a relationship between one of the assemblies and at least one component using the component identifier, the assembly identifier and a purpose for each component connected to an assembly identifier, as shown in step 1014.

In an embodiment, the method can include using computer instructions to include a logic solver as a component of the instrumented protective functions to execute the voting instructions to carry out the functions of the instrumented protective functions and to carry out instructions to permit a user to edit or replace any logic solver, as shown in step 1015.

In an embodiment, the method can include using computer instructions to match the asset identifier from the component library for a facility to components used in a facility asset management system, and to match components used in a facility maintenance management system, and combinations thereof; wherein the matching of components matches: failure rates in the safety integrity level calculations compared to actual failure rates recorded by the facility asset management system or a facility maintenance management system; test intervals in the safety integrity level calculations compared to actual test intervals recorded by the facility asset management system or the facility maintenance management system; or trip points of parameters for each assembly compared to trip points recorded by the facility asset management system or the maintenance management system, as shown in step 1016.

In an embodiment, the method can include using computer instructions to further use the relationship tables to match components from the component library for a facility to components in a facility historian using the asset identifier from the component library and recording the matched components, wherein the matching of components additionally validates a mean time to repair in the safety integrity level calculation as compared with actual unavailability time calculated by the facility historian, as shown in step 1017.

In an embodiment, the method can include using computer instructions in the data storage to form an assembly group library for the facility using an assembly group identifier, voting instructions, and a group types, as shown in step 1018.

In some embodiments, the method can include using computer instructions to form, store and use a document library, as shown in step 1019.

The document library can include a document identifier that provide a link to the document library and document types.

Document types can be cause and effect diagram document; safety requirements specification document; layer of protective analysis document types, test plan procedures; SIL calculation modeling files; override risk assessment; and safety integrity level calculation, or combinations thereof.

The document library can include document names and document descriptions.

In embodiments, the method can include using computer instructions to form an assembly group—assembly relationship table, wherein the assembly group library and the assembly library enable the assembly group—assembly relationship table to depict a relationship between at least one assembly group and at least one assembly and to provide a parameter for each assembly using an assembly group identifier, an assembly identifier, an assembly parameter identifier, and an assembly parameter value, as shown in step 1020.

In an embodiment, the method can include using computer instructions to permit a user to change the relationship of a component to a function in an assembly component relationship table using an edit button and to generate a safety requirements specification for the SIS and using computer instructions allowing a user to edit the safety requirements specification for the SIS, as shown in step 1021.

In embodiments, the method can include using computer instructions to form an instrumented protective function library for the facility having instrumented protective function identifier, an instrumented protective function name; an input group voting; and an output group voting, as shown in step 1022.

In embodiments, the method can include using computer instructions to form an instrumented protective function (IPF)—assembly group relationship table wherein the instrumented protective function library and the assembly groups library enable the instrumented protective function (IPF)—assembly group relationship table to depict a relationship between at least one instrumented protective function and at least one assembly group, forming a safety instrumented system (SIS) with at least one instrumented protective function creating a real world model of the instrumented protective function (IPF) using an instrumented protective function identifier, an assembly group identifier, and a relationship identifier, as shown in step 1023.

In embodiments, the method can include using computer instructions to assign at least one voting instruction to at least one assembly identifier and at least one assembly group identifier, creating the computer generated safety instrumented model with a functional specification and a physical specification for all of the instrumented protective functions for a facility in real time, as shown in step 1024.

In an embodiment, the method can include using computer instructions to update all instances of a component, an assembly, an assembly group, an instrumented protective function, or combinations thereof simultaneously as the update is inputted into the model, as shown in step 1025.

In embodiments, the method can include using computer instructions to execute safety integrity level calculations using: a logic solver with a logic solver library wherein the logic solver library comprises a logic solver identifier, a logic solver location, a name and a testing interval; a safety integrity level calculation engine; a plurality of components each having a tag name with voting instructions; functional specifications for each IPF; physical specifications for each IPF; user entered assumptions for each IPF; and wherein the SIL calculations identifies and verifies that the SIL calculations are met simultaneously for each IPF providing an average probability of failure on demand for the IPF; and architectural constraint requirements for the IPF, as shown in step 1026.

In embodiments, the method can include using computer instructions to compare in real time actual safety integrity levels achieved at the facility determined by the computer generated safety instrumented model to user specified safety integrity levels and identify gaps between an actual safety integrity levels and user specified safety integration levels for the facility, as shown in step 1027.

In an embodiment, the method can include using computer instructions to form, store and use a library of publications which is viewable for compliance, as shown in step 1028.

The library of publications can include statutes; industry standards; national regulation; and business owner specific policies and combinations thereof.

In an embodiment, the method can include using computer instructions to use the relationship tables to form a cause and effect report for a user for each IPF, as shown in step 1029.

In an embodiment, the method can include using computer instructions to instruct the processor to select a test plan template from the plurality of test plan templates using functional specifications, physical specifications and a member of the group consisting of: an assembly, an assembly group, an instrumented protective function, or combinations thereof and generating functional test plans for a member of the group consisting of: an assembly, an assembly group, an instrumented protective function, and combinations thereof; using at least one of a plurality of test plan templates stored in the data storage, as shown in step 1030.

In an embodiment, the method can include using computer instructions to generate a safety requirements specification for the SIS and using computer instructions allowing a user to edit the safety requirements specification for the SIS, as shown in step 1031.

In an embodiment, the method can include using computer instructions to connect data of the process hazard analysis and layers of protection analysis to the safety integrity level calculations, as shown in step 1032.

In an embodiment, the method can include using computer instructions to analyze the safety integrity level calculations and automatically identify optimum proof test intervals to meet the safety integrity level calculations, as shown in step 1033.

In an embodiment, the method can include using computer instructions to enable searching for a specific component by tag name to support process hazard analysis and layers of protection analysis, as shown in step 1034.

In an embodiment, the method can include using computer instructions to allow calculations that allow users to compare at least two possible architectures for a safety instrumented function, as shown in step 1035.

In an embodiment, the method can include using computer instructions to allow users to create copies of a first possible architecture and make modifications of the first possible architecture, as shown in step 1036.

In an embodiment, the method can include using computer instructions to allow users to change the architecture currently marked, as shown in step 1037.

In an embodiment, the method can include using computer instructions to enable editing of cause and effect documents, and allow the users to add cause and effect documents not used in the safety integrity level calculations, as shown in step 1038.

In an embodiment, the method can include using computer instructions to create protections layers not used in layers of protection analysis or the safety integrity level calculations, as shown in step 1039.

In an embodiment, the method can include using computer instructions to enter effects as additional actions into the formed computer generated safety instrumented model, as shown in step 1040.

In an embodiment, the method can include using computer instructions to generate facility acceptance tests using a software model of physical and functional specifications, as shown in step 1041.

In an embodiment, the method can include using computer instructions to generate test plans for each safety instrumented function of the instrumented protective function, as shown in step 1042.

In an embodiment, the method can include using computer instructions to support management of change (MOC) for data records in the system by supporting "Master" records, being untouched while "Project" copies of the data records can be edited and manipulated by users, which operation can be also known as "Sandbox," as shown in step 1043.

In an embodiment, the method can include using computer instructions to check each edited record, mark each record as checked, approved, and then move the checked and approved record to "Master" records, as shown in step 1044.

In an embodiment, the method can include using computer instructions to support revision tracking and impact reporting on proposed changes, as shown in step 1045.

In an embodiment, the method can include using computer instructions to allow users to enter proposed changes and view impact reports prior to approving changes, as shown in step 1046.

In an embodiment, the method can include using computer instructions to create a report showing specific component information for like components used for risk reduction in the process hazard analysis and layers of protection analysis for the facility, as shown in step 1047.

In an embodiment, the method can include using computer instructions to create a recommendations log from the risk assessment, as shown in step 1048.

In an embodiment, the method can include using computer instructions to search the recommendations log based on: tag name, facility, module, area, safety instrumented functions name, or process hazard analysis node number, as shown in step 1049.

In an embodiment, the method can include using computer instructions to enable display and viewing of reports of project status, as shown in step 1050.

In an embodiment, the method can include using computer instructions to allow users to enter data and perform analysis to support process hazard analysis and layers of protection analysis, as shown in step 1051.

In an embodiment, the method can include using computer instructions to support analysis of protection layers to be applied to reduce probability of a hazardous event occurring, as shown in step 1052.

In an embodiment, the method can include using computer instructions to include analysis to calculate the safety integrity level calculations required to reduce risk to a target level, as shown in step 1053.

In an embodiment, the method can include using computer instructions to allow users to enter tolerable risk criteria for the facility, as shown in step 1054.

In an embodiment, the method can include using computer instructions to allow users to enter initiating causes captured in the facility that require the safety instrumented systems or independent protection layers to respond, as shown in step 1055.

In an embodiment, the method can include computer instructions to allow users to manage imports of process hazard analysis and layers of protection analysis from other tools, as shown in step 1056.

In an embodiment, the method can include using computer instructions to generate a critical alarm list including risk ranking of hazards to which an alarm applies, as shown in step 1057.

In an embodiment, the method can include using computer instructions to generate a report of test performance for critical alarms, as shown in step 1058.

FIGS. 2A-2F depict a component library, an assembly library, a logic solver library, an assembly—component relationship table, an assembly group library, and an assembly group—assembly relationship table that are usable with the method.

FIG. 2A shows the component library 316, which can contain the following information: a component identifier 304 for components in the assembly for identifying the component in the method; a tag name 320 for identifying the instrument in a drawing; a component type 322 for describing a specific installation and operation at that specific installation; and equipment type 324.

The component library 316 can further contain a name 335 representing an instance of equipment type; a process description 337; an asset identifier 339 for identifying the instrument with a third party system to track the instrument location for maintenance, additional use, cost of ownership, and for use in inventory management. In one or more embodiments, the asset identifier can be a serial number.

The component library 316 can further contain a means for reconciling identifier 341 for component lists with third party software related to the instrument; and combinations thereof.

FIG. 2B shows the assembly library 308, which can include: the assembly identifier 302 for the assembly for use in the library and a name 312 of the assembly representing at least one component.

The assembly library 308 can further include an assembly type 314 describing a specific installation and operation at that specific installation; a process description 323 of the assembly, such as separator pressure for example; and a location name 325 of the assembly in a facility.

The assembly library 308 can further include an assembly probability of failure on demand, shown here as a calculated PFD 327 as calculated by a safety integrity level SIL calculation engine and an assembly based actuator to permit override 329 of the safety integrity level SIL calculation engine and allow manual entry of a probability of failure for that assembly.

The assembly library 308 can further include the document identifier 331 for providing a link to the document library, an overt fault status 333 that can describe a state to transition an assembly to when an overt fault is recognized, and testing intervals 349.

FIG. 2C shows a logic solver library 309, which can include: a logic solver identifier 311; a logic solver location 313; and a name 315 of a logic solver.

The logic solver library can further include a description 317 of the logic solver; a probability of failure on demand, shown here as PFD 319 for the logic solver; and a testing interval 321 to define a required test.

FIG. 2D shows the assembly—component relationship table 300 which can have an assembly identifier 302, the component identifier 304, a purpose 306, and the logic solver 307.

In one or more embodiments, computer instructions can be used to form the assembly group library for the facility in the data storage.

For example, the assembly group can be two temperature sensing assemblies for a furnace. For example another assembly group can be two fuel gap block valves assembly for the same furnace.

Each assembly group can have a unique identifier and contain one or more assemblies. Each assembly group can be displayed to a user of the method as a description.

In this Figure, the assembly identifier 302 can have a value, such as 10 extracted from the assembly library. The purpose 306 can have a value, such as sensor. The logic solver 307 can have a logic solver identifier extracted from the logic solver library.

FIG. 2E shows the assembly group library 342 which can include: an assembly group identifier 344; a name 346 of each assembly group; the voting instruction 348 of each assembly group; and a test interval 349, which can be user entered assumption for an assembly group.

The assembly group library can further include a calculated assembly group failure on demand 351; the document identifier 331 associated with assembly group, and an assembly group type 360.

FIG. 2F provides a detailed depiction of an assembly group—assembly relationship table 332.

In one or more embodiments, computer instructions can be used to form an assembly group—assembly relationship table in the data storage.

These computer instructions can compile data from the assembly group library and the assembly library and create the assembly group—assembly relationship table depicting a relationship between at least one assembly group and at least one assembly and providing a parameter for each assembly.

The assembly group—assembly relationship table 332 can include: an assembly group identifier 344; the assembly identifier 302; an assembly parameter identifier 352; an assembly parameter value 356; and a parameter unit 358.

As shown in this Figure, the assembly group identifier 344 column can have a value, such as 100, extracted from the assembly group library. The assembly identifier 302 column can have a value, such as 10, extracted from the assembly library. The assembly parameter identifier 352 column can have a value, such as 11, extracted from the assembly group library. The assembly parameter value 356 column can have a value, such as 150. The assembly parameter unit 358 column can have a unit, such as PSIG.

FIG. 3A shows an embodiment of the instrumented protective function (IPF) library 372, which can include: an instrumented protective layer (IPF) identifier 374; a name of an instrumented protective function (IPF) 376; an input group voting instruction 378; and an output group voting instruction 380.

The instrumented protective function (IPF) library 372 can also include: a calculated instrumented protective function probability of failure on demand 381 and an actuator to permit override 383 of the IPF safety integrity level (SIL) calculation engine, which can allow manual entry of a probability of failure for that IPF.

The instrumented protective function (IPF) library 372 can also include an instrumented protective function achieved risk reduction factor 385.

An example of an instrumented protective function (IPF) can be a low charge flow on a furnace for a refinery.

FIG. 3B shows an embodiment of the instrumented protective function (IPF)—assembly group relationship table 362.

The instrumented protective function (IPF)—assembly group relationship table 362 can include: an IPF identifier 374; the assembly group identifier 344; a relationship identifier 375, which can identify the IPF to assembly group relationship identifier; and an indication that an assembly group can be functioning as an additional action 386, not included in the IPF safety integrity level SIL calculation engine.

The method creates the instrumented protective function (IPF)—assembly group relationship table which can include relationships between at least one IPF and at least one assembly group, forming a safety instrumented system (SIS) with at least one IPF, using the IPF libraries and assembly group library.

Additionally, the method can include computer instructions to compile data from the library of instrumented protective functions and assembly group library and form an instrumented protective function (IPF)—assembly group relationship table in the data storage.

FIG. 3C shows an embodiment of a created document library according to the method.

A document library 299 can include: a document identifier 331 that provides a link to the document library from another table created by the method.

The library can include an indication of document type 353, document names 355 and document descriptions 357.

Examples of document types 353 can include: cause and effect diagram documents; safety requirements specification documents; layer of protection analysis document types; test plan procedures; safety integrity level (SIL) calculation modeling files; override risk assessments; and safety integrity level calculations, and combinations thereof.

In one or more embodiments, the method can use computer instructions to create the document library, to form, store and use the document library.

FIG. 3D shows an embodiment of the library of publications according to the method.

The library of publications 301 in the data storage, can be viewable for compliance, and can include: statutes 290, such as US codes, for example, 35 USC 101; industry standards 291, such as IEC codes; national regulation 292, such as codes of federal regulation, for example 37 CRF 25.1; and business owner specific policies 293, and combinations thereof.

In embodiments, the method can use computer instructions to form, store and use the library of publications.

The instrumented protective function (IPF) library, the library of publications, the library of documents, and the assembly group library enable the instrumented protective function (IPF)—assembly group relationship table to depict the relationship between at least one IPF and at least one assembly group, forming a safety instrumented system (SIS) which can have at least one instrumented protective function (IPF).

Figure 4:
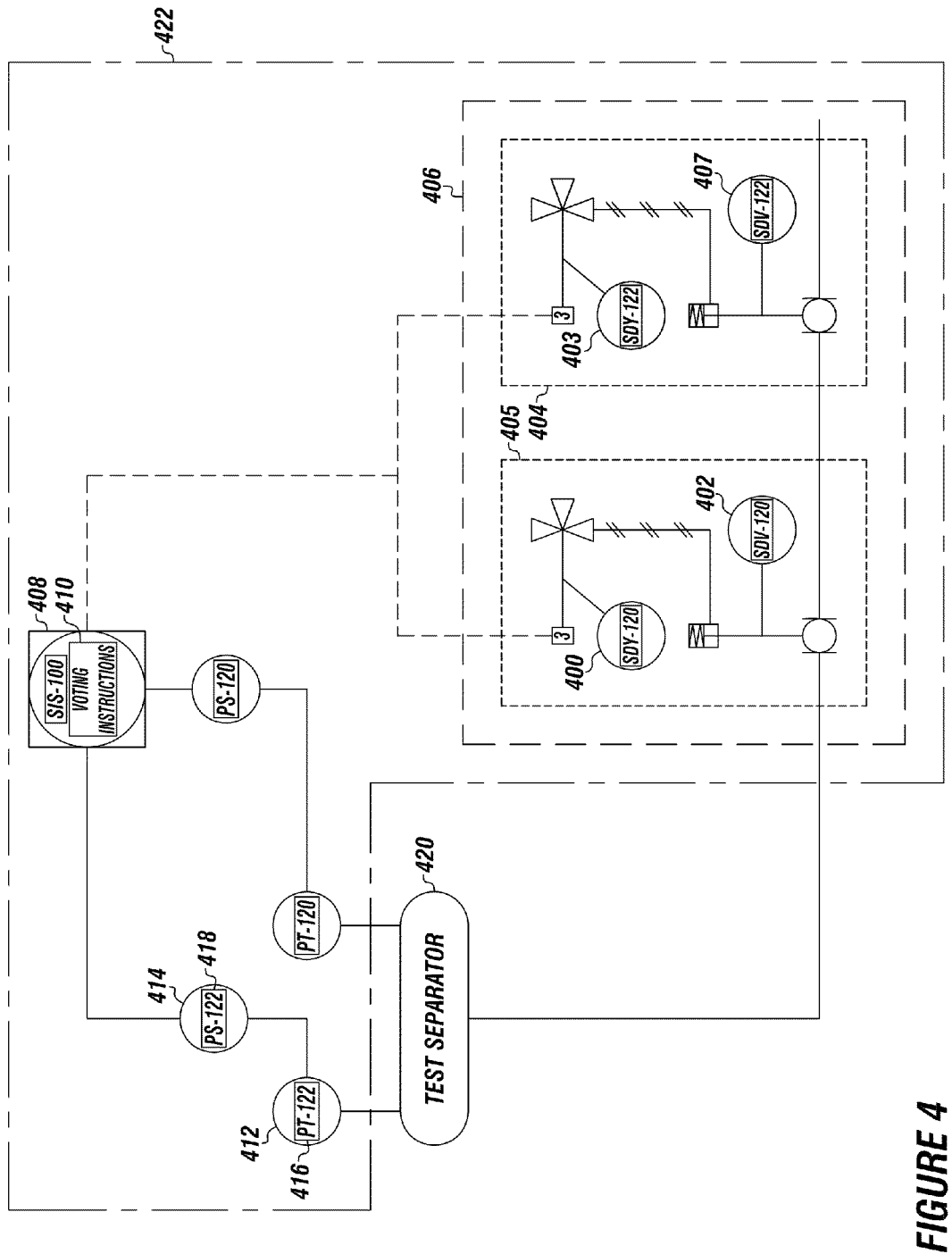
FIG. 4 shows a graphical depiction of a safety instrumented function (SIF) usable with the method.

FIG. 4 shows a graphical depiction of a safety instrumented function (SIF) 422 usable with the method.

A first assembly 405 can include a first component 400, such as SDY-120 and second component 402, such as SDV-120.

The first assembly 405 can be a part of an assembly group 406 with other assemblies such as a second assembly 404, which can have a second instance of a first component 403 and a second instance of the second component 407.

The safety instrumented function 422 can also have a logic solver 408, shown as SIS-100. The logic solver can contain voting instructions 410 which can be the logic used to process signals.

The safety instrumented function 422 can also have additional components. A first instance of a second component 412 is shown with a tag 416 as PT-122.

A second instance of a second component 414 is shown with a tag 418 as PT-122.

The safety instrumented function 422 can also have a test separator 420.

Computer instructions can create a tag based software model that represents the functional specifications for each of the identified instrumented protective functions (IPF) for the facility, for the identified piece of equipment, process or software, or combinations thereof, in real time.

In one or more embodiments, the combinations of libraries and relationship tables can define the physical specifications which can be needed to operate a facility safely with a safety instrumented system.

The term "physical specifications" as the term is used herein refers to the actual hardware, software, process or procedure of the facility and how these elements are actually connected together or used in sequence.

The combination of computer instructions, when actuated, can execute safety integrity level (SIL) calculations based on the physical specifications, voting instructions, and test interval specifications, and determine an average probability of failure on demand for each instrumented protective function (IPF).

As an example, an average probability of failure on demand of an IPF can be $1.57 \times 10^{-2}$ (scientific notation).

As shown in this Figure, the computer instructions permit a user to change any one component, one assembly, one assembly group, or combinations thereof or the voting instructions of the tag based software model.

As shown in this Figure, the computer instructions provide a connection to tag based assets of the facility that can allow transfer of data from tag based asset to the data storage associated with the processor.

The software model can further include a logic solver as a component of the instrumented protective functions (IPF) to execute the voting instructions that carry out the functions of the instrumented protective functions (IPF).

The logic solver provides a voting relationship, essentially a functional relationship, between the assemblies and assembly groups.

Figure 5:
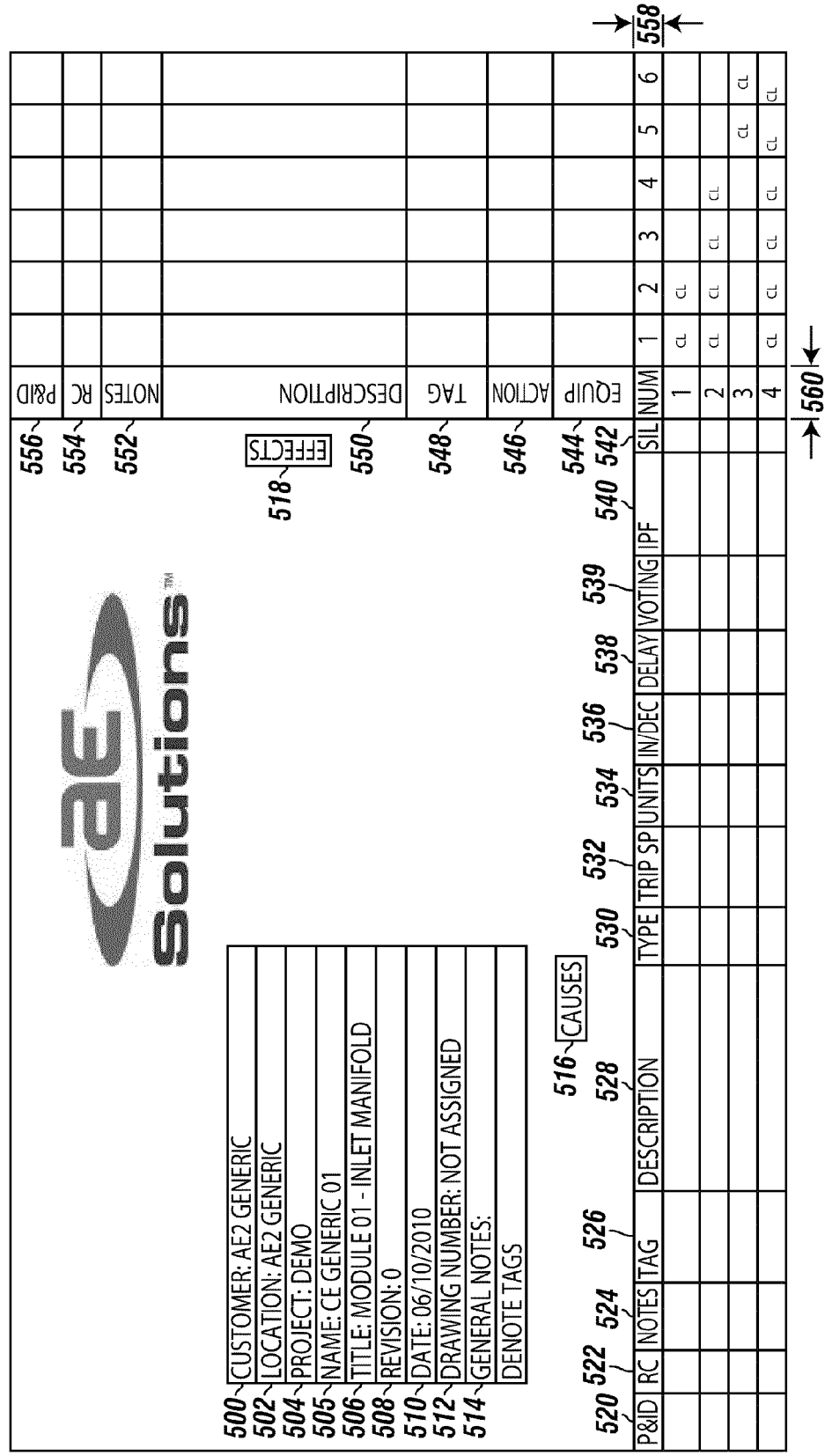
FIG. 5 shows the cause and effect report according to one or more embodiments.
Figure 11C:
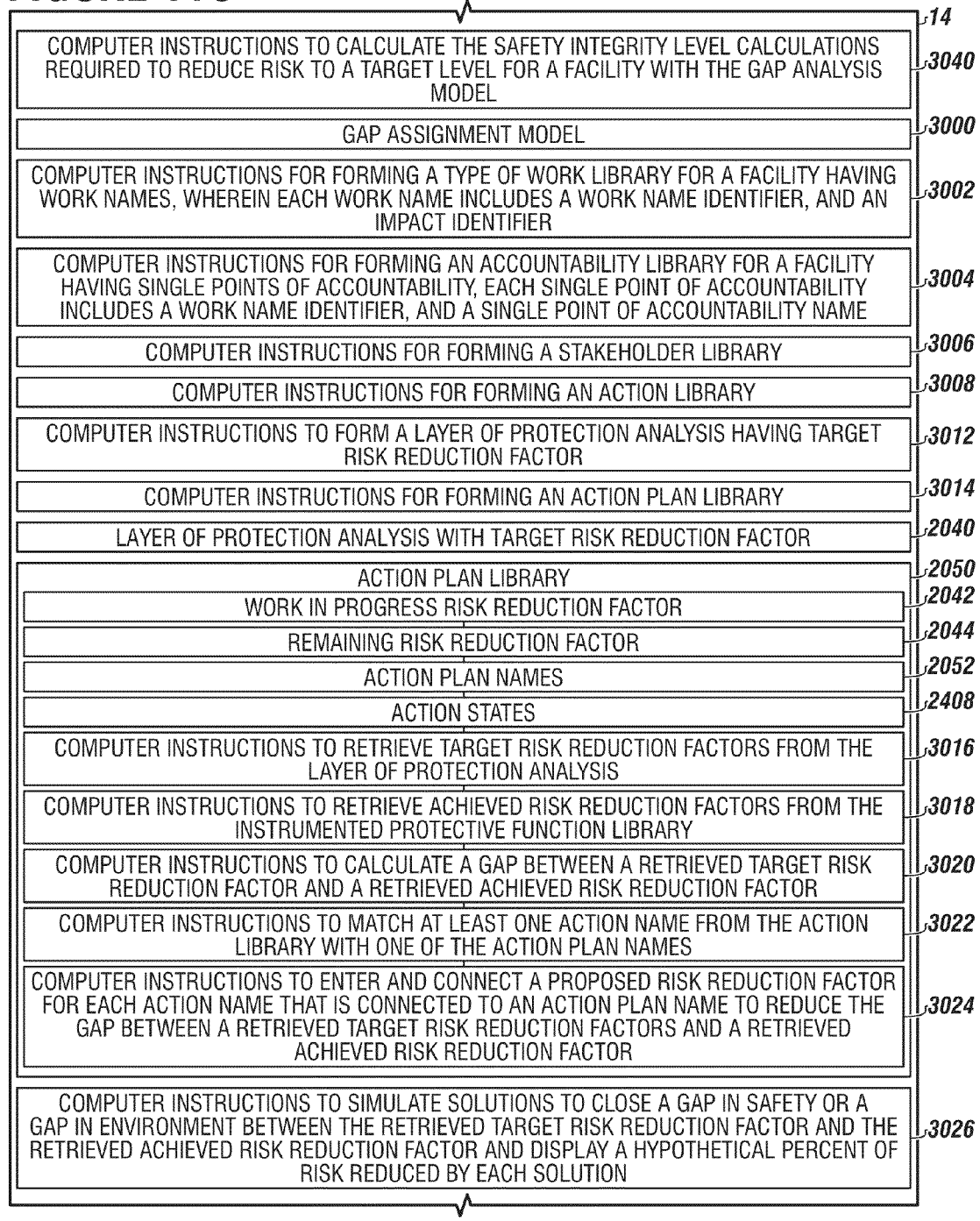
Figure 11D:
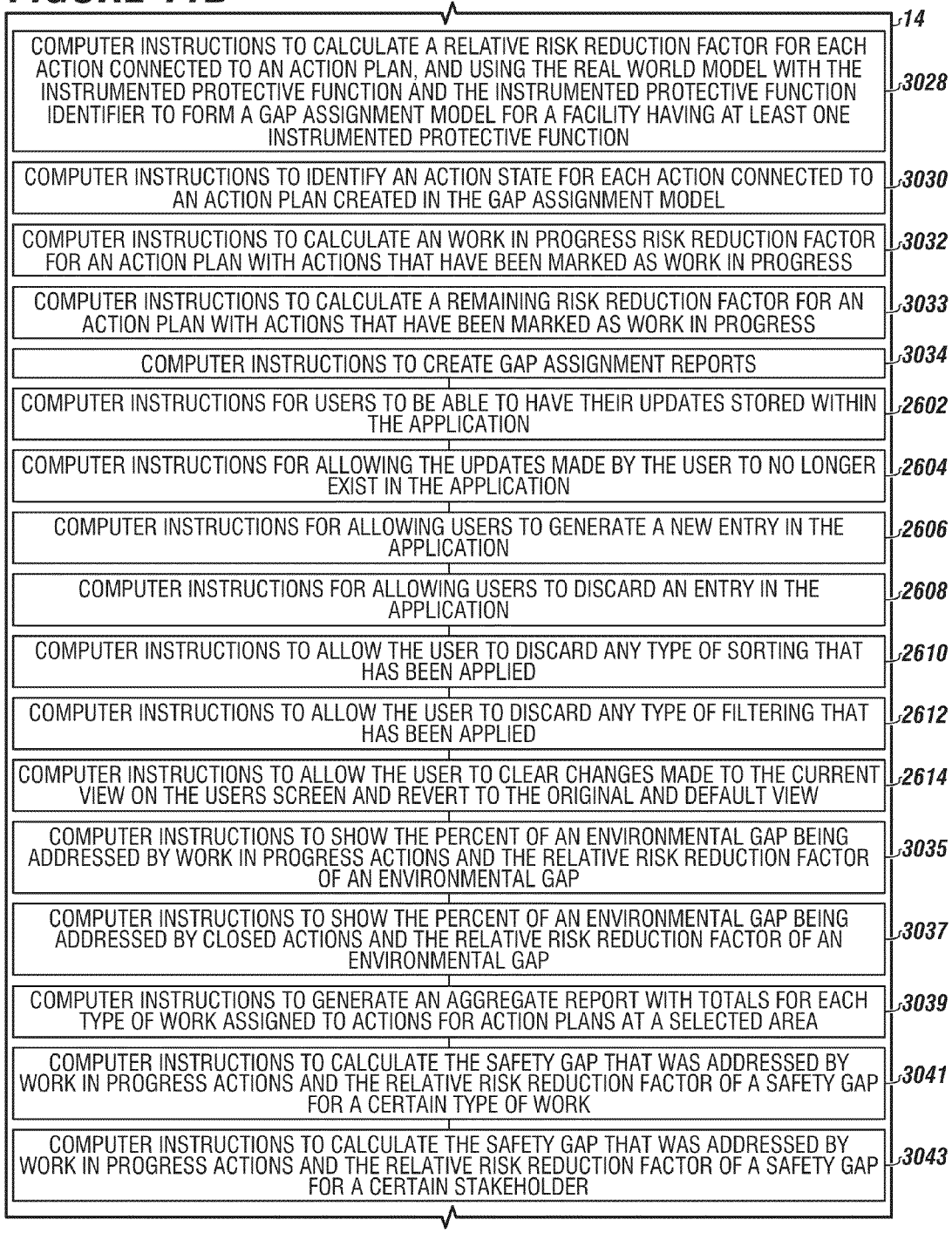
Figure 11E:
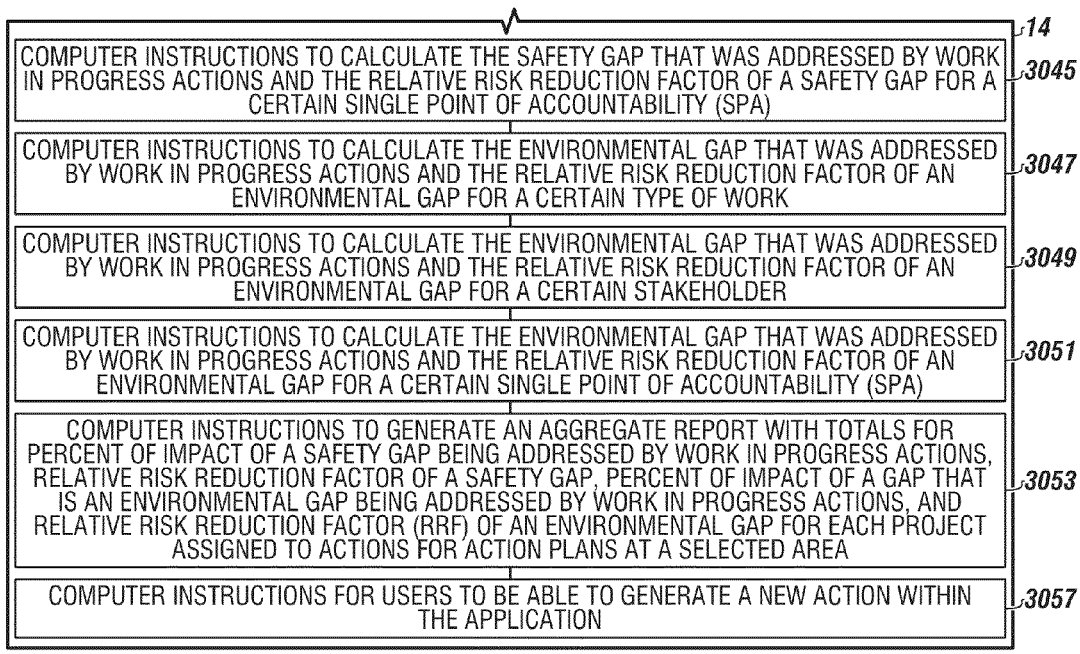

FIG. 5 shows an embodiment of a cause and effect report.

The cause and effect report can have general information such as a customer 500, a location 502, a project 504, a name 505, a title 506, a revision 508, a date 510, a drawing number 512, and general notes 514.

The cause and effect report can also have a table of causes 516 aligned to intersect a table of effects 518.

The table of causes 516 can have columns for causes P&ID 520, RC 522, notes 524, tag 526, description 528, type 530, trip SP 532, units 534, In/Dec 536, delay 538, voting 539, IPF 540, and SIL 542.

The table of effects 518 can have columns for effects equip 544, action 546, tag 548, description 550, notes 552, RC 554, and P&ID 556.

The intersection of the causes table 516 and effects table 518 can have a column 560 titled Num and a row 558 titled Num. The intersections can show causes and any corresponding effects.

FIG. 6 is an example of a test plan template 68 usable with the method.

Additionally, the method can use computer instructions to generate functional test plans for any one of the assemblies, one or more of the assembly groups, an instrumented protective function (IPF) or designated group of IPFs, and combinations thereof using the test plan templates.

The method, in embodiments, uses computer instructions for instructing the processor to select a test plan template from the plurality of test plan templates using functional specifications, physical specifications and a member of the group consisting of: an assembly, an assembly group, an instrumented protective function, or combinations thereof The functional test plans can be formulated from one of a plurality of test plan templates that can be preloaded and stored in the data storage. The test plan test plates can be user editable as a feature of this method. This means the user can modify quickly without the need for hiring an outside contractor at great expense and delay to get the information they need fast.

To understand the test plan template, computer instructions of FIG. 10C can be used with this Figure.

Namely, computer instructions 620 provide a location tree 607 on a test plan template for each component in the model, each IPF, each assembly, each assembly group and combinations thereof.

The method includes using computer instructions 619 to provide a page identifier 621 on the test plan template.

The page identifier can be used throughout the SIS model to display which module of the SIS model that a user can be within at any time providing a hierarchy of modules associated with the user location.

The method, in an embodiment, uses computer instructions 623 to permit a user to edit or replace any one component, assembly, voting instructions for an assembly, assembly group, an instrumented protective function or combinations thereof, not only in the test plan template, but in all positions of the invention simultaneously.

The test plan template 68 of can include one or more tasks, such as first task 600, second task 614, and third task 616, in support of process safety lifecycle management. Each task can include at least one instructional step, depicted here as first instructional step 610 and second instructional step 612, for test plan execution.

The test plan template 68 can include the first task 600, which can have a table of steps 601 with columns for: step number 602, status 604, select 606, and text 608.

The step number 602 column has a value shown as 1, the status 604 column set at a value such as ASBUILT, and the select 606 column can be a check box for selection of the step. The text 608 column can be set to a value such as it appears for this step as obtain appropriate permits.

The test plan template 68 can be presented on a display 25.

FIGS. 7A and 7B show an example of a test plan template that has been modified to a functional test plan.

An example functional test plan for an assembly, as shown in FIG. 7A and continued on 7B, can have tables, areas, spaces, or slots for general information about the test plan, such as facility 720 to identify the associated facility and an assembly name 721 to identify the associated assembly.

The functional test plan can also include a test plan name 724 to identify the test plan.

The functional test plan can also include tables, areas, spaces, or slots for a process description 726, test plan status and approval information 728, work requirements 730, such as required permits 731, drawings and documents for reference 732, assembly parameters/threshold limits 734, and comments about the assembly 736.

The functional test plan can also include an area to record test results 738.

The functional test plan can also include, as shown on 7B, an area for sign-off and approval 740.

The functional test plan can include a table of detail information and steps to execute 750. The table can have columns for task 700, step 702, staff 704, check mark box 706, and work method steps 708.

A task such as first task 710 can have multiple steps such as first step 712 and second step 718. The first step 712 can have an associated checkbox 714 to indicate completion of the step and an associated work method step 716 which can describe the step in detail, such as obtain the appropriate permits for the testing and provide the proper notifications to operating personnel regarding the testing, any special requirements, and subsequent alarms that can be generated.

The functional test plan can also include an area for tester comments—additional steps 742 and observed deficiencies and corrective actions 744.

In one or more embodiments, the test plan template can include a plurality of tasks in support of process safety lifecycle management. An example of a task can be opening a neck valve for a test plan template.

Each task can include at least one instructional step for functional test plan execution, or it can have a group of steps to achieve functional test plan execution.

Computer instructions 74 shown in FIG. 10B can instruct the processor to select a test plan template based on voting instructions from one of the tagged assets of the software model and use physical specifications of an assembly, an assembly group, an IPF, or combinations thereof which can have been identified in the data storage or in the software model.

The computer instructions 76 shown in FIG. 10B use the relationship tables to match components to either components used in a facility asset management system, components used in a facility maintenance management system, or combinations of these components in both facility asset management systems and facility maintenance management systems.

A "facility asset management system", as the term is used herein, includes computer software and/or hardware system (s) that aid in the process of managing tasks and decisions surrounding the purchase, ingestion, annotation, cataloguing, storage, retrieval, maintenance and distribution of physical assets in a facility (for example tracking the life cycle of a temperature sensor in a refinery).

A "facility maintenance management system", as the term is used herein means includes computer software and/or hardware system(s) that aid in managing an organizations maintenance operations in order to help maintenance workers do their jobs more effectively (for example, determining which equipment require maintenance and which storerooms contain the spare parts they need) and to help management make informed decisions (for example, calculating the cost of equipment breakdown repair versus preventive maintenance for the equipment, possibly leading to better allocation of resources).

In one or more embodiments, the matching of components matches failure rates in safety integrity level (SIL) calculations.

For example, the matching of components to safety integrity level SIL calculations can occur by first matching tag names in data storage to tag names in a facility asset management system. Then, that match can allow the failure rate in the data storage to be compared to failure rates being recorded by the facility asset management system.

An example an asset with a tag name PS-120 in the data storage matched to the tag name PS-120 in the facility asset management system. The failure rate for PS-120 in data storage can be 1 in 38,000 hours, and the failure rate for PS-120 in the facility asset management system can be 1 in 24,000 hours.

In one or more embodiments, the matching of components also matches test intervals in SIL calculations compared to actual test intervals in the facility maintenance management system.

An example an asset with a tag name PS-120 in the data storage matched to the tag name PS-120 in the facility maintenance management system. The test interval for PS-120 in data storage can be once every 12 months, and the test interval for PS-120 in the facility maintenance management system can be 1 time every 16 months.

In one or more embodiments, the matching of components compares trip points of parameters for each assembly to trip points recorded in one of the facility asset or maintenance management systems.

An example an asset with a tag name PS-120 in the data storage matched to the tag name PS-120 in the facility asset management system. The trip point for PS-120 in data storage can be 150 psig, and the trip point for PS-120 in the facility asset management system can be 170 psig.

FIGS. 8A and 8B show a representative table produced by the method for users that matches components of the facility to failure rates in safety integrity level SIL calculations and to those recorded by the facility asset management system, and the facility maintenance management system, as well as trip point parameters for assemblies to recorded trip points, and matches test intervals in SIL calculations to actual test intervals.

FIG. 8A shows the facility asset/maintenance management system table 800 can contain data to calculate a second failure rate 850

The facility asset/maintenance management system table 800 can have columns: tag name 802, field trip point 804, field trip units 806, test date 808, test result 810, and interval (since last test) 812.

A row in the table can contain values for the tag name 802, such as PS-120, values for the field trip point 804, such as 140, values for the field trip units 806, such as PSIG, values for the interval (since last test) 812, such as 0.

The table can also contain values for the test date 808, such as '1/12/2007' and test result 810 such as pass or fail, shown here as pass. These test results and dates can be used to determine the second failure rate 850.

The data from the facility asset/maintenance management system table 800 can be compared to data from an assembly data used for safety integrity level SIL calculations table 826, shown in FIG. 8B.

FIG. 8B shows the assembly data used for SIL calculations table 826 can include columns for: assembly identifier 828, tag name 830, parameter identifier 832, trip point 834, trip units 836, test interval (months) 838, and a first failure rate 840.

The tag name 830 can have a value, such as PS-120 and the first failure rate 840, such as 1/32,000 hour to compare with the second failure rate 850 calculated using the facility asset/maintenance management system table 800, shown in FIG. 8A.

The facility asset/maintenance management system table can represent data from a facility asset management system, a facility asset maintenance management system, and combinations thereof.

FIG. 9 depicts an overview of the equipment used to implement the method to computer generate a real world model in software of a safety instrumented system (SIS) architecture for SIS in a facility.

It should be noted for this method that the instrumented protective functions (IPFs) can be safety instrumented functions, environmental instrumented functions, commercial instrumented functions, any other safety function that protects against harm to the environment, commercial assets, or people, or combinations thereof.

The method uses a system 8 with a processor 12 connected to a data storage 14. The processor can be in communication with a network 9. At least one client device 10 can be in communication with the network 9. Each client device can have a display for showing the status of compliance. Each client device can be manipulated by a user 6.

Also connected to the network 9 can be a facility historian 90, which is shown with a facility asset input device 95 and a facility asset display 93.

In one or more embodiments, the facility historian can contain a facility processor and facility data storage.

The system can use computer instructions 91, shown in FIG. 10B, and the relationship tables to match components from the component library for a facility to components in the facility historian using the asset identifier from the component library and recording the matched components, wherein the matching of components additionally validates a mean time to repair in the safety integrity level calculation as compared with actual unavailability time calculated by the facility historian.

FIGS. 10A-10C are details of the data storage and computer instructions contained therein.

The data storage 14 can include computer instructions for forming a component library 16; computer instructions for forming an assembly library 18; computer instructions for forming an assembly—component relationship table 22; computer instructions for forming an assembly group library 26; and computer instructions for forming an assembly group—assembly relationship table 30.

The data storage 14 can include computer instructions for forming, storing and using the document library 31.

The data storage 14 can include computer instructions for forming a library of instrumented protective functions (IPF) 32.

The data storage 14 can include computer instructions to form, store and use a library of publications 33.

The data storage 14 can include computer instructions for forming an instrumented protective function (IPF)—assembly group relationship table 34.

The data storage 14 can include computer instructions for analyzing functional relationships between assembly groups and assemblies 35.

The data storage 14 can include computer instructions for creating a tag based model with tags and voting instructions 36.

The data storage 14 can include computer instructions in the data storage to assign at least one voting instruction to at least one assembly identifier and at least one assembly group identifier, creating the computer generated safety instrumented model with a functional specification and a physical specification for all of the instrumented protective functions (IPF) for a facility in real time 37.

The data storage 14 can include computer instructions to provide an actuator to apply a tag to assets of the facility 39.

The data storage 14 can include computer instructions for adding a functional specification of the instrumented protective function (IPF) for the facility in real time, wherein real time can be a unit of time that can be less than 14 calendar days 42.

The data storage 14 can include computer instructions for executing SIL calculations that use physical specifications, voting instructions, and test interval specifications to determine an average probability of failure on demand for each instrumented protective function (IPF) 46.

Voting instructions can refer to a plurality of logical "and" gates and "or" gates used to translate input signals received by the processor into output signals that actuate one or more of protective layers.

The data storage 14 can include computer instructions to compare in real time actual safety integrity levels achieved at the facility determined by the computer generated safety instrumented model to user specified safety integrity levels and identify gaps between an actual safety integrity levels and user specified safety integration levels for the facility 47.

The data storage 14 can include the functional specification 49 for each component and the physical specifications 50 for each component.

The data storage 14 can include computer instructions to present a logic solver as a component of the instrumented protective functions to execute the voting instructions to carry out the functions of the instrumented protective functions and to carry out instructions to permit a user to edit or replace any logic solver 55.

The data storage 14 can include computer instructions for permitting a user to change any one component or the voting instructions 56.

The data storage 14 can include computer instructions that provide a connection to tag based assets of the facility 58.

The data storage 14 can include the logic solver 307.

The logic solver can analyze interrelationships between protective layers, assembly groups, and assemblies and be a standalone processor or a virtual machine.

The data storage 14 can include computer instructions for forming a cause and effect report using the relationship tables 62.

The data storage can include test plan templates 68.

The data storage 14 can include computer instructions for instructing the processor to select a test plan template based on voting instructions, and use physical specifications to create the functional test plan for an assembly, an assembly group, an IPF, or combinations thereof 74.

The data storage 14 can include computer instructions to generate functional test plans using test plan templates 75.

The data storage 14 can include computer instructions to use the relationship tables to match components to components used in a facility asset management system, components used in a facility maintenance management system, and combinations thereof 76.

These computer instructions can match: failure rates in the safety integrity level calculations compared to actual failure rates recorded by the facility asset management system or a facility maintenance management system; test intervals in the safety integrity level calculations compared to actual test intervals recorded by the facility asset management system or the facility maintenance management system; and/or trip points of parameters for each assembly compared to trip points recorded by the facility asset management system or the maintenance management system The facility asset management system and facility maintenance management system can be part of the equipment shown in FIG. 9 transferring data through a network, a manual import, or the like.

The data storage 14 can contain computer instructions for using the relationship tables to update from the facility historian of a facility 91.

The facility historian can be a part of the overall method, and transfer data through a network, via a manual import, or the like. The facility historian can be a database in data storage of a server that connects to a facility to monitor, in real time, process controllers and operations of the facility.

The data storage 14 can include computer instructions to update all the component information in the variously libraries simultaneously 94.

The data storage 14 can include the document library 299, the assembly—component relationship table 300, the library of publications 301, the assembly library 308, the logic solver library 309, the component library 316, the assembly group—assembly relationship table 332, the assembly group library 342, the instrumented protective function (IPF)—assembly group relationship table 362, the instrumented protective function (IPF) library 372, or combinations thereof.

The data storage 14 can include the safety integrity level (SIL) calculations engine 379.

The data storage 14 can include the user entered assumptions for each IPF 382.

The data storage 14 can include the user specified safety integrity levels 384.

The data storage 14 can include the location tree 607.

The data storage 14 can include computer instructions to provide a page identifier in the SIS model, to display the module of the SIS model that a user is within at any time, which will provide a hierarchy of modules associated with the user location 619.

The data storage 14 can include the computer instructions for providing the location tree for each component in the model, each IPF, each assembly, each assembly group and combinations thereof 620.

The data storage can include computer instructions for permitting a user to edit or replace a component, assembly, voting instructions for an assembly, assembly group, an instrumented protective function or combinations thereof 622.

The data storage 14 can include computer instructions to permit a user to edit or replace in any one of the libraries, by using an edit button in the libraries and edit any one component, assembly, voting instructions for an assembly, assembly group, an instrumented protective function or combinations thereof 623.

The data storage 14 can include computer instructions to permit a user to change the relationship of a component to a function in an assembly component relationship table using an edit button and to generate a safety requirements specification for the SIS and using computer instructions allowing a user to edit the safety requirements specification for the SIS 624.

The data storage 14 can include computer instructions for generating a safety requirements specification for the SIS 627.

The data storage 14 can include computer instructions for allowing a user to edit the safety requirements specification for the SIS 629.

The data storage 14 can include computer instructions to support management of change (MOC) for data records in the system by supporting "Master" records being untouched while "Project" copies of the data records can be edited and manipulated by users, which operation can be also known as "Sandbox" 631.

The data storage can also include computer instructions for permitting a user to check each edited record, mark each record as checked, approved, and then move the checked and approved record to "Master" records by a qualified user 649.

FIGS. 11A-11E provide additional detail on the data storage 14 usable to create the gap assignment model.

In embodiments, the data storage 14 can include the component library 316, which can contain a plurality of components 17a, 17b, and 17c. For example, the component library can include information on a sensor, transmitter, control device, pump, motor, or solenoids.

The data storage 14 can include the assembly library 308, which can contain a plurality of assemblies 19a, 19b, and 19c. Each assembly 19a, 19b, and 19c can have a test interval specification 21a, 21b, and 21c, for example a test interval of 30 days. Assemblies represent groups of components connecting a processor to a process of the facility.

The data storage 14 can include the assembly group library 342, which can contain a plurality of assembly groups 13a, 13b, and 13c, such as pairs of sensors.

The instrumented protective function (IPF) library 372 can contain a plurality of instrumented protective functions (IPFs), 38a, 38b, and 38c.

The data storage 14 can include the instrumented protective function library 372, which can include instrumented protective layer (IPF) identifiers 374, the name of an instrumented protective function (IPF) 376, input group voting instructions 378, output group voting instructions 380, calculated instrumented protective function probability of failure on demand 381, an actuator to permit override 383, and an instrumented protective function achieved risk reduction factor 385.

The data storage 14 can include a logic solver library 309, which can contain a plurality of logic solvers 307a, 307b, and 307c.

In embodiments, the data storage 14 can include a document library 299, which can have a plurality of documents 298a, 298b, and 298c.

The instrumented protective function library 372 can also contain an achieved risk reduction factor 2412, and a real world model of instrumented protective functions for a facility 2413.

The data storage 14 can include a type of work library 2000 for a facility, which can include work names 2001. Each work name can include a work name identifier 2004, and an impact identifier 2006.

The data storage 14 can include an accountability library 2010, which can include single points of accountability 2012. The single points of accountability 2012 can include a work name identifier 2004 for each single point of accountability, and a single point of accountability name 2014.

The data storage 14 can include a stakeholder library 2020 for a facility having stored therein a plurality of types of stakeholders 1802, and a plurality of stakeholder names 2022 and stakeholder descriptions 2024.

The data storage 14 can include an action library 2031 used to create the gap assignment model. The action library 2031 can include action names 2032. Each action name can have an action number 2038. The action library 2031 can include project names 2034, wherein each of the action names is connected to at least one project name. The action library 2031 can include location names 325, wherein one of the location names is connected to at least one action name. The action library 2031 can include a work name identifier 2004 for each of the action names, as well as a stakeholder name 2022 for each action name and a percent complete value 2036 for each action name.

The data storage 14 can include computer instructions 3034 to create gap assignment reports.

Figure 20:
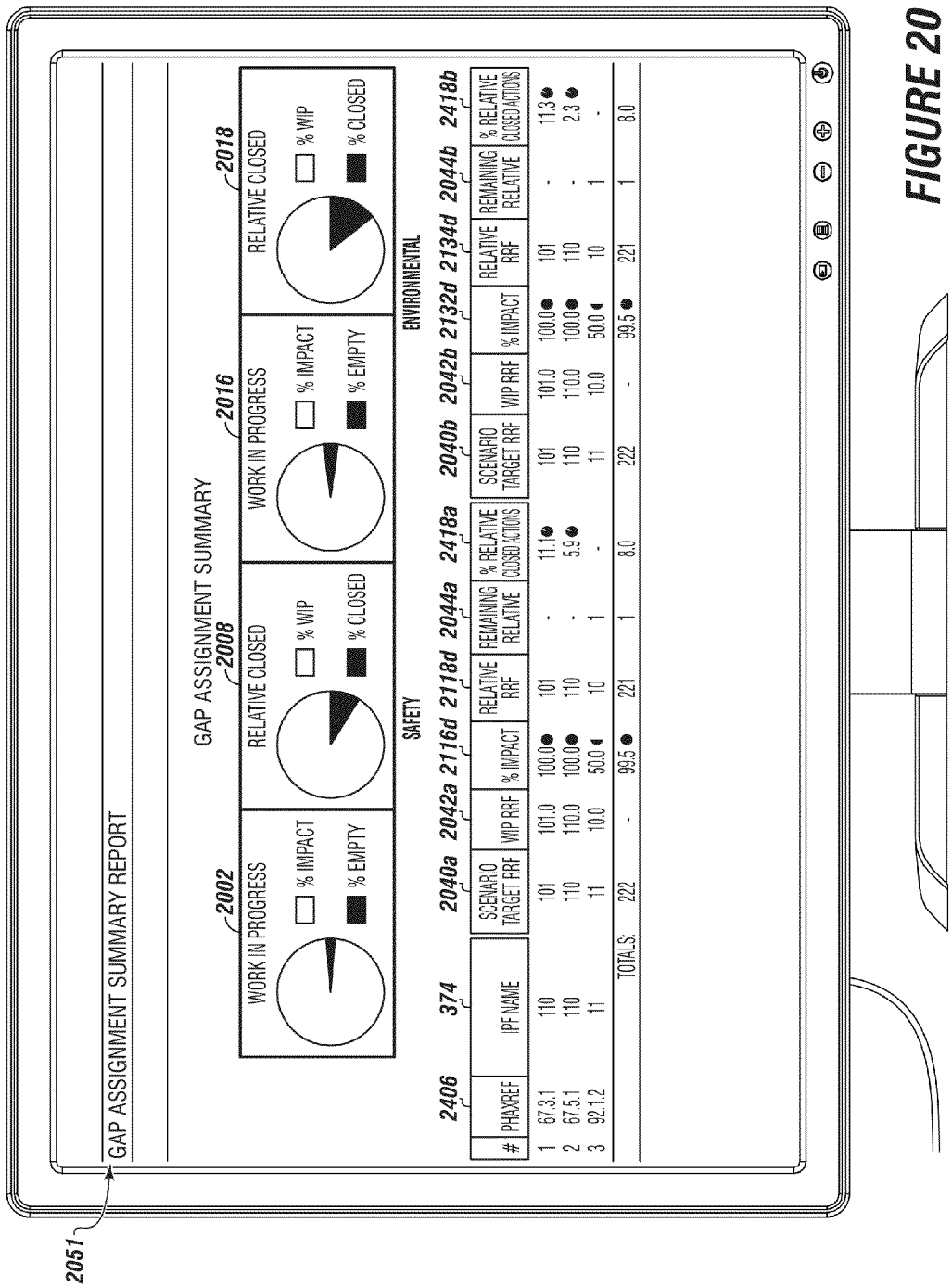
FIG. 20 depicts a display of gap assignment summary report produced by the gap assignment model according to one or more embodiments.
Figure 21:
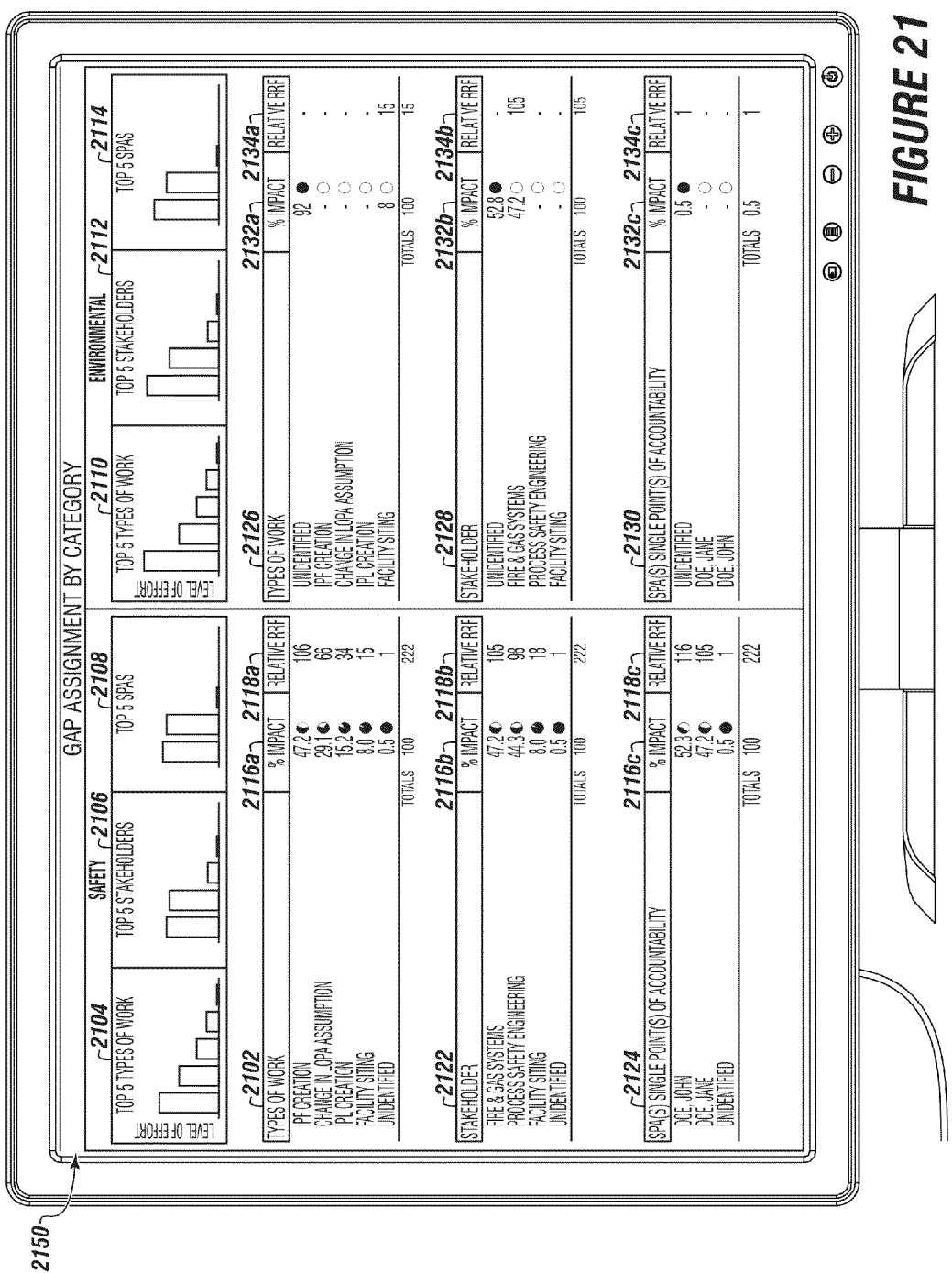
FIG. 21 depicts a display of a gap assignment by category report produced by the gap assignment model according to one or more embodiments.
Figure 22:
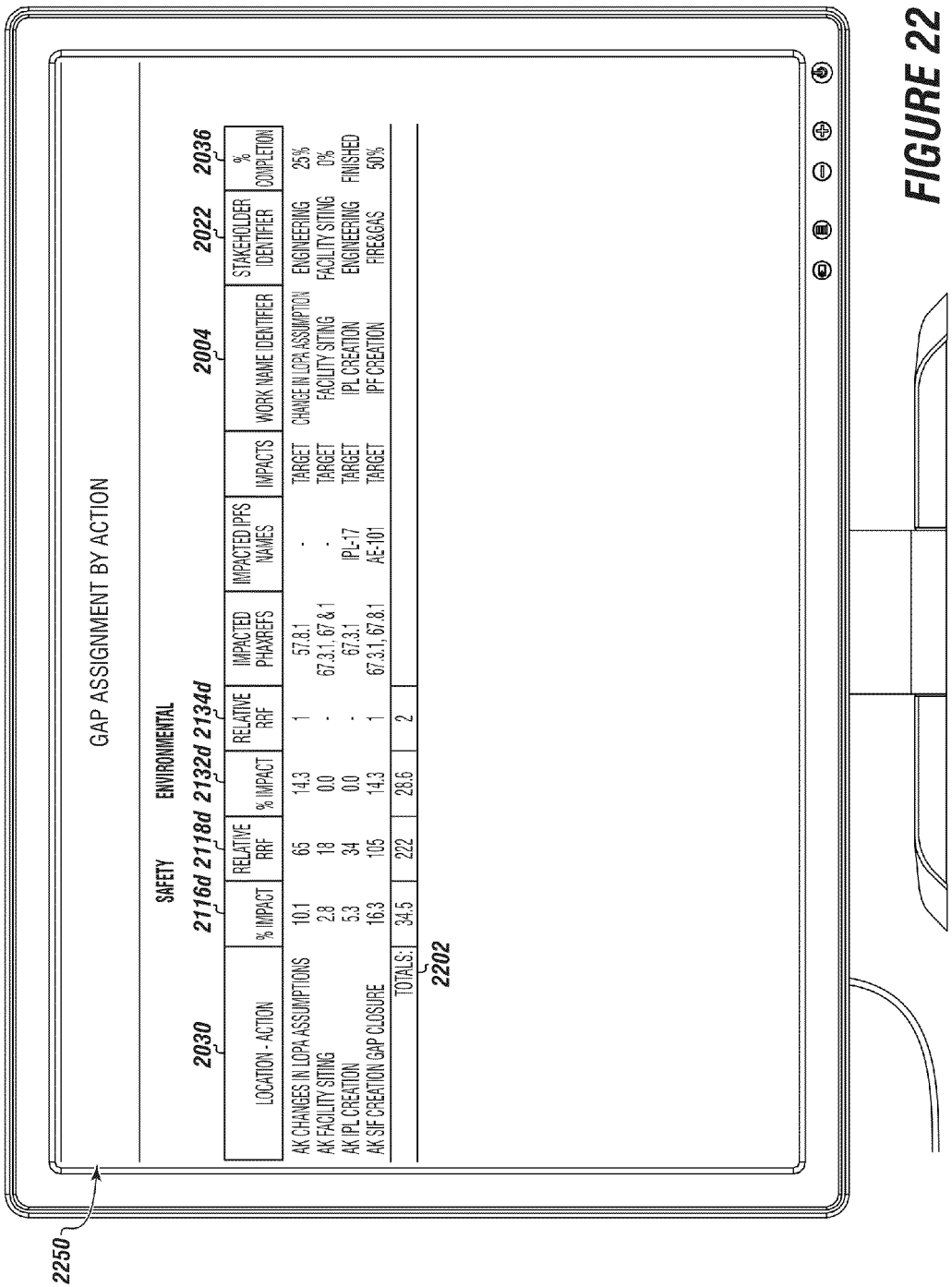
FIG. 22 depicts a display of gap assignment by action report produced by the gap assignment model according to one or more embodiments.

The gap assignment reports can be a gap assignment summary report 2051 shown in detail in FIG. 20, a gap assignment by category report 2150 shown in detail in FIG. 21, a gap assignment by action report 2250 shown in detail in FIG. 22 and an action plan detail report 2350. The gap assignment reports can be stored in the data storage 14 in embodiments.

The data storage 14 can include computer instructions 3036 to connect data of a process hazard analysis and layers of protection analysis to a safety integrity level calculations for the facility with the gap assignment model.

The data storage 14 can include computer instructions 3038 to support analysis of protection layers to be applied to reduce probability of a hazardous event occurring for the facility with the gap assignment model.

The data storage 14 can include computer instructions 3040 to calculate the safety integrity level calculations required to reduce risk to a target level for a facility with the gap analysis model.

The data storage 14 can include the gap assignment model 3000.

The data storage 14 can include computer instructions 3002 for forming a type of work library for a facility having work names, wherein each work name includes a work name identifier, and an impact identifier.

The data storage 14 can include computer instructions 3004 for forming an accountability library having single points of accountability, each single point of accountability includes a work name identifier, and a single point of accountability name.

The data storage 14 can include computer instructions 3006 for forming a stakeholder library for a facility having stakeholder name and stakeholder description.

The data storage 14 can include computer instructions 3008 for forming an action library for a facility.

The data storage 14 can include computer instructions 3012 to form a layer of protection analysis having a target risk reduction factor.

The data storage 14 can include computer instructions 3014 for forming an action plan library.

The data storage 14 can include at least one layer of protection analysis target risk reduction factor 2040.

The data storage 14 can include an action plan library 2050. The action plan library 2050 can include work in progress rick reduction factors 2042, remaining risk reduction factors 2044, action plan names 2052, and action states 2408.

The action plan library 2050 can also include computer instructions 3016 to retrieve target risk reduction factors from the layer of protection analysis; computer instructions 3018 to retrieve achieved risk reduction factors from the instrumented protective function library; computer instructions 3020 to calculate a gap between a retrieved target risk reduction factor and a retrieved achieved risk reduction factor; computer instructions 3022 to match at least one action name from the action library with one of the action plan names; and computer instructions 3024 to enter and connect a proposed risk reduction factor for each action name that is connected to an action plan name to reduce the gap between a retrieved target risk reduction factors and a retrieved achieved risk reduction factor.

The data storage 14 can include computer instructions 3026 to simulate solutions to close a gap in safety or a gap in environment between the retrieved target risk reduction factor and the retrieved achieved risk reduction factor and display a hypothetical percent of risk reduced by each solution.

The data storage 14 can include computer instructions 3028 to calculate a relative risk reduction factor for each action connected to an action plan, and using the real world model with the instrumented protective function and the instrumented protective function identifier to form a gap assignment model for a facility having at least one instrumented protective function.

The data storage 14 can include computer instructions 3030 in the data storage to identify an action state for each action connected to an action plan created in the gap assignment model.

The data storage 14 can include computer instructions 3032 to calculate a work in progress risk reduction factor for an action plan with actions that have been marked as work in progress.

The data storage 14 can include computer instructions 3033 to calculate a remaining risk reduction factor for an action plan with actions that have been marked as work in progress.

The data storage 14 can include computer instructions 3034 to create gap assignment reports.

The data storage 14 can include computer instructions 3035 to show the percent of an environmental gap being addressed by work in progress actions and the relative risk reduction factor of an environmental gap.

The data storage 14 can include computer instructions 3037 to show the percent of an environmental gap being addressed by closed actions and the relative risk reduction factor of an environmental gap.

The data storage 14 can include computer instructions 3039 to generate an aggregate report with totals for each work name identifier assigned to actions for action plans at a selected area. Libraries such as the type of work library, accountability library, stakeholder library, and action library are used to form the assignment by category report.

The data storage 14 can include computer instructions 3041 to calculate the safety gap that was addressed by work in progress actions and the relative risk reduction factor of a safety gap for a certain type of work.

The data storage 14 can include computer instructions 3043 to calculate the safety gap that was addressed by work in progress actions and the relative risk reduction factor of a safety gap for a certain stakeholder.

The data storage 14 can include computer instructions 3045 to calculate the safety gap that was addressed by work in progress actions and the relative risk reduction factor of a safety gap for a certain single point of accountability (SPA).

The data storage 14 can include computer instructions 3047 to calculate the environmental gap that was addressed by work in progress actions and the relative risk reduction factor of an environmental gap for a certain type of work.

The data storage 14 can include computer instructions 3049 to calculate the environmental gap that was addressed by work in progress actions and the relative risk reduction factor of an environmental gap for a certain stakeholder.

The data storage 14 can include computer instructions 3051 to calculate the environmental gap that was addressed by work in progress actions and the relative risk reduction factor of an environmental gap for a certain single point of accountability (SPA).

The data storage 14 can include computer instructions 3053 to generate an aggregate report with totals for percent of impact of a safety gap being addressed by work in progress actions, relative risk reduction factor for a safety gap, percent of impact of a gap that is an environmental gap being addressed by work in progress actions, and relative risk reduction factor (RRF) of an environmental gap for each project assigned to actions for action plans at a selected area. Libraries such as the type of work library, accountability library, stakeholder library, and action library are used to form the gap assignment by action report.

The data storage 14 can include computer instructions 3057 for users to be able to generate a new action within the application.

All of the computer instructions for creating the gap assignment model are non-transitory.

The data storage 14 can also include the computer instructions that are actuated when navigation buttons on the screens used to create the gap assignment model are depressed.

The data storage 14 can include computer instructions 2602 for users to be able to have their updates stored within the application.

The data storage 14 can include computer instructions 2604 for allowing the updates made by the user to no longer exist in the application. These computer instructions can be connected to a cancel changes button.

The data storage 14 can include computer instructions 2606 for allowing users to generate a new entry in the application. These computer instructions can be connected to a create new button.

The data storage 14 can include computer instructions 2608 for allowing users to discard an entry in the application. These computer instructions can be connected to a delete button.

The data storage 14 can include to computer instructions 2610 to allow the user to discard any type of sorting that has been applied. These computer instructions can be connected to a clear sorting button.

The data storage 14 can include computer instructions 2612 to allow the user to discard any type of filtering that has been applied. These computer instructions can be connected to a clear filters button.

The data storage 14 can include computer instructions 2614 to allow the user to clear changes made to the current view on the users screen and revert to the original and default view. These computer instructions can be connected to a reset view button.

Figure 12:
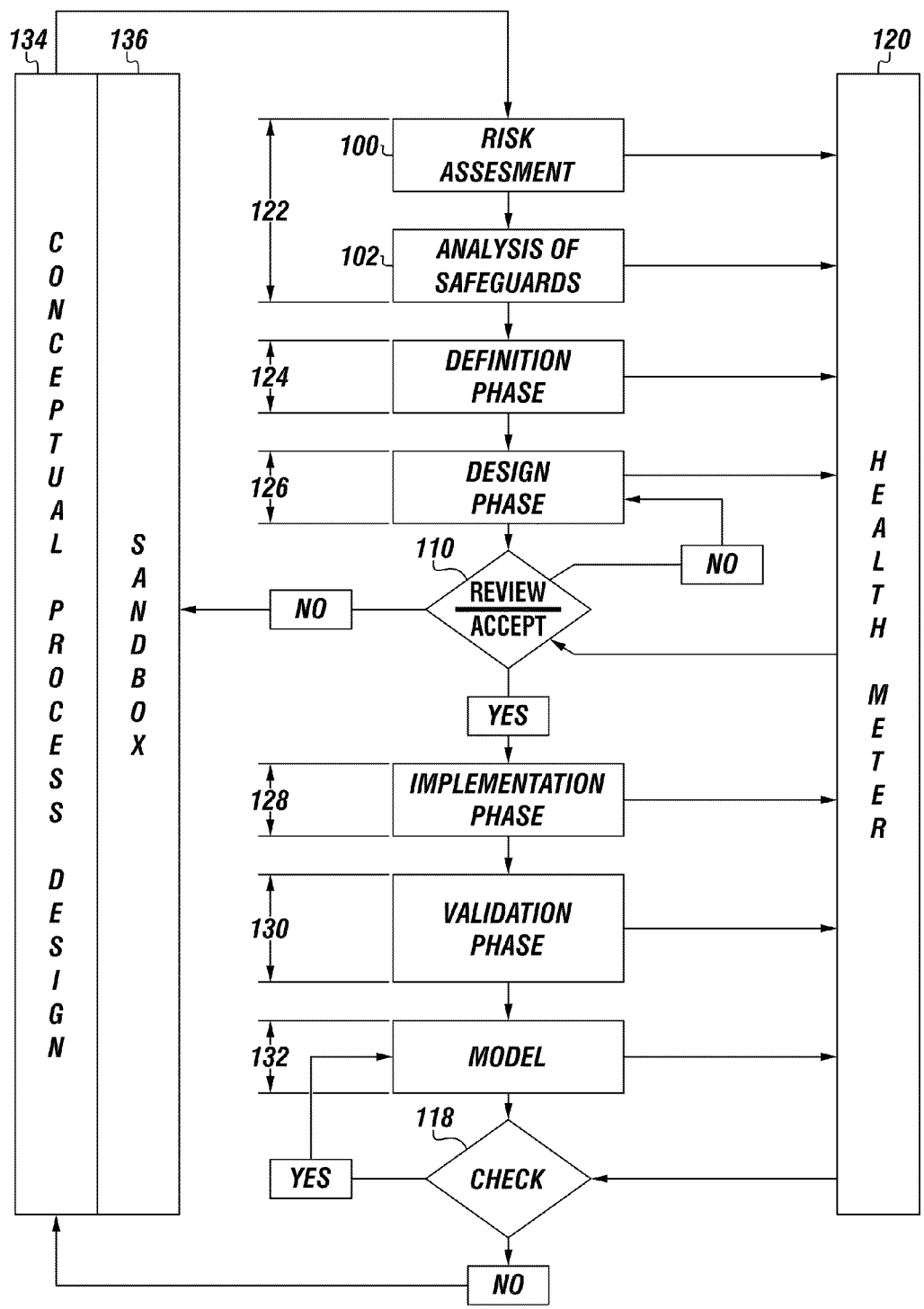
FIG. 12 is an embodiment of a sequence of steps implemented by the method.

FIG. 12 shows an embodiment of an overall sequence of steps implemented by the method.

The method acquires a risk assessment 100 for a portion of a specific facility, such as refinery.

The method acquires an analysis of safeguards 102 (a LOPA) for the specific facility wherein the LOPA indicates risk, such as portions of the facility that might be prone to loss of human life. The analysis of safeguards and the LOPA make up an assess phase 122.

A definition phase 124 follows the assess phase 122 and it involves editing and verifying safety requirement specifications for the safety instrumented system (SIS) with a user interface.

The next phase used by the method can be a design phase 126 that involves using the method to enter and verify a SIS design and optimization using an IPF model with SIL engine for the specific process or portion of the facility.

Reviews and accept or review and decline acceptance of the SIS design, shown here as review and accept 110 for compliance with a statute, a regulation, or a business criteria, such as an OSHA regulation.

Next the method creates an implementation phase 128, which can include installing an assembly, IPF, or component. Next the method creates a validation phase 130 which commissions the component, assembly, assembly group, or IPF, and then validates the assembly, assembly group, IPF, using a test plan created by the method.

The next step involves operating and maintaining all or a portion of the facility by running the assembly, assembly group, IPF, or component and re-testing the component, assembly, assembly group and/or IPF on a required test interval as documented in a model 132.

The method implements a check 118 which involves checking if the test results from the prior step are acceptable. If they are not, then the user must restart the process from the beginning.

The entire stage from risk assessment 100 to check 118 involves using a conceptual process design 134 in the previously identified data storage which can be accessed through a sandbox 136 in an embodiment.

The sandbox can allow a user to make a series of changes that can be used in the final implementation in order to evaluate potential changes to the component, assembly, assembly group, and impact on achieved SIL.

Additionally a health meter 120 can monitor the entire sequence of steps, wherein the health meter provides verification and integration and a checking of reality versus plan codes, standards and recognized good engineering practices in real time constantly during the entire process.

For this unique method, the computer instructions, when actuated, can execute safety integrity level (SIL) calculations for each asset of the facility can have a tag with voting instructions based on the functional specification, the physical specification, and user entered assumptions to determine an average probability of failure on demand and architectural restraint requirements for each instrumented protective function (IPF) and validate the assumptions used in the SIL calculations by comparing to actual performance of each IPF in the facility.

An embodiment can include computer instructions to categorize failures (failure rate analysis) and provide statistically analyzed failure rates to be used in SIL calculations.

An embodiment can include computer instructions to allow users to select which set of reliability data they want to use, the data stored in the reliability library in the data storage, the data collected from their facility and analyzed in by the failure rate analysis portion of the method, or user entered data.

An embodiment can include computer instructions and system architecture to support management of change (MOC) of data records usable by the method.

The method can support "asbuilt" or "master" records, being untouched while "project" copies of the records can be edited and manipulated by users, also known as "sandbox." Each edited record can be checked, approved, and then moved to "asbuilt" by qualified users.

"Qualified users" can mean users with sufficient permissions and roles tied to their login indicating they are able to perform the check and approve activities. Previous "asbuilt" versions of the records can be archived to maintain revision history.

In one or more embodiments, the method can include using computer instructions to allow users to enter data and perform analysis to support PHA and LOPA.

An embodiment can include computer instructions to support analysis of protective layers to be applied to reduce probability of a hazardous event occurring.

An embodiment can include computer instructions to include analysis to calculate SIL required to reduce the risk to target level.

An embodiment can include computer instructions to connect the data of the PHA and LOPA to the SIL calculation portion of the application.

An embodiment can include computer instructions to allow users to enter tolerable risk criteria for their organization.

An embodiment can include computer instructions to support revision tracking and impact reporting on proposed changes.

An embodiment can include computer instructions to allow users to enter proposed changes and view impact reports prior to approving the change.

An embodiment can include computer instructions to allow users to enter initiating causes captured in the facility which required the SIS or other protection layers to respond.

An embodiment can include computer instructions to allow users to manage imports of PHA and LOPA import from other tools.

An embodiment can include computer instructions to analyze SIL calculations and automatically identify optimum proof test intervals that can still meet SIL.

An embodiment can include computer instructions to allow a user to enter relief valve sizing basis during design phase of a project.

An embodiment can include computer instructions to allow users to search for a relief valve sizing basis by tag name to support PHA/LOPA activities.

An embodiment can include computer instructions to create a report showing relief valve sizing basis for all relief valves used for risk reduction in a PHA/LOPA for a facility.

Figure 13B:
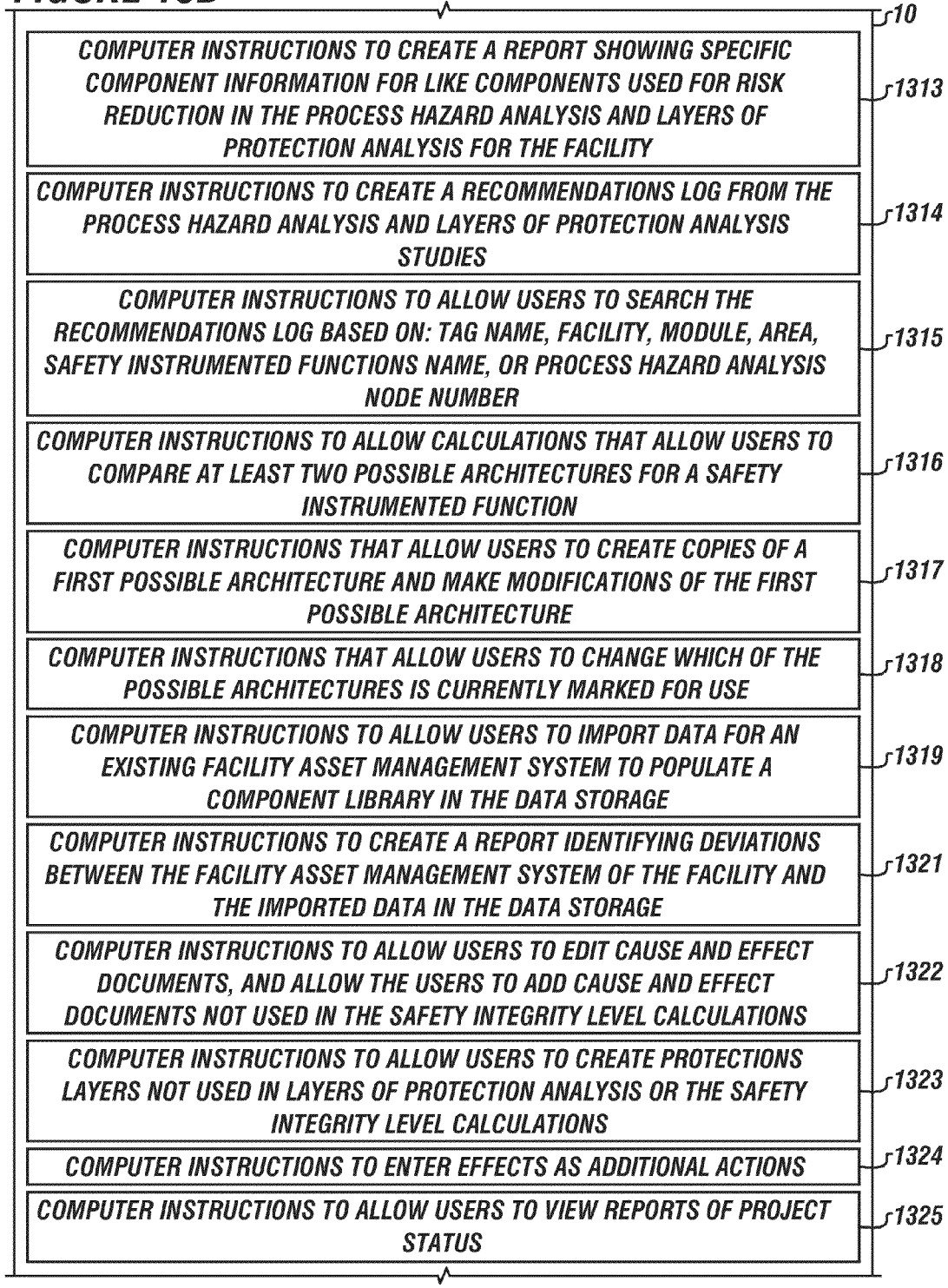

FIGS. 13A-13C depict an embodiment of the client device 10, which can include various additional computer instructions usable with the executive dashboard.

In one or more embodiments, the client device 10 can include computer instructions to allow users to enter data and perform analysis to support process hazard analysis and layers of protection analysis 1300.

In one or more embodiments, the client device 10 can include computer instructions which can be used to support analysis of protection layers to be applied to reduce probability of a hazardous event occurring 1302.

In one or more embodiments, the client device 10 can include computer instructions which can be used to include analysis to calculate the safety integrity level calculations required to reduce risk to a target level 1303.

In one or more embodiments, the client device 10 can contain computer instructions which can be used to connect data of the process hazard analysis and layers of protection analysis to the safety integrity level calculations 1304.

In one or more embodiments, the client device 10 can include computer instructions which can be used to allow users to enter tolerable risk criteria for the facility 1305.

In one or more embodiments, the client device 10 can include computer instructions that are used to support revision tracking and impact reporting on proposed changes 1306.

In one or more embodiments, the client device 10 can include computer instructions that are used to allow users to enter proposed changes and view impact reports prior to approving changes 1307.

In one or more embodiments, the client device 10 can include computer instructions to allow users to enter initiating causes captured in the facility that require the safety instrumented systems or other protection layers to respond 1308.

In one or more embodiments, the client device 10 can include computer instructions to allow users to manage imports of process hazard analysis and layers of protection analysis from other tools 1309.

In one or more embodiments, the client device 10 can include computer instructions which can be used to analyze the safety integrity level calculations and automatically identify optimum proof test intervals to meet the safety integrity level calculations 1310.

In one or more embodiments, the client device 10 can include computer instructions to allow users to enter a specific component for use in an instrumented protective function during design phase of a project 1311.

In one or more embodiments, the client device 10 can include computer instructions to allow users to search for the specific component by tag name to support process hazard analysis and layers of protection analysis 1312.

In one or more embodiments, the client device 10 can include computer instructions to create a report showing specific component information for like components used for risk reduction in the process hazard analysis and layers of protection analysis for the facility 1313.

In one or more embodiments, the client device 10 can include computer instructions in the client device to create a recommendations log from the process hazard analysis and layers of protection analysis studies 1314.

In one or more embodiments, the client device 10 can include computer instructions to allow users to search the recommendations log based on: tag name, facility, module, area, safety instrumented functions name, or process hazard analysis node number 1315.

In one or more embodiments, the client device 10 can include computer instructions to allow calculations that allow users to compare at least two possible architectures for a safety instrumented function 1316.

In one or more embodiments, the client device 10 can include computer instructions to allow users to create copies of a first possible architecture and make modifications of the first possible architecture 1317.

In one or more embodiments, the client device 10 can contain computer instructions to change which of the possible architectures is currently marked for use 1318.

In one or more embodiments, the client device 10 can contain computer instructions to import data for an existing facility asset management system to populate a component library in the data storage 1319.

In one or more embodiments, the client device 10 can contain computer instructions to create a report identifying deviations between the facility asset management system of the facility and the imported data in the data storage 1321.

In one or more embodiments, the client device 10 can contain computer instructions to edit cause and affect documents, and allow the users to add cause and effect documents not used in the safety integrity level calculations 1322.

In one or more embodiments, the client device 10 can contain computer instructions to create protections layers not used in layers of protection analysis or the safety integrity level calculations 1323.

In one or more embodiments, the client device 10 can contain computer instructions to enter effects as additional actions in the formed model 1324.

In one or more embodiments, the client device 10 can contain computer instructions to allow users to view reports of project status 1325.

In one or more embodiments, the client device 10 can contain computer instructions to generate facility acceptance tests using a software model of physical and functional specifications 1326.

In one or more embodiments, the client device 10 can include a software model of physical and functional specifications 1327.

In one or more embodiments, the client device 10 can contain computer instructions to generate site acceptance tests using the software model of physical and functional specifications 1328.

In one or more embodiments, the client device 10 can include computer instructions to generate functional test plans for each safety instrumented function of the instrumented protective function 1329.

In one or more embodiments, the client device 10 can contain computer instructions to generate a critical alarm list including risk ranking of hazards to which alarms apply 1330.

In one or more embodiments, the client device 10 can contain computer instructions to generate a report of test performance for critical alarms 1331.

In one or more embodiments, the client device 10 can contain computer instructions to generate a report showing impact of bypassing on a risk gap being opened by placing equipment in bypass 1332.

In one or more embodiments, the client device 10 can contain computer instructions to categorize failures from failure rate analysis and provide statistically analyzed failure rates to be used in safety integrity level calculations 1333.

In one or more embodiments, the client device 10 can contain computer instructions to select which set of reliability data they want to use 1334.

For example, the users can select from data stored in a reliability library 1335, data collected from the facility and analyzed by failure rate analysis, or user entered data.

In one or more embodiments, the client device 10 can contain computer instructions to support management of change (MOC) of data records 1336.

For example, the client device can support "asbuilt" or "master" records remaining untouched while "project" copies of records can be edited and manipulated by users. Each edited record can be checked, approved, and then moved to "asbuilt" by qualified users. Qualified users can include users with sufficient permissions and roles tied to their respective login indicating that they can be able to perform the check and approve activities. Previous "asbuilt" versions of records can be archived to maintain a revision history.

In one or more embodiments, the client device 10 can contain computer instructions to permit a user to change any one component, one assembly, one assembly group, or combinations thereof or the voting instructions of a tag based software model 1338.

In one or more embodiments, the client device 10 can contain computer instructions to provide a connection to tag based assets of the facility that can allow transfer of data from tag based assets to the data storage associated with the processor 1340.

In one or more embodiments, the client device 10 can include computer instructions to assign a tag name to at least one component identifier while assigning the voting instruction to at least one assembly identifier and at least one assembly group identifier, creating the computer generated safety instrumented model with a functional specification and a physical specification for all of the instrumented protective functions (IPF) for a facility in real time 1341.

In one or more embodiments, the client device 10 can include computer instructions to use relationship tables and libraries to form a cause and effect report 1342.

Figure 14:
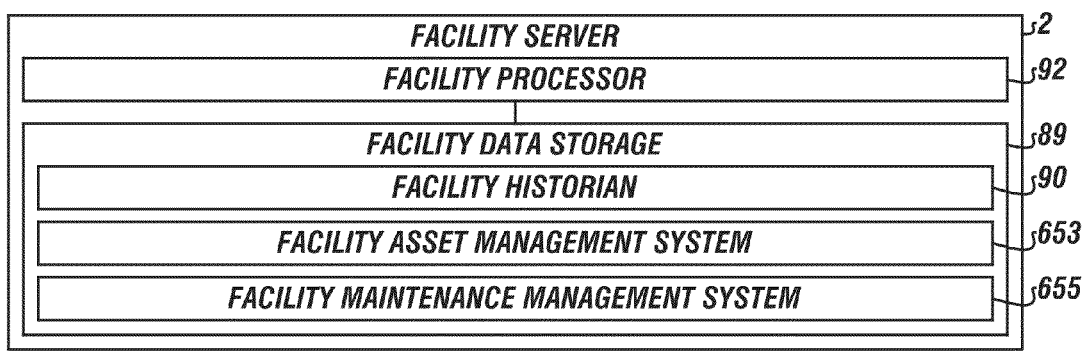
FIG. 14 depicts a facility server according to one or more embodiments.

FIG. 14 depicts an embodiment of a facility server 2.

The facility server 2 can include a facility data storage 89 and a facility processor 92. The facility data storage 89 can connect with the facility processor 92.

The facility data storage 89 can include the facility historian 90.

The facility maintenance management system 655 and the facility asset management system 653 can reside in a facility data storage 89, which can be connected to the facility processor 92 associated with a facility asset input device and a facility asset display.

Figure 15:
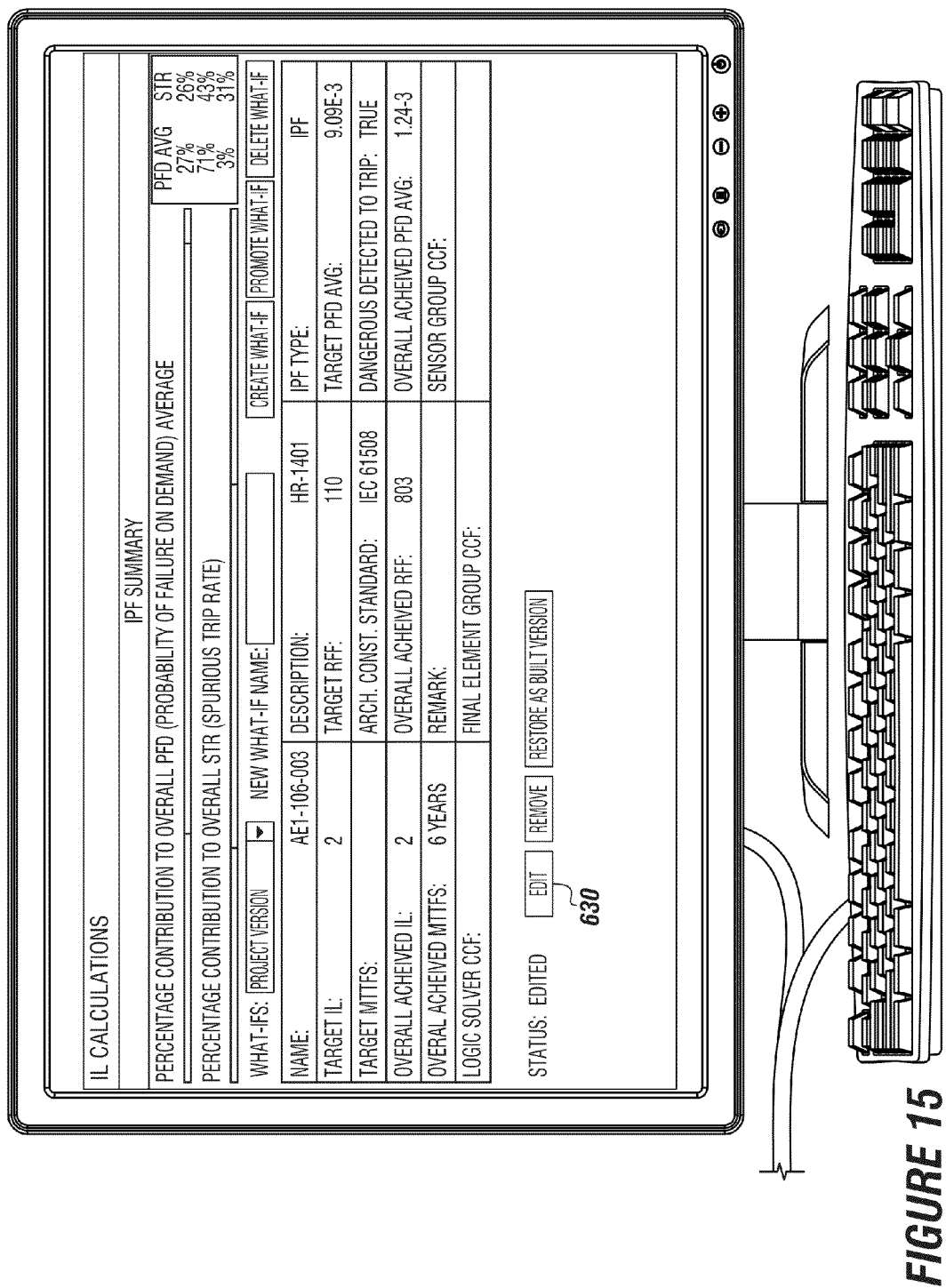
FIG. 15 depicts a screen from the gap assignment model according to one or more embodiments.

FIG. 15 depicts a screen from the gap assignment model producing instrumented protection layer function summaries with the edit button 630 for a formed test plan wherein a user clicking on the edit button can insert, delete, or modify a component which creates an across all database and library change simultaneously.

Figure 16:
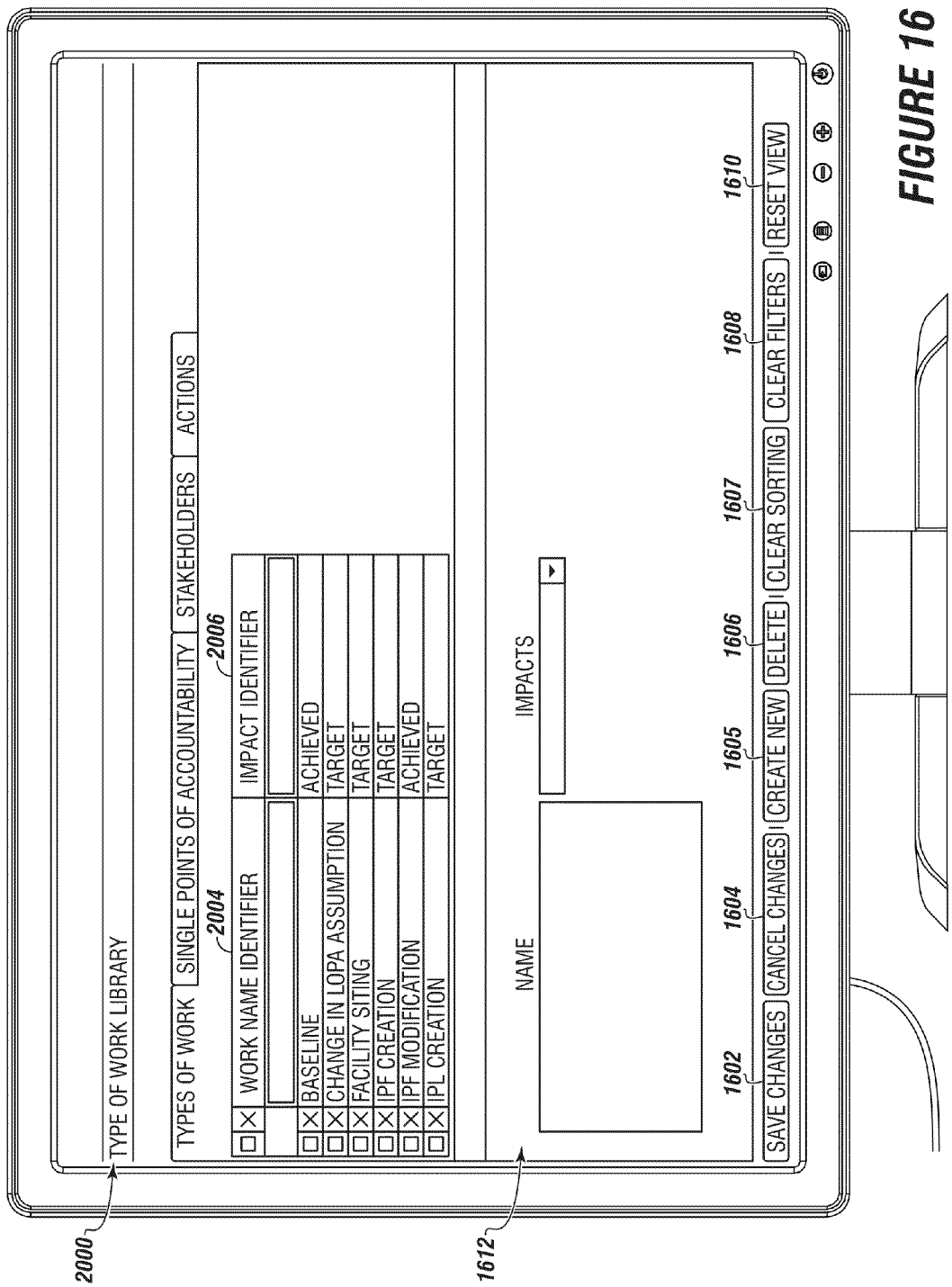
FIG. 16 depicts a type of work library according to one or more embodiments.

FIG. 16 shows a type of work library 2000 having a work name identifier 2004 and an impact identifier 2006. An example of this of a work name identifier is facility siting, which may have an impact identifier of target. Having a work name identifier of facility siting refers to work activities focused on adjustments to location of facilities and occupied rooms within a facility that may lower safety risk within a facility. Having an impact identifier of target means that the facility siting type of work impacts the required risk reduction factor. Users have the ability to add, edit, and delete different types of work to be associated with an action plan.

Data entry area 1612 allows users to edit or add new entries to their library.

The type of work library can use a plurality of buttons connected to computer instructions in the data storage.

A save changes button 1602 is a button connected to computer instructions 2602 for users to be able to have their updates stored within the application.

A cancel changes button 1604 is a button connected to computer instructions 2604 allowing the updates made by the user to know longer exist in the application.

A create new button 1605 is a button connected to computer instructions 2606 allowing users to generate a new entry in the application.

A delete button 1606 is a button connected to computer instructions 2608 allowing users to discard an entry in the application.

A clear sorting button 1607 is a button connected to computer instructions 2610 that allows the user to discard any type of sorting that has been applied.

A clear filters button 1608 is a button connected to computer instructions 2612 that allows the user to discard any type of filtering that has been applied.

A reset view button 1610 is a button connected to computer instructions 2614 that allows the user to clear changes made to the current view on the users screen and revert to the original and default view.

Figure 17:
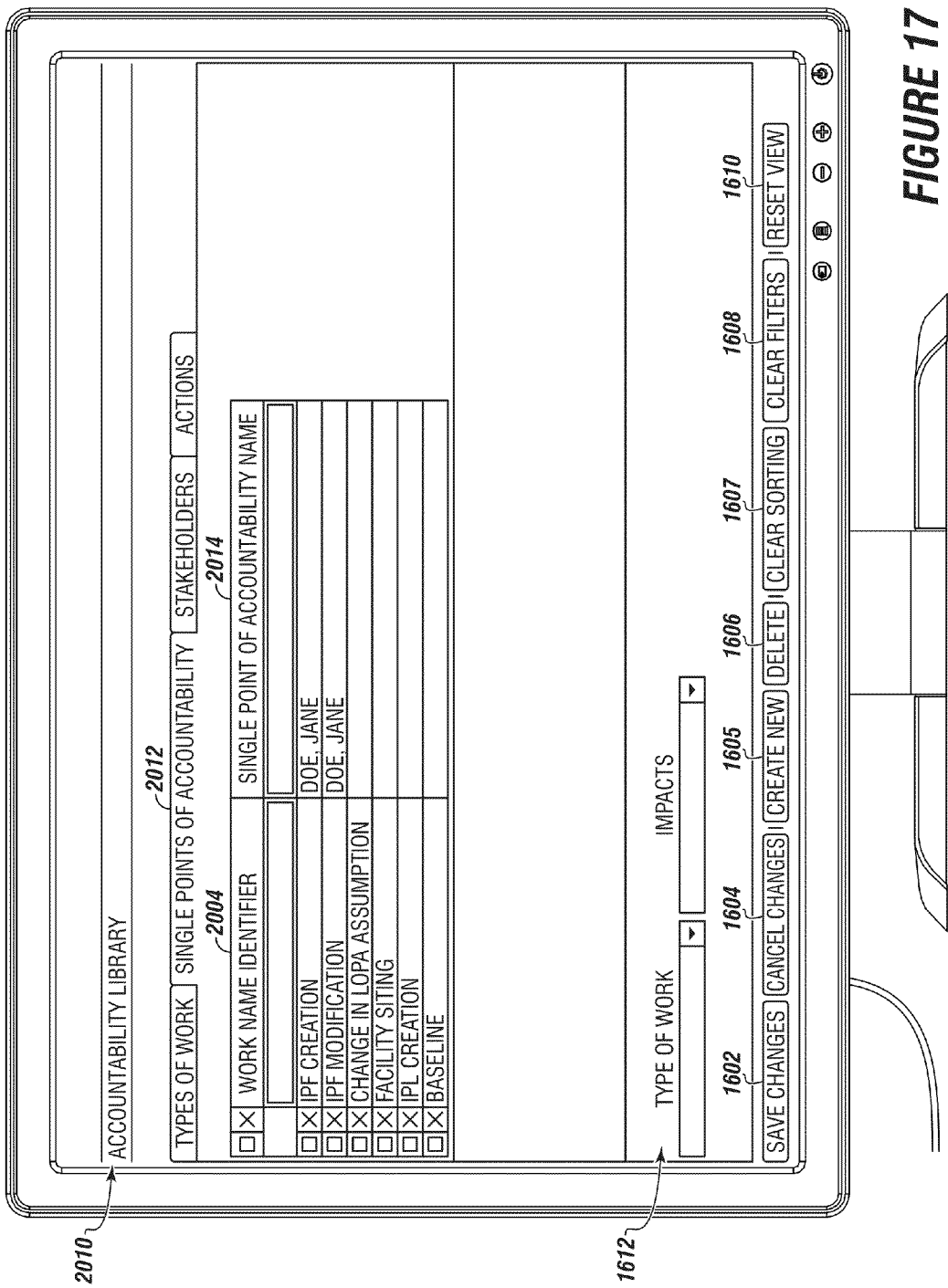
FIG. 17 depicts a display of an accountability library used in the gap assignment model according to one or more embodiments.

FIG. 17 shows an accountability library 2010 with single points of accountability 2012, a work name identifier 2004 and a single point of accountability name 2014. An example of work name identifier is IPF creation with a single point of accountability name. The purpose of this feature is to provide a short list of actions that a single point of accountability is responsible for approving into a status of closed.

The term "single point of accountability name" refers to a person's name or a job title.

A data entry area 1612 can allow users to edit or add new entries to their library.

The accountability library can use the save changes button 1602, cancel changes button 1604, create new button 1605, delete button 1606, clear sorting button 1607, clear filters button 1608, and reset view button 1610.

Figure 18:
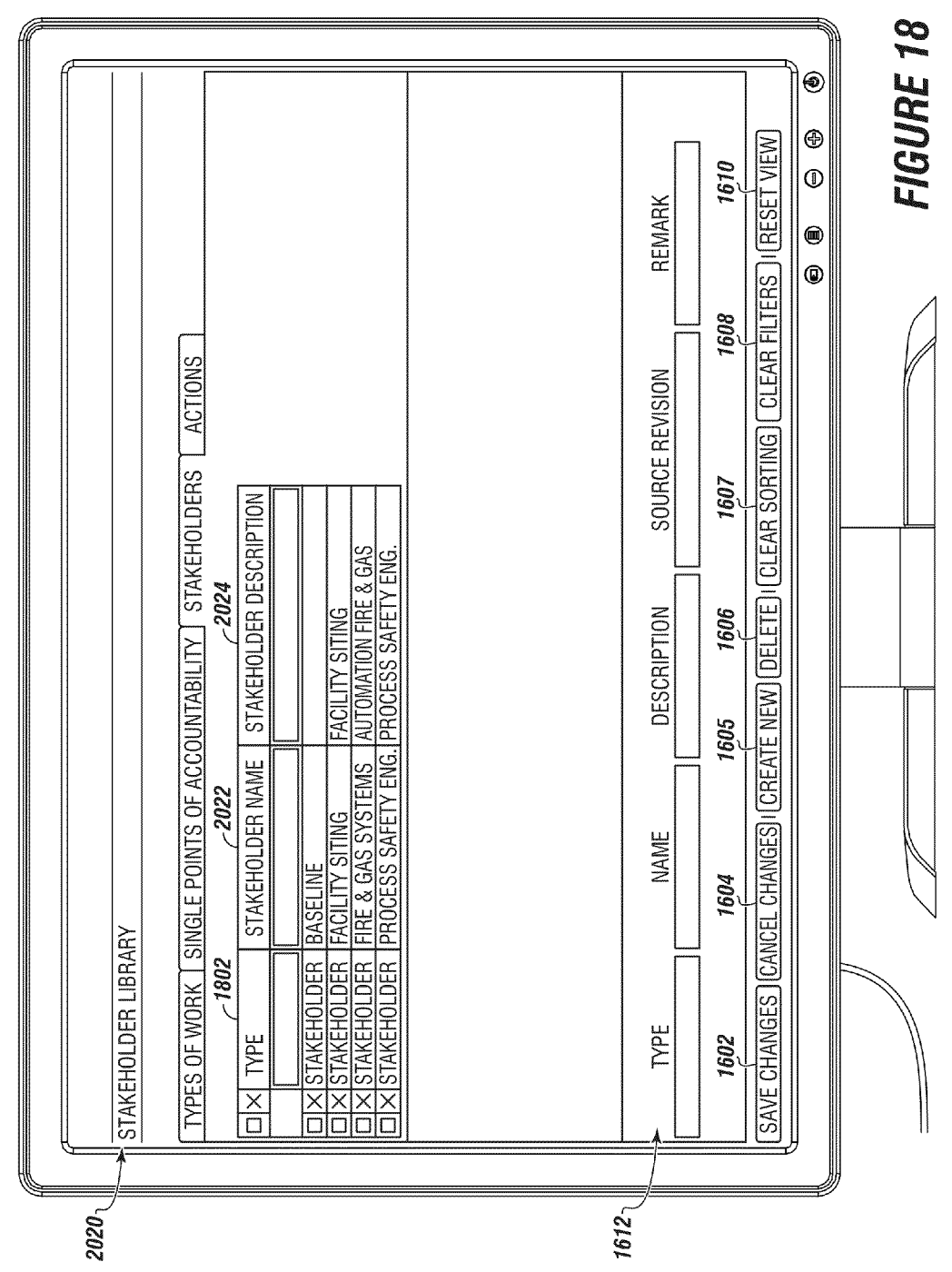

FIG. 18 shows a stakeholder library 2020 for a facility having a type 1802, a stakeholder name 2022, and a stakeholder description 2024 for each stakeholder name.

An example of a type is a stakeholder with a stakeholder name of Fire and Gas Systems which indicates the discipline group within the organization that has responsibility for this type of work. The stakeholder description for Figure and Gas Systems is automation fire and gas. The description refers to the type of project that the stakeholder name would be working within.

A data entry area 1612 can allow users to edit or add new entries to their library.

The stakeholder library can use the save changes button 1602, cancel changes button 1604, create new button 1605, delete button 1606, clear sorting button 1607, clear filters button 1608, and reset view button 1610.

Figure 19:
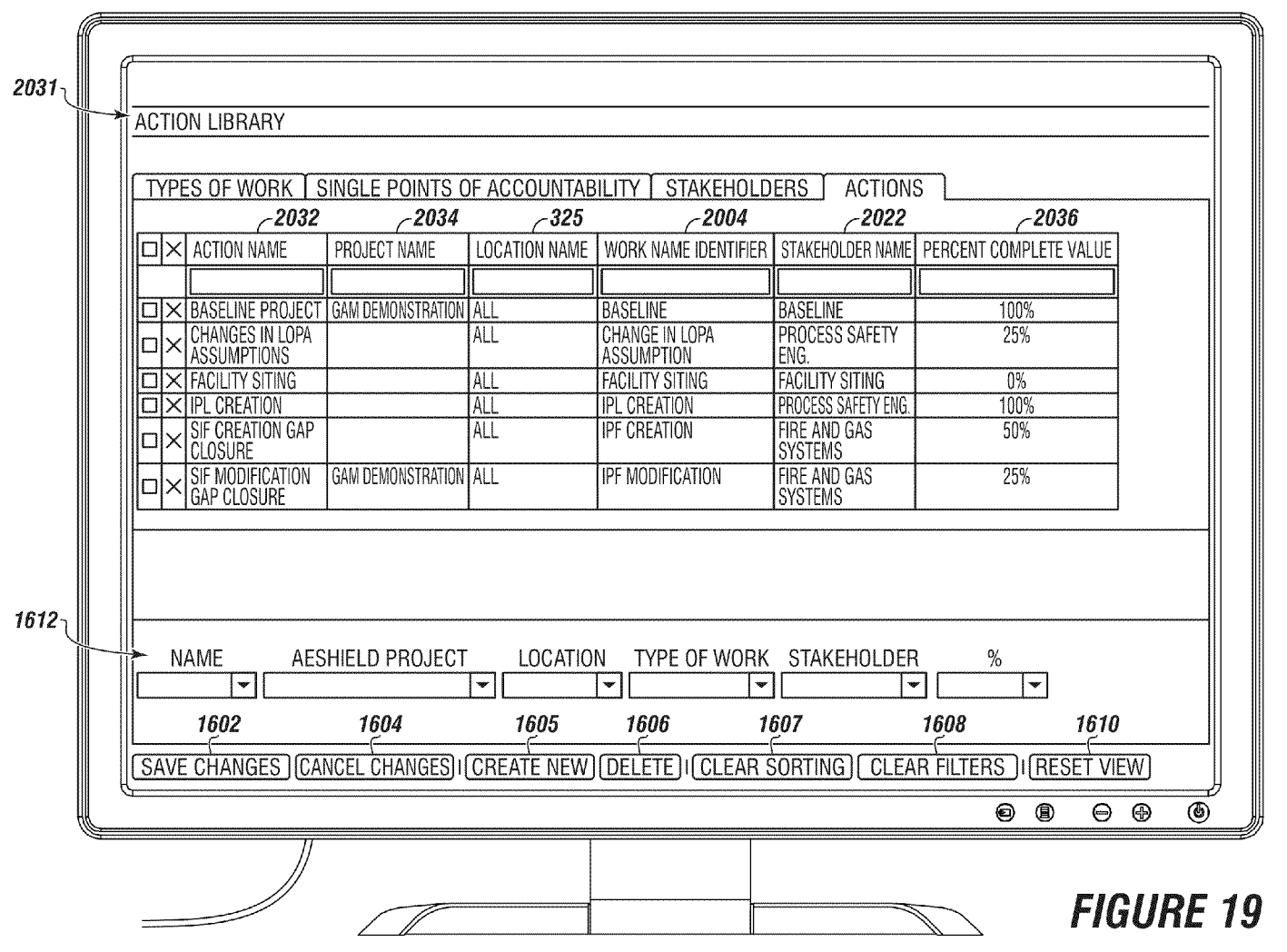

FIG. 19 shows an action library 2031 with of a plurality of action names 2032.

The action library can have a plurality of project names 2034. In the action library, each of the action names can be connected to at least one project name.

The action library can have a plurality of location names 325, with one of the location names connected to at least one action name.

The action library can include a work name identifier 2004 for each of the action names.

The action library can have a stakeholder name 2022 for each action name.

The action library can contain a percent complete value 2036 for each action name.

An example of an action name is SIF Modification Gap Closure with a project name of GAM Demonstration having a percentage of 25%.

Location names 325 can be "all" with a work name identifier 2004 of IPF modification.

A stakeholder name 2022 is shown as Fire and Gas Systems.

A data entry area 1612 can allow users to edit or add new entries to their library.

The stakeholder library can use the save changes button 1602, cancel changes button 1604, create new button 1605, delete button 1606, clear sorting button 1607, clear filters button 1608, and reset view button 1610.

FIG. 20 shows a gap assignment summary report 2051, which uses computer instructions to generate the results of all action plans at a selected area.

Libraries such as the type of work library, accountability library, stakeholder library, and action library are used to form the gap assignment summary report by pulling information from each library and calculating the totals for each type of work assigned to actions for action plans using computer instructions.

For example, a safety work in progress pie chart 2002 represents the percent of impact of a gap in safety being addressed by work in progress actions 2116d, shown as 100 percent complete with the relative risk reduction factor of a safety gap 2118d shown as 101.

The safety in work in progress pie chart was generated using computer instructions 3065 to show the percent of a safety gap being addressed by work in progress actions 2042a and the relative risk reduction factor of a safety gap 2118d.

The safety relative closed pie chart 2008 is the result of using computer instructions 3065 to use the relative risk reduction factor (RRF) of a gap in safety 2118d being addressed by percent relative closed actions 2418a.

For example, a safety relative closed pie chart 2008 represents the percent of a gap in safety being addressed by percent relative closed actions 2418a such as 11.1 percent complete and the relative risk reduction factor of a gap in safety 2118d is shown as 101. The safety relative closed pie chart was generated using computer instructions 3065 to show the percent of a gap in safety being addressed by closed actions 2418a and the relative risk reduction factor of the gap in safety 2118d.

The environmental work in progress pie chart 2016 represents the percent of impact of a gap that is an environmental gap 2132d being addressed by work in progress actions 2042b shown as 100 percent complete and the relative risk reduction factor of a safety gap 2118d is shown as 101. The environmental work in progress pie chart was generated using computer instructions 3067 to show the percent of an environmental gap being addressed by work in progress actions and the relative risk reduction factor of an environmental gap.

The environmental relative closed pie chart 2018 represents the relative risk reduction factor (RRF) of an environmental gap 2134*d* such as 101 being addressed by a percent relative closed actions 2418*b* such as 11.3 percent. The environmental relative closed pie chart was generated using computer instructions 3067 to show the percent of an environmental gap being addressed by closed actions and the relative risk reduction factor of an environmental gap.

Also shown are an Xref 2406, instrumented protective function identifier 374, target risk reduction factor for a safety gap 2040*a*, work in progress risk reduction factors 2042*a*, remaining risk reduction factor for a safety gap 2044*a*, target risk reduction factor for an environmental gap 2040*b*, and remaining risk reduction factor for an environmental gap 2044*b*.

FIG. 21 shows a gap assignment by category report 2150, which uses computers instructions 3039 to generate an aggregate report with totals for each work name identifier assigned to actions for action plans at a selected area. Libraries such as the type of work library, accountability library, stakeholder library, and action library are used to form the assignment by category report.

The safety top 5 types of work bar graph 2104 represents the percent impact 2116*a* of a safety gap being addressed by work in progress actions, shown as 47.2 percent complete and the relative risk reduction factor of a safety gap 2118*a* is shown as 106 for a certain type of work 2102 identified as IPF Creation.

Bar graph 2104 was calculated using computer instructions 3041 in the data storage to calculate the safety gap that was addressed by work in progress actions and the relative risk reduction factor of a safety gap for a certain type of work.

The safety top 5 types stakeholders bar graph 2106 represents the percent of impact a safety gap being addressed by work in progress actions 2116*b* such as 44.3 percent complete and the relative risk reduction factor of a safety gap 2118*b* such as 98 for a certain stakeholder 2122 such as Process Safety Engineering. Bar graph 2106 was calculated using computer instructions 3043 in the data storage to calculate the safety gap that was addressed by work in progress actions and the relative risk reduction factor of a safety gap for a certain stakeholder.

The safety top 5 types single point of accountability (SPA) bar graph 2108 represents the percent of impact of a safety gap being addressed by work in progress actions 2116*c* and is shown as 0.5 percent complete and the relative risk reduction factor of a safety gap 2118*c* such as 1 for a certain single point of accountability (SPA) 2124 such as unidentified. Bar graph 2108 was calculated using computer instructions 3045 in the data storage to calculate the safety gap that was addressed by work in progress actions and the relative risk reduction factor of a safety gap for a certain single point of accountability (SPA).

The environmental top 5 types of work bar graph 2110 represents the percent of impact for an environmental gap being addressed by work in progress actions 2132*a* such as 8 percent complete and the relative risk reduction factor of an environmental gap 2134*a* such as 0.5 for a certain type of work 2126 such as facility siting. Bar graph 2110 was calculated using computer instructions 3047 in the data storage to calculate the environmental gap that was addressed by work in progress actions and the relative risk reduction factor of an environmental gap for a certain type of work.

The environmental top 5 types stakeholders bar graph 2112 represents the percent of impact of an environmental gap being addressed by work in progress actions 2132*b* such as 47.2 percent complete and the relative risk reduction factor of an environmental gap 2134*b* such as 105 for a certain stakeholder 2128 such as Fire and Gas Systems. Bar graph 2112 was calculated using computer instructions 3049 in the data storage to calculate the environmental gap that was addressed by work in progress actions and the relative risk reduction factor of an environmental gap for a certain stakeholder.

The environmental top 5 types SPAs bar graph 2114 represents the percent of impact for an environmental gap being addressed by work in progress actions 2132*c* such as 0.5 percent complete and the relative risk reduction factor of a safety gap 2134*c* such as 1 for a certain single point of accountability (SPA) 2130 such as unidentified. Bar graph 2114 was calculated using computer instructions 3051 in the data storage to calculate the environmental gap that was addressed by work in progress actions and the relative risk reduction factor of an environmental gap for a certain single point of accountability (SPA).

FIG. 22 shows a gap assignment by action report 2250, with locations 2030, which uses computer instructions 3053 to generate an aggregate report with totals 2202 for percent impact for a safety gap 2116*d*, relative risk reduction for a safety gap 2118*d*, percent impact for an environmental gap 2132*d*, and relative risk reduction for an environmental gap 2134*d* for each project assigned to actions for action plans at a selected area. Libraries such as the type of work library, accountability library, stakeholder library, and action library are used to form the gap assignment by action report.

The gap assignment by action report can also include work name identifiers 2004, stakeholder identifiers 2022, and a percent completion 2036.

Figure 23:
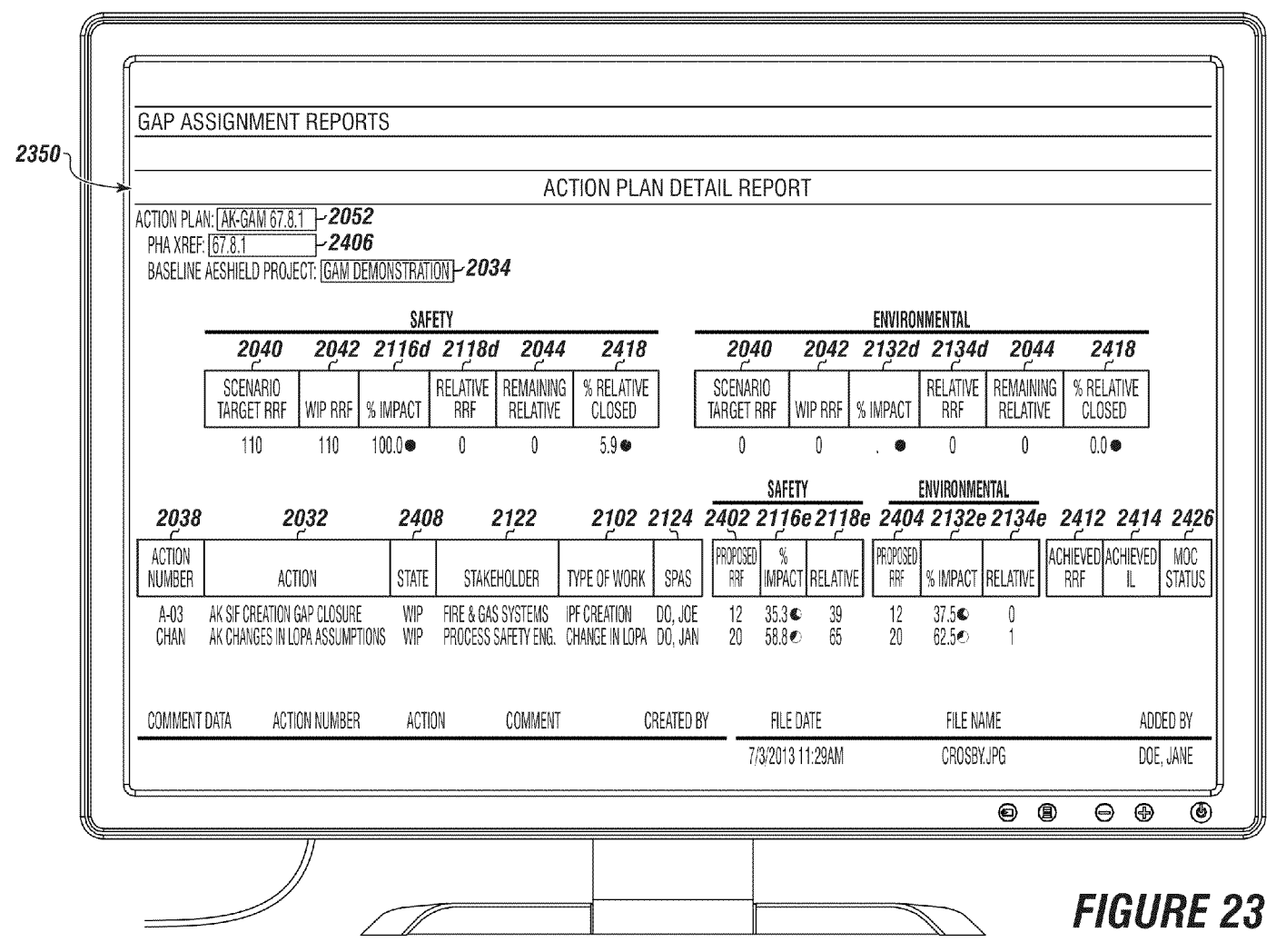

FIG. 23 shows an action plan detail report 2350, which generates a report showing the action plan details for a selected action plan name 2052 such as AK-GAM 67.8.1. A library such as the action plan library is used to form the action plan detail report. The action plan detail report includes an action number 2038 such as A-03, an action name 2032 such as AK SIF Create Gap Closure, a stakeholder name 2122 such as Fire and Gas Systems, and a type of work 2102, such as IPF Creation. An action plan can also include a safety proposed risk reduction factor (RRF) 2402 such as 12 with a percent impact 2116*e* such as 35.3.

Also shown are an Xref 2406, project names 2034, layer of protection analysis target risk reduction factor 2040, work in progress rick reduction factors 2042, percent of impact of a gap in safety 2116*d*, relative risk reduction factor of a safety gap 2118*d*, percent relative closed actions 2418, percent of impact of a gap that is an environmental gap 2132*d* and 2132*e*, relative risk reduction factor of an environmental gap 2134*d* and 2134*e*, remaining risk reduction factors 2044, action states 2408, certain single point of accountability 2124, relative risk reduction factor of an environmental gap 2118*e*, environmental proposed risk reduction factor 2404, achieved risk reduction factor 2412, achieved integrity level 2414, and instrumented protective function management of change status 2426.

Figure 24:
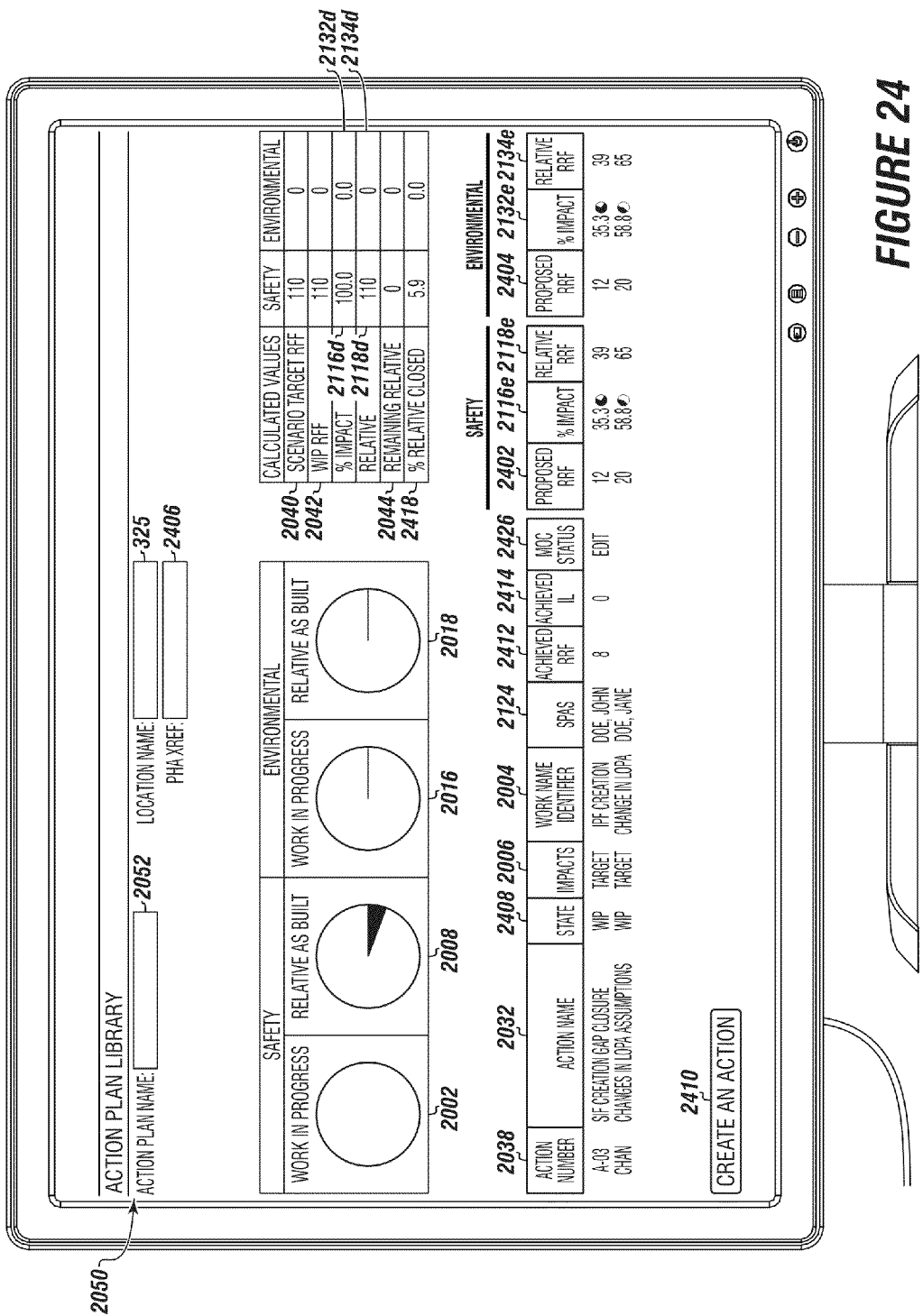
FIG. 24 depicts an action plan library page usable with the gap assignment model according to one or more embodiments.

FIG. 24 shows an action plan library 2050 having and action plan name field 2052.

The action plan library uses computer instructions 3016 to retrieve target risk reduction factors from the layer of protection analysis, and to use work in progress risk reduction factors 2042. In embodiments, the action plan library can also store percent relative closed actions 2418 for safety and environmental.

This action plan library allows users to create and manage action plans associated with an Xref 2406. Each action on a plan represents an item that will in some way close part of the target associated with the Xref. The term "Xref" as used herein refers to a cross reference indicating scenario from the layer of protection analysis.

This Figure shows achieved risk reduction factors 2412 such as 8, achieved integrity level 2414 depicted as 0, and instrumented protective function management of change status 2426 such as edit for a plurality of action names.

This Figure shows a safety proposed risk reduction factor 2402 as 12.00 with the percent of impact of a safety gap being addressed by work in progress actions 2116e shown as 35.3 percent complete and the relative risk reduction factor of a safety gap 2118e shown as 39.

This Figure shows an environmental proposed risk reduction factor 2404 as 20.00 with a percent of impact of an environment gap being addressed by work in progress actions 2132e such as 58.8 percent complete and the relative risk reduction factor of an environmental gap 2134e such as 65.

The create an action button 2410 is a button connected to computer instructions 3057 for users to be able to generate a new action within the application.

A gap assignment model is created in the action plan library with the create an action button 2410 and computer instructions 3057, which enables users to add an action number 2038 such as CHAN with an action name 2032 such as changes in LOPA assumptions. An example of an impact identifier 2006 is Target with a work name identifier 2004 of change in LOPA having a proposed risk reduction factor 2402 of 20. A percent impact 2116e is calculated with computer instructions 3026 such as 58.8 and a relative risk reduction factor 2118e is calculated with computer instruction 3028 such as 65.

Also shown are a location name 325, safety work in progress pie chart 2002, safety relative closed pie chart 2008, environmental work in progress pie chart 2016, environmental relative closed pie chart 2018, target risk reduction factor 2040, remaining risk reduction factor 2044, percent impact of a safety gap 2116d, relative risk reduction factor of a safety gap 2118d, percent impact of an environmental gap 2132d, risk reduction factor of an environmental gap 2134d, action states 2408, and certain single point of accountability 2124.

While these embodiments have been described with emphasis on the embodiments, it should be understood that within the scope of the appended claims, the embodiments might be practiced other than as specifically described herein.

What is claimed is:

1. A method for computer generating a gap assignment model for managing and tracking gap closure activities for a safety instrumented system of a facility, wherein the gap assignment model has at least one action plan name and the gap assignment model uses a real world model of an instrumented protective function, wherein the method comprises:
   a. connecting a processor to a data storage and a network to communicate with at least one client device;
   b. using non-transitory computer instructions in the data storage forming a type of work library for a facility having work names, wherein each work name includes a work name identifier, and an impact identifier;
   c. using non-transitory computer instructions in the data storage forming an accountability library having single points of accountability, each single point of accountability includes a work name identifier, and a single point of accountability name;
   d. using non-transitory computer instructions in the data storage forming a stakeholder library for a facility having stakeholder name and stakeholder description;
   e. using non-transitory computer instructions in the data storage forming an action library for a facility comprising:
      i. action names, each action name having an action number;
      ii. project names, wherein each of the action names is connected to at least one project name;
      iii. location names, wherein one of the location names is connected to at least one action name;
      iv. a work name identifier for each of the action name;
      v. stakeholder name for each action name; and
      vi. a percent complete value for each action name;
   f. using non-transitory computer instructions in the data storage forming a library of instrumented protective function library for a facility having an instrumented protective function identifier, a name of an instrumented protection function (IPF), an achieved risk reduction factor, and a real work model of instrumented protective functions for a facility;
   g. using non-transitory computer instructions in the data storage to form a layer of protection analysis with target risk reduction factor;
   h. using non-transitory computer instructions in the data storage forming an action plan library, wherein the action plan library comprises:
      i. action plan names;
      ii. non-transitory computer instructions to retrieve target risk reduction factors from the layer of protection analysis;
      iii. non-transitory computer instructions to retrieve achieved risk reduction factors from the instrumented protective function library;
      iv. non-transitory computer instructions to calculate a gap between a retrieved target risk reduction factor and a retrieved achieved risk reduction factor;
      v. non-transitory computer instructions to match at least one action name from the action library with one of the action plan names; and
      vi. non-transitory computer instructions to enter and connect a proposed risk reduction factor for each action name that is connected to an action plan name to reduce the gap between a retrieved target risk reduction factors and a retrieved achieved risk reduction factor;
   i. using non-transitory computer instructions in the data storage to simulate solutions to close a gap in safety or a gap in environment between the retrieved target risk reduction factor and the retrieved achieved risk reduction factor and display a hypothetical percent of risk reduced by each solution;
   j. using non-transitory computer instructions in the data storage to calculate a relative risk reduction factor for each action connected to an action plan, and using the real world model with the instrumented protective function and the instrumented protective function identifier to form a gap assignment model for a facility having at least one instrumented protective function;
   k. using non-transitory computer instructions in the data storage to identify an action state for each action connected to an action plan created in the gap assignment model;
   l. using non-transitory computer instructions in the data storage to calculate a work in progress risk reduction factor for an action plan with actions that have been marked as work in progress; and
   m. using non-transitory computer instructions in the data storage to calculate a remaining risk reduction factor for an action plan with actions that have been marked as work in progress.

2. The method of claim 1, further comprising using non-transitory computer instructions in the data storage to create gap assignment reports comprising at least one of:

a. a gap assignment summary report;
b. a gap assignment by category report;
c. a gap assignment by action report; and
d. an action plan detail report.

3. The method of claim 1, wherein the instrumented protective function (IPF) library comprises:
a. a protective layer identifier;
b. an instrumented protective function name;
c. a calculated instrumented protective function probability of failure on demand; and
d. an instrumented protective function achieved risk reduction factor.

4. The method of claim 1, further comprising using non-transitory computer instructions in the data storage to connect data of a process hazard analysis and layers of protection analysis to a safety integrity level calculations for the facility with the gap assignment model.

5. The method of claim 1, further comprising using non-transitory computer instructions in the data storage to support analysis of protection layers to be applied to reduce probability of a hazardous event occurring for the facility with the gap assignment model.

6. The method of claim 1, further comprising using non-transitory computer instructions in the data storage to calculate the safety integrity level calculations required to reduce risk to a target level for a facility with the gap analysis model.

* * * * *